United States Patent
Fox et al.

(10) Patent No.: US 9,996,878 B1
(45) Date of Patent: Jun. 12, 2018

(54) IN-VEHICLE INFOTAINMENT INSURANCE APPLICATIONS

(71) Applicant: Liberty Mutual Insurance Company, Boston, MA (US)

(72) Inventors: Michael Scott Fox, Boston, MA (US); Brian Stephen Piccolo, Boston, MA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 382 days.

(21) Appl. No.: 14/645,260

(22) Filed: Mar. 11, 2015

Related U.S. Application Data

(60) Provisional application No. 61/951,345, filed on Mar. 11, 2014.

(51) Int. Cl.
　　G06Q 40/00　　(2012.01)
　　G06Q 40/04　　(2012.01)
　　H04W 4/04　　(2009.01)

(52) U.S. Cl.
　　CPC ............ G06Q 40/04 (2013.01); H04W 4/046 (2013.01)

(58) Field of Classification Search
　　None
　　See application file for complete search history.

(56) References Cited

U.S. PATENT DOCUMENTS

| | | | | |
|---|---|---|---|---|
| 6,141,611 A * | 10/2000 | Mackey | ................. | G07C 5/008 340/438 |
| 8,260,639 B1 * | 9/2012 | Medina, III | ........... | G06Q 40/08 705/4 |
| 8,799,034 B1 * | 8/2014 | Brandmaier | ........... | G06Q 40/08 705/4 |
| 9,116,786 B2 * | 8/2015 | Ricci | ........................ | G06F 17/00 |
| 9,412,130 B2 * | 8/2016 | Wasserman | ........ | G06Q 30/0631 |
| 9,672,571 B2 * | 6/2017 | Fernandes | .............. | G06Q 40/08 |
| 2002/0063637 A1 * | 5/2002 | Eida | ........................ | G08G 1/205 340/901 |
| 2004/0088090 A1 * | 5/2004 | Wee | ........................ | G08G 1/205 701/33.4 |
| 2004/0153356 A1 * | 8/2004 | Lockwood | ............. | G06Q 10/20 705/305 |
| 2008/0255888 A1 | 10/2008 | Berkobin | | |
| 2010/0030586 A1 * | 2/2010 | Taylor | .................... | G06Q 40/08 705/4 |
| 2010/0131300 A1 | 5/2010 | Collopy | | |
| 2010/0138242 A1 * | 6/2010 | Ferrick | ................ | G06Q 10/087 705/4 |

(Continued)

OTHER PUBLICATIONS

Microsoft, Microsoft Auto, 2009, Microsoft Corporation, entire document (Year: 2009).*

(Continued)

Primary Examiner — Ryan D Donlon
Assistant Examiner — Christopher Bridges
(74) Attorney, Agent, or Firm — Alston & Bird LLP

(57) ABSTRACT

A vehicle is engineered in which a piece of hardware, an in-vehicle display, is installed and through which an insured may interface with various insurance modules. The in-vehicle display presents various pieces of graphical user interface to assist the insured in operating the vehicle depending on driving exigencies and circumstances, so as to improve vehicle technologies.

14 Claims, 51 Drawing Sheets

(56) References Cited

U.S. PATENT DOCUMENTS

2011/0153367 A1\*  6/2011  Amigo ................... G07C 5/008
                                                          705/4
2011/0218825 A1   9/2011  Hertenstein
2013/0134730 A1   5/2013  Ricci
2013/0151064 A1   6/2013  Becker
2013/0267194 A1  10/2013  Breed
2015/0039397 A1\*  2/2015  Fuchs ................ G06Q 30/0283
                                                          705/7.35
2015/0332407 A1\* 11/2015  Wilson, II ............. G06Q 10/10
                                                          705/4

OTHER PUBLICATIONS

Baecker, Miche, Bohnert, "Vehicle-to-Business Communication: The Example of Claims Assistance in Motor Insurance", 2010, Institute of Technology Management, University of St. Gallen and SAP Research Switzerland, entire document (Year: 2010).\*

\* cited by examiner

IN-VEHICLE INFOTAINMENT INSURANCE APPLICATIONS

CROSS-REFERENCE TO RELATED APPLICATION

This application claims the benefit of U.S. Provisional Application No. 61/951,345, filed Mar. 11, 2014, which is incorporated herein by reference.

TECHNICAL FIELD

The present subject matter is generally related to human-machine interface, and more particularly, it relates to in-vehicle insurance software applications useful to improve vehicle technologies.

BACKGROUND

In-vehicle infotainment is a collection of hardware devices installed in automobiles, or other forms of transportation, to provide audio and/or audio/visual entertainment as well as automotive navigation systems. This includes playing media, such as CDs, DVDs, and TV. Also increasingly common in in-vehicle infotainment installs is the incorporation of video game consoles into the vehicle. None to date provides insurance services inside a vehicle useful for improving vehicle technologies.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the subject matter includes a system form which recites a system useful for improving vehicle technology. The system comprises a vehicle including an on-board computer and computer memory. The system also comprises an in-vehicle display installed in the vehicle which is communicatively coupled to the on-board computer, the hardware of which is suitable for presenting pieces of graphical user interface of insurance modules. The system further comprises an accident scene assistant module being executed by the on-board computer, the hardware of which is capable of determining impact to the vehicle by the on-board computer, finding and storing a repair shop in the computer memory by the on-board computer at a proximity specified by an insured through operating a first graphical user interface on the in-vehicle display, guiding the vehicle to the repair shop in the computer memory, and querying the insured on the in-vehicle display whether to start a claim when the vehicle is within proximity to the repair shop.

Another aspect of the subject matter includes a method form which recites a method useful for improving vehicle technology. The method comprises presenting a first graphical user interface on an in-vehicle display installed in a vehicle and communicatively coupled to an on-board computer and computer memory, the first graphical user interface presenting selectable modules, including an accident scene assistant module, a claim module, and a drive to savings module. The method also comprises determining an impact to the vehicle and its location by the on-board computer when the accident scene assistant module is selected on the in-vehicle display. The method additionally comprises presenting on the in-vehicle display a second graphical user interface illustrating the impact to the vehicle and its location. The method further comprises querying on the in-vehicle display via the second graphical user interface whether to report a claim. The method yet further comprises retrieving, by activating the claim module, from the computer memory by the on-board computer information of the vehicle and information of an accident leading to the impact if the accident scene assistant receives an indication on the in-vehicle display to report a claim. The method as yet further comprises communicating by the on-board computer with a mobile phone of the insured to activate an app on the mobile phone so as to facilitate selection of photos, videos or voice memos of the accident. The method yet also comprises sending the information of the vehicle, information of the accident, photos, videos, or voice memos of the accident to a server. The method as yet also comprises acknowledging by a third graphical user interface on the in-vehicle display if the information of the vehicle, information of the accident, photos, videos, or voice memos of the accident were received by the server, the third graphical user interface indicating a location from which information was sent.

A further aspect of the subject matter includes a non-transitory computer-readable medium form which recites a non-transitory computer-readable medium having computer-readable instructions for implementing a method useful for improving vehicle technology. The method comprises presenting a first graphical user interface on an in-vehicle display installed in a vehicle and communicatively coupled to an on-board computer and computer memory, the first graphical user interface presenting selectable modules, including an accident scene assistant module, a claim module, and a drive to savings module. The method also comprises determining an impact to the vehicle and its location by the on-board computer when the accident scene assistant module is selected on the in-vehicle display. The method additionally comprises presenting on the in-vehicle display a second graphical user interface illustrating the impact to the vehicle and its location. The method further comprises querying on the in-vehicle display via the second graphical user interface whether to report a claim. The method yet further comprises retrieving, by activating the claim module, from the computer memory by the on-board computer information of the vehicle and information of an accident leading to the impact if the accident scene assistant receives an indication on the in-vehicle display to report a claim. The method as yet further comprises communicating by the on-board computer with a mobile phone of the insured to activate an app on the mobile phone so as to facilitate selection of photos, videos, or voice memos of the accident. The method yet also comprises sending the information of the vehicle, information of the accident, photos, videos, or voice memos of the accident to a server. The method as yet also comprises acknowledging by a third graphical user interface on the in-vehicle display if the information of the vehicle, information of the accident, photos, videos, or voice memos of the accident were received by the server, the third graphical user interface indicating a location from which information was sent.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
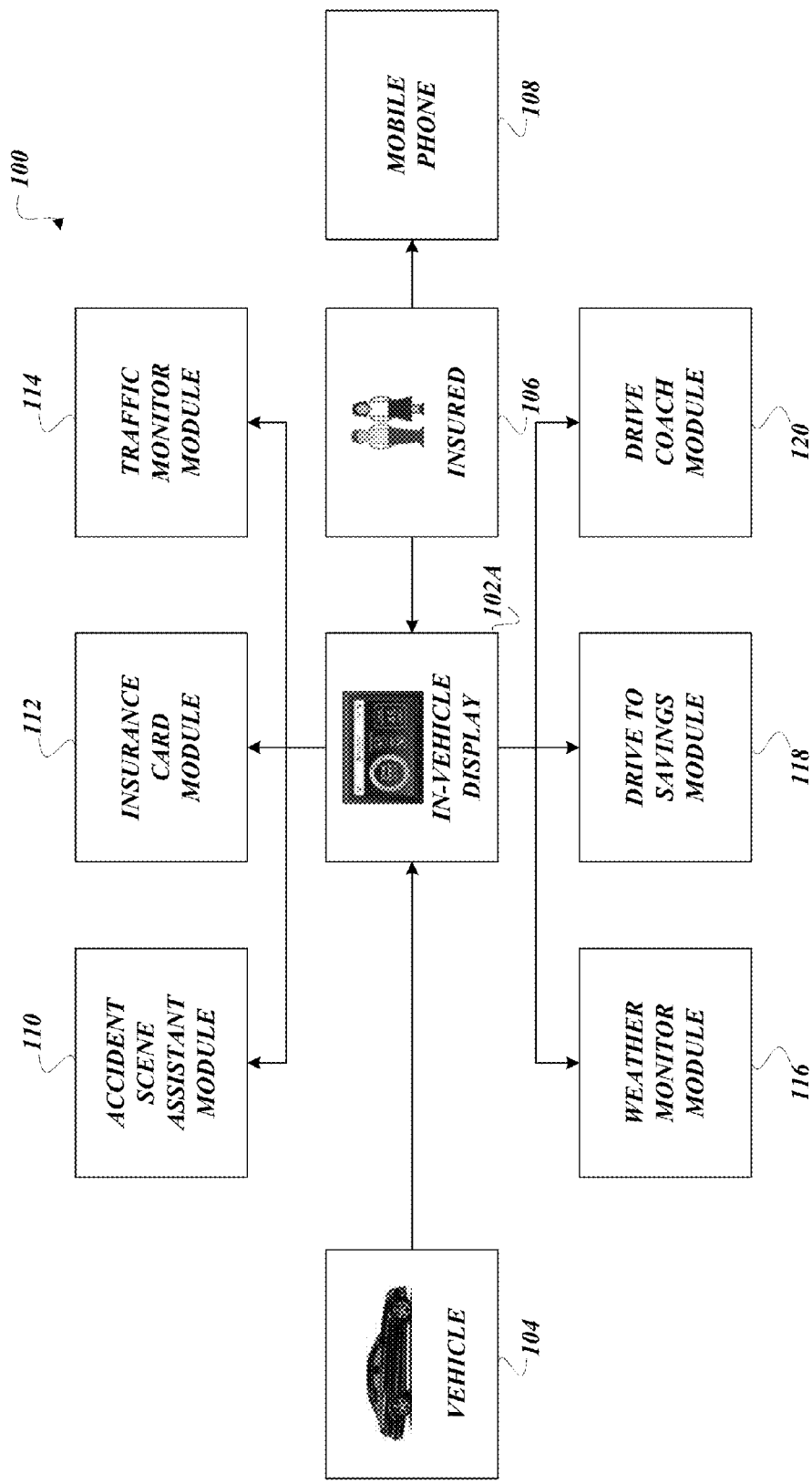
FIG. 1A is a block diagram illustrating an archetypical system with hardware structures executing software modules.

A system 100 illustrated in FIG. 1 portrays a vehicle 104 in which a piece of hardware, an in-vehicle display 102A, is installed and through which an insured 106 may interface with various insurance modules. The in-vehicle display 102A presents various pieces of graphical user interface to assist the insured 106 in operating the vehicle 104, depending on driving exigencies and circumstances. The system 100 is engineered to provide an in-vehicle infotainment system comprising computing hardware on which software executes delivering of entertainment, applications, and content through the vehicle 104's dashboard so as to improve vehicle technologies. An insurance module can be downloaded to the system 100 to enhance the experiences of customers and prospects across sales, service, and claims. For an insurer, a module on the system 100 creates a new distribution channel for insurance services. Each module is engineered to reside on the vehicle 104's in-vehicle system to maintain an interactive dialog with customers and prospects based on the functionalities of the module. Specifically, the customers may access services to answer questions that previously required a phone call to a service or sales representative; the prospects may be enticed to obtain a quote and bind a policy; the customers may be encouraged to use repair shops that provide enhanced insurance services; adjusters/appraisers can be assisted with the claims process; tools needed by the customers for self-service in the claims process can be made available; and so on.

An accident scene assistant module 110 can be invoked by the insured 106 through the in-vehicle display 102A to assist the insured 106 when the vehicle 104 is in an accident. The module is engineered to communicate with an on-board computer to detect an accident and alert the module. The module is engineered to assist the insured 106 with activities related to being in an accident. For instance, the module can assist with calling emergency contacts, roadside assistance, a claims representative, police, an ambulance, and so on.

An insurance card module 112 can be invoked by the insured 106 on the in-vehicle display 102A to present graphically pieces of information connected with an insurance policy associated with the insured 106 in operating the vehicle 104. A traffic monitor module 114 can be invoked by the insured 106 on the in-vehicle display 102A to monitor and reroute away from undesired traffic patterns.

A weather monitor module 116 can be invoked by the insured 106 on the in-vehicle display 102A to monitor and reroute away from undesired weather. The module is engineered to receive weather information from a third party. The module can provide the insured 106 with a comprehensive list of what to do in case of a specific weather event. In addition, the module uses a GPS to provide guidance to helpful resources, such as directions to the closest hotel, gas station, insurer's response center, an alternative route to a desired destination that avoids the weather event, and so on.

A drive to savings module 118 can be invoked by the insured 106 on the in-vehicle display 102A to initiate a program to actuate a piece of hardware called a "telematics device" so as to allow tracking of the operation of the vehicle 104, enabling the insured 106 to obtain a discount on his insurance. A mobile phone 108 works together with the in-vehicle display 102A to enhance the human-machine interface experience of the insured 106.

A drive coach module 120 can be invoked by the insured 106 on the in-vehicle display 102A to enhance driving skills of the insured 106 in operating the vehicle 104. The drive coach module 120 is engineered to use telematics data to provide the insured 106 with a driving score based on his driving. The functionality provides real-time driving help and feedback, including tips to stay safe, to the insured 106 after the trip, such as risky driving behaviors, including sudden braking or running stop signs, exceeding the speed limit, and so on. The module is engineered to allow comparison of the insured 106's driving score with those of others, such as friends and family as well as teenagers and elderly family members.

Other modules (not shown) include an office locator module, which displays the locations of the insurer's offices. The office locator module uses a GPS that is enabled to pull in office locations. Another module (not shown) is an auto insurance quote module. The quote is based on the vehicle 104's information stored in the computer memory on the vehicle 104's on-board computer. The memory also contains personal information of the insured 106 that is already entered into the system 100. The module communicates with other data sources to provide a full quote. In the instance where telematics data is collected for usage-based insurance, the module provides the insured 106 with an auto insurance quote or a discount offer based on driving behavior. The premium calculation could be completed in-vehicle based on an electronic process that uses in-vehicle data and driving behavior. The prospect data never leaves the vehicle 104 in one embodiment. In another embodiment, the vehicle data and driving behavior could be ported to systems (outside the vehicle 104) and a quote could be returned. The module is suitably integrated with data from the on-board computer (hard braking, rapid acceleration, late night driving, miles driven, etc.); advance vehicle information (e.g., vehicle repair history, vehicle accident history, ownership history, vehicle valuation based on condition); online databases (e.g., carmax.com, repairpal.com); OEM/dealership databases; automotive appraisal systems (e.g., Audatex, CCC One); information provided by the insured 106 (that is entered manually or becomes known through information that has been previously entered into this module or other modules); and a calculated driving score based on the insured 106's driving behavior.

A further module (not shown) is a FNOL module or claims module which is engineered to facilitate the insured 106 in filing and tracking of the status of a claim. The module is engineered to port relevant diagnostic information from the vehicle 104's on-board computer to an insurer's claims representative. Information processed by the FNOL module includes vehicle brand; model; year; derived information from online databases; OEM databases; automotive appraisal systems; and advance vehicle information (recognizing damage to a vehicle [engineered to be derived from an ability to pull in "perfect" models of an entire vehicle or sections of a vehicle to compare a "damaged" vehicle that could be obtained through a combination of systems {e.g., CCC One, Audatex, etc.}]). Based on the assessment of the damage by the FNOL module, the module is engineered to enter the claim immediately and guide the insured 106 to a repair shop to repair the vehicle 104 or a determination is made by the module that the vehicle 104 needs to be assessed by the insurer's auto appraisal department. The module is engineered to estimate the cost to repair based on damage. The module is engineered to schedule appointments to repair, tow, and rent rental vehicles. The module is engineered to estimate how long repairs will take. The module is engineered to find repair shops and to schedule appointments.

Figure 1B:
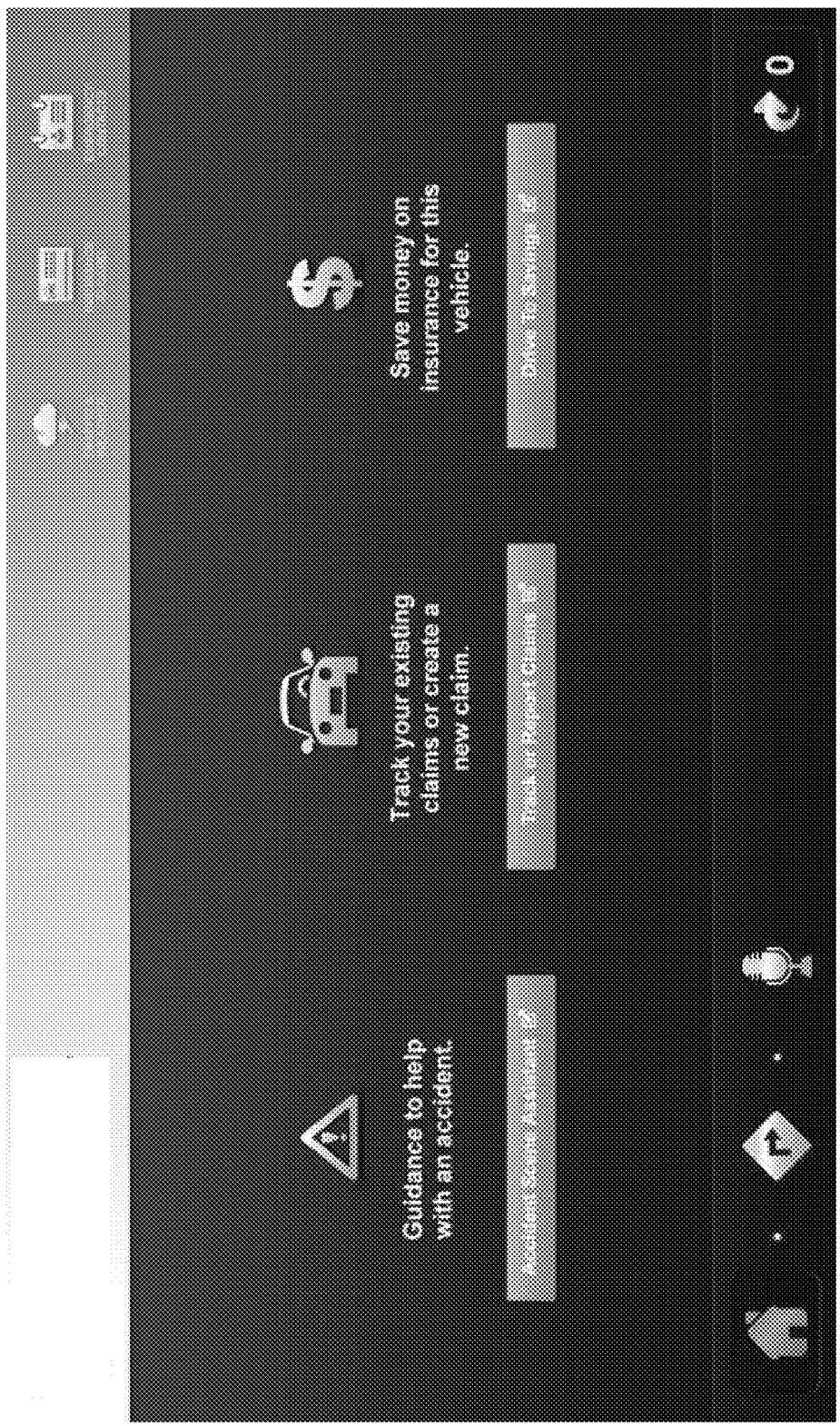
FIG. 1B is a pictorial diagram illustrating an archetypical graphical user interface displayed on an in-vehicle display, which is a piece of hardware.

FIG. 1B illustrates a graphical user interface 102B displayed on the in-vehicle display 102A, which functions as a home screen. The graphical user interface 102B includes three portions: top, body, and bottom. The top portion contains an icon named "TRAFFIC & WEATHER" appearing graphically as a cloud under which is a bolt of lightning. Selection of the "TRAFFIC & WEATHER" icon causes the system 100 to navigate the insured 106 to the traffic monitor module 118 and the weather monitor module 116. Another icon named "INSURANCE ID CARD" appears as a stylized business card, the invocation of which causes the system 100 to navigate the insured 106 to the insurance card module 112. Another icon named "EMERGENCY CONTACTS" appears as a Rolodex card, the invocation of which causes the system 100 to navigate the insured 106 to information connected with emergency contacts information.

The body of the graphical user interface 102B contains three buttons. The first button is named "Accident Scene Assistant," the invocation of which causes the system 100 to navigate the insured 106 to the accident scene assistant module 110. Above the "Accident Scene Assistant" button is a white triangle enclosing an exclamation point superjacent to the text "Guidance to help with an accident." The second button is named "Track or Report Claims," the invocation of which causes the system 100 to navigate the insured 106 to other pieces of user interface for initiating insurance claims. Above the "Track or Report Claims" button is a stylized illustration of the front of a vehicle and the text "Track your existing claims or create a new claim." The third button is named "Drive To Savings," the invocation of which navigates the insured 106 to the Drive To Savings module 118. Appearing above the "Drive To Savings" button is a stylized dollar sign and the text "Save money on insurance for this vehicle."

The bottom portion of the graphical user interface 102B includes an icon appearing as a house with a chimney, the selection of which causes the system 100 to bring the insured 106 back to the screen of the graphical user interface 102B. Another icon appears as a traffic sign with a rightward pointing arrow, which invocation causes the system 100 to present a map on the in-vehicle display 102A. A third icon appears as a microphone, which invocation causes the system 100 to turn on the speakers of the vehicle 104 through which an audible user interface is presented. At the far right end of the bottom portion, a user interface element appears as a box in which a curved arrow is adjacent to a number, which selection causes the system 100 to navigate the insured 106 back to a previously navigated screen on the in-vehicle display 102A.

FIGS. 2A-2M illustrate pieces of graphical user interface 200A-200M which may be presented when the accident scene assistant module 110 is selected. These pieces of graphical user interface 200A-200M appear in three portions: top, body, and bottom. The top portion contains an icon named "INSURANCE ID CARD" appearing as a stylized business card, which invocation causes the system 100 to navigate the insured 106 to the insurance card module 112. Another icon named "EMERGENCY CONTACTS" appears as a Rolodex card, which invocation causes the system 100 to navigate the insured 106 to information connected with emergency contacts information. The body almost always contains the title of the selected accident scene assistant module 110, namely, "Accident Scene Assistant." The bottom portion includes an icon appearing as a house with a chimney, the selection of which causes the system 100 to bring the insured 106 back to the screen of the graphical user interface 102B. Another icon appears as a traffic sign with a rightward pointing arrow, which invocation causes the system 100 to present a map on the in-vehicle display 102A. A third icon appears as a microphone, which invocation causes the system 100 to turn on the speakers of the vehicle 104 through which an audible user interface is presented. At the far right end of the bottom portion, a user interface element appears as a box in which a curved arrow is adjacent to a number, which selection causes the system 100 to navigate the insured 106 back to a previously navigated screen on the in-vehicle display 102A. Because these user interface elements are repeated throughout the pieces of graphical user interface 200A-200M, they will not be further discussed for the purpose of brevity.

Figure 2A:
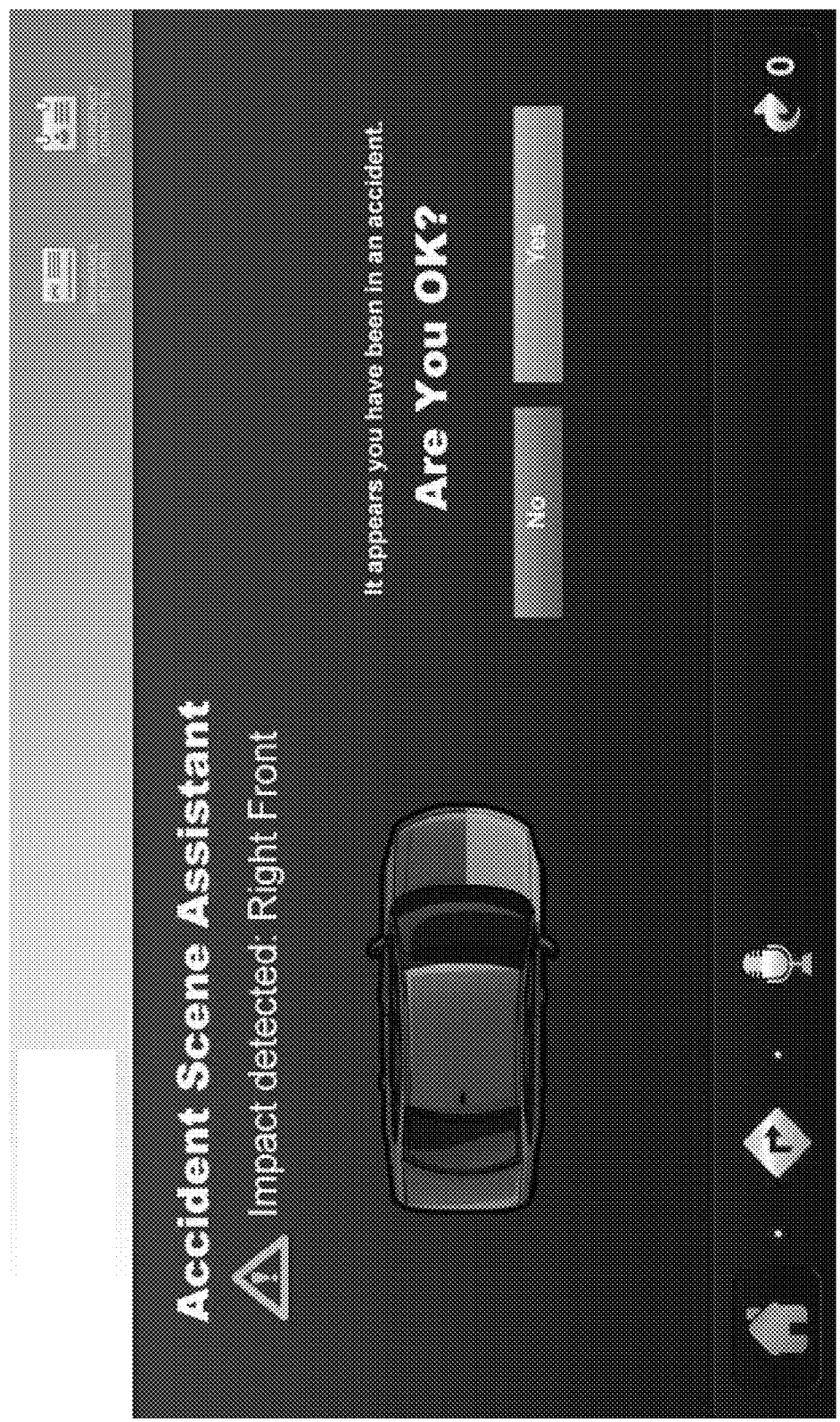
FIGS. 2A-2M are pictorial diagrams illustrating pieces of an archetypical graphical user interface displayed on an in-vehicle display, which is a piece of hardware.

The graphical user interface 200A of FIG. 2A presents in the body two columns. In the first column, collision information regarding the vehicle 104 is presented, namely, a warning icon appearing as a yellow triangle with an exclamation point at its center, and the text "Impact detected: Right Front." Beneath, an illustration of the vehicle 104 is presented to the insured 106, the right front of which appears in yellow (indicating the location of impact) whereas the rest of the vehicle appears in gray. In the second column, a portion of the text displayed reads, "It appears you have been in an accident." A textual query is presented to the insured 106, "Are You OK?" Two buttons appear below, one being named "No", which selection indicates that the insured 106 is injured, and another button named "Yes", which selection indicates that the insured 106 does not appear to be injured.

Figure 2B:
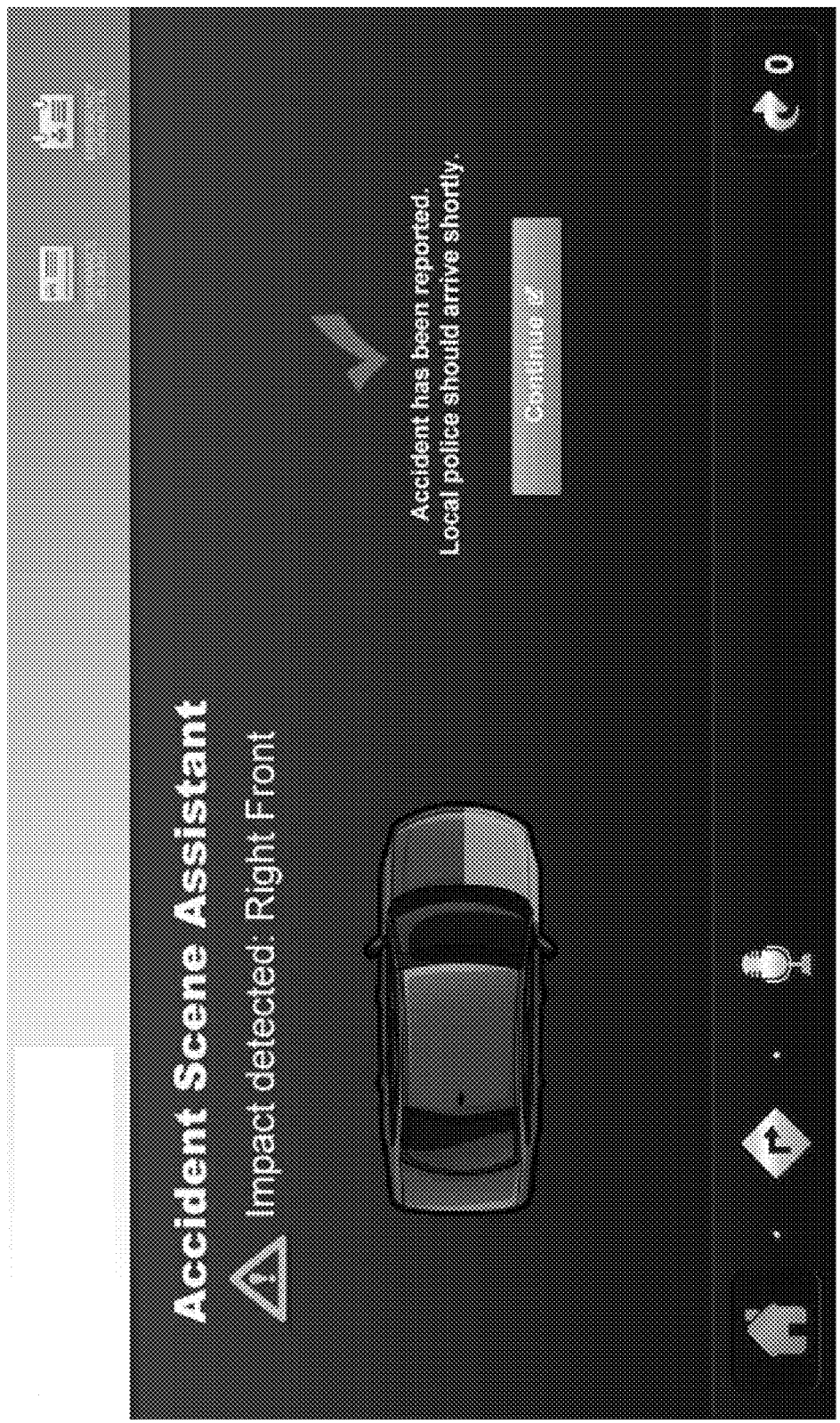

FIG. 2B illustrates the graphical user interface 200B in which the information in the second column has changed. A green checkmark icon has appeared. Underneath, textual information is presented: "Accident has been reported. Local police should arrive shortly." A button named "Continue" appears, the invocation of which navigates the insured 106 to the next graphical user interface screen. In one embodiment, the graphical user interface 200B appears when the "No" button of the graphical user interface 200A is selected.

Figure 2C:
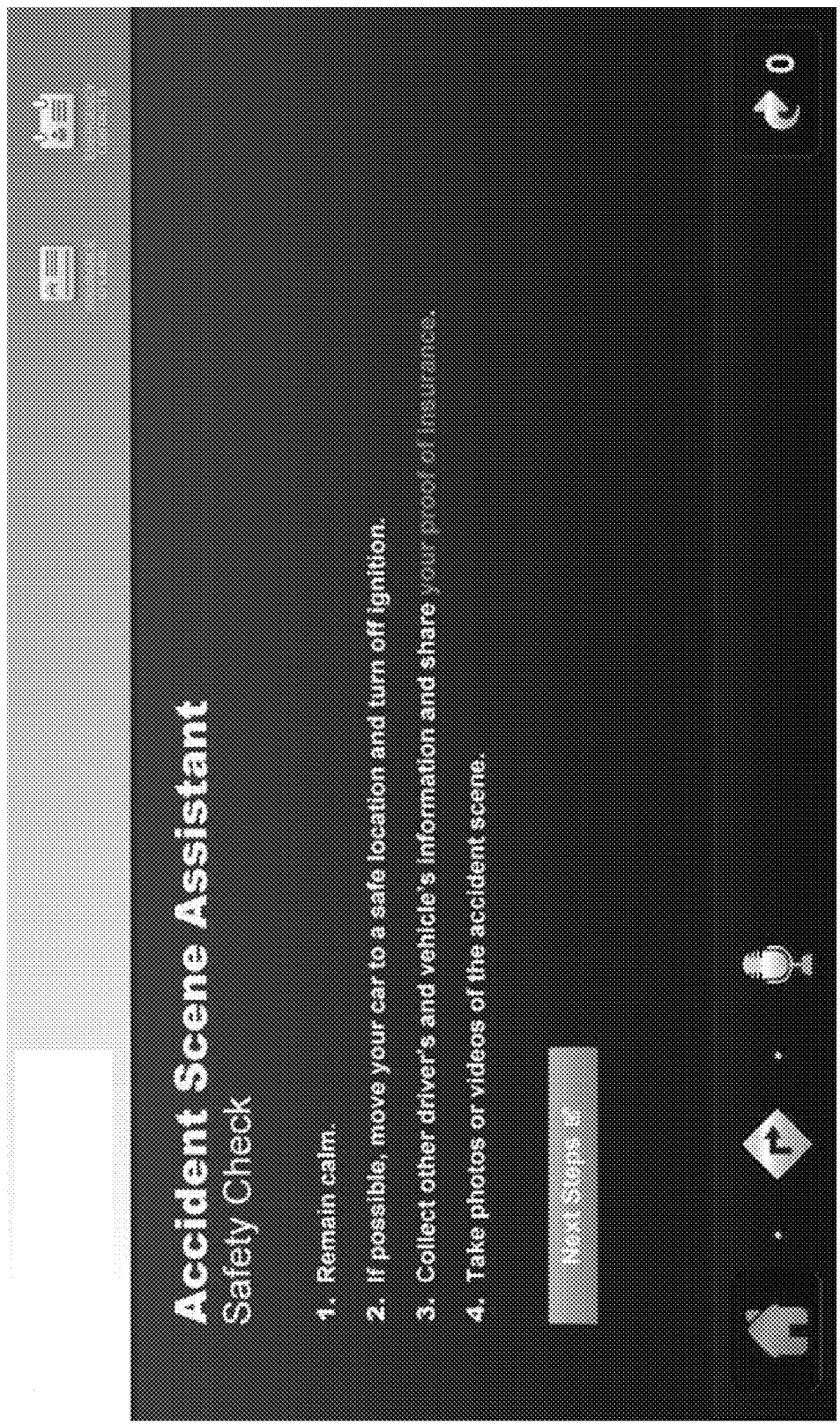

FIG. 2C illustrates the graphical user interface 200C, which displays the title of the graphical user interface 200C, namely, "Safety Check." Further below, a list of steps to be considered by the insured 106 includes "1. Remain calm."; "2. If possible, move your car to a safe location and turn off ignition."; "3. Collect other driver's and vehicle's information and share your proof of insurance."; and "4. Take photos or videos of the accident scene." A button named "Next Steps" appears, the invocation of which causes the system 100 to navigate the insured 106 to the next graphical user interface screen. In one embodiment, the graphical user interface 200C appears when the "Continue" button of the graphical user interface 200B is selected.

Figure 2D:
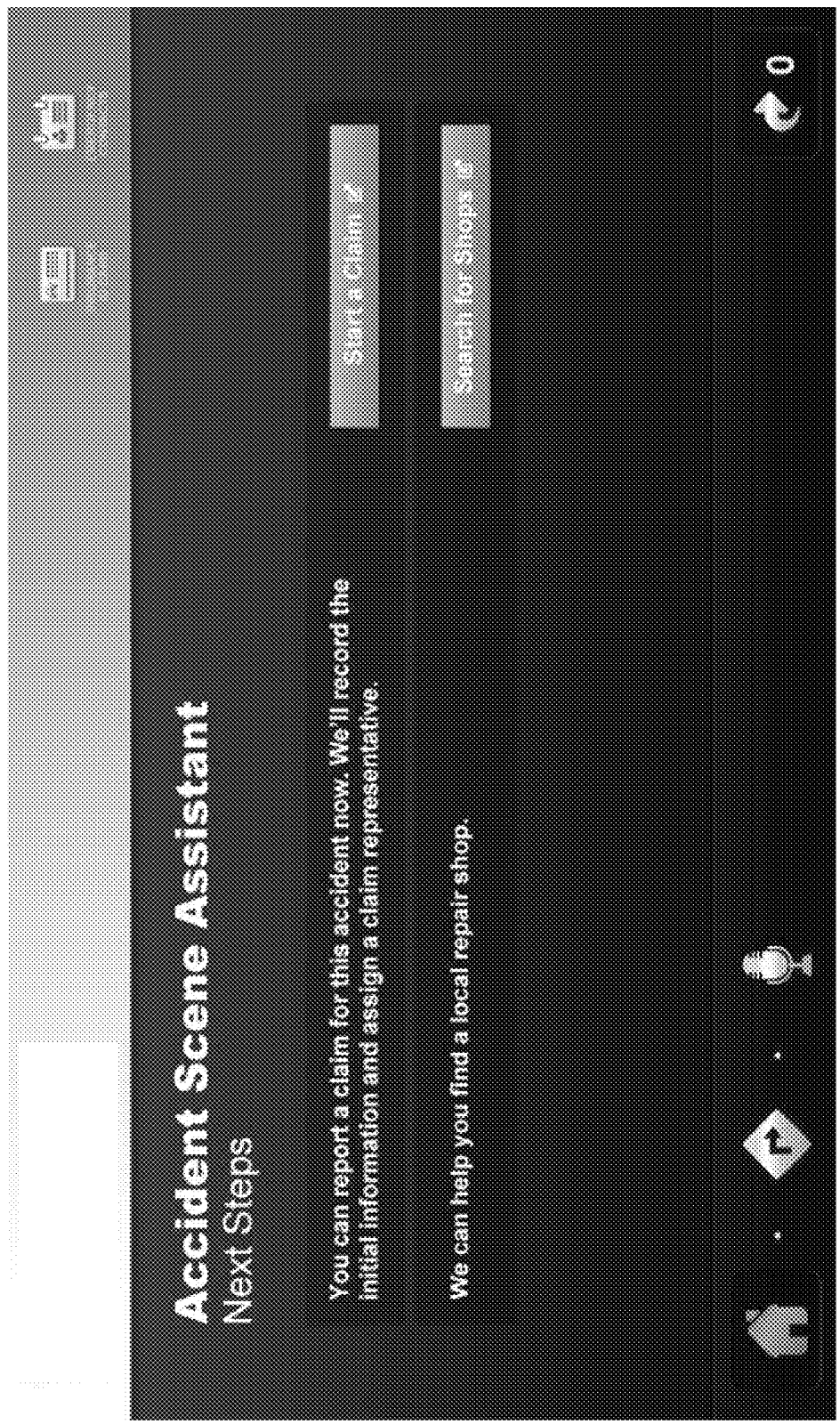

FIG. 2D illustrates the graphical user interface 200D presenting the title of the graphical user interface 200D, which is "Next Steps." Two rows appear below. One row recites the textual information "You can report a claim for this accident now." and "We'll record the initial information and assign a claim representative." Adjacent to the textual information is a button named "Start a Claim," the invocation of which navigates the insured 106 through pieces of graphical user interface to initiate an insurance claim electronically. The second row contains the textual information "We can help you find a local repair shop." Adjacent to the textual information is a button named "Search for Shops," the invocation of which navigates the insured 106 through a map and a listing of local repair shops to care for the vehicle 104.

Figure 2E:
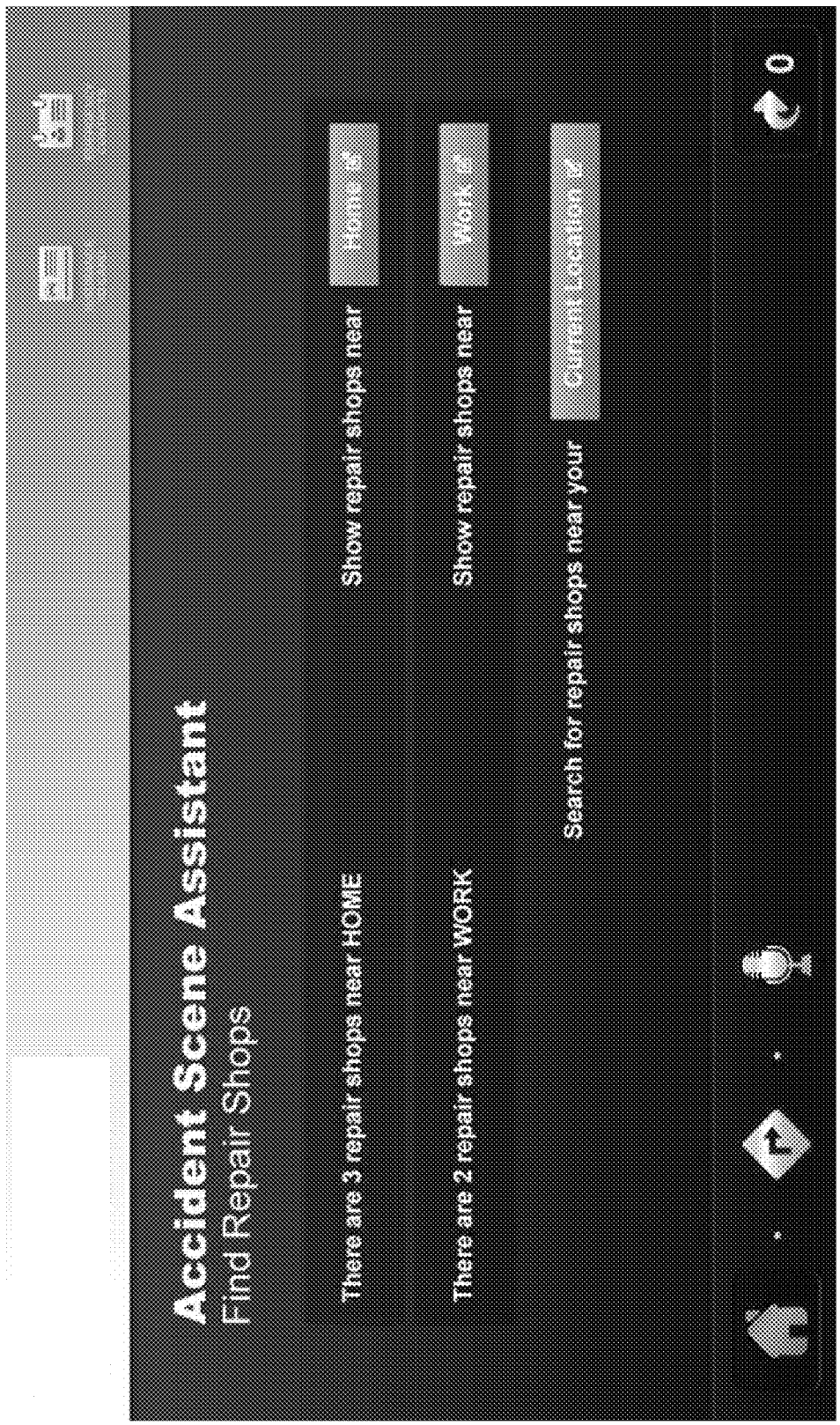

FIG. 2E illustrates the user interface 200E displaying the name of the user interface 200E, which is "Find Repair Shops." Below are three rows. The first row recites the textual information "There are 3 repair shops near HOME." and "Show repair shops near." Adjacent to these pieces of textual information on the first row is a button named "Home," the invocation of which causes the system 100 to find repair shops near the home of the insured 106. The second recites the textual information "There are 2 repair shops near WORK," and "Show repair shops near." Adjacent to these pieces of textual information is a button named "Work," the invocation of which navigates the system 100 to display repair shops near the workplace of the insured 106. The third row recites the textual information "Search for repair shops near your." Adjacent to the textual information is a button named "Current Location," the invocation of which causes the system 100 to find repair shops near the current location of the insured 106.

Figure 2F:
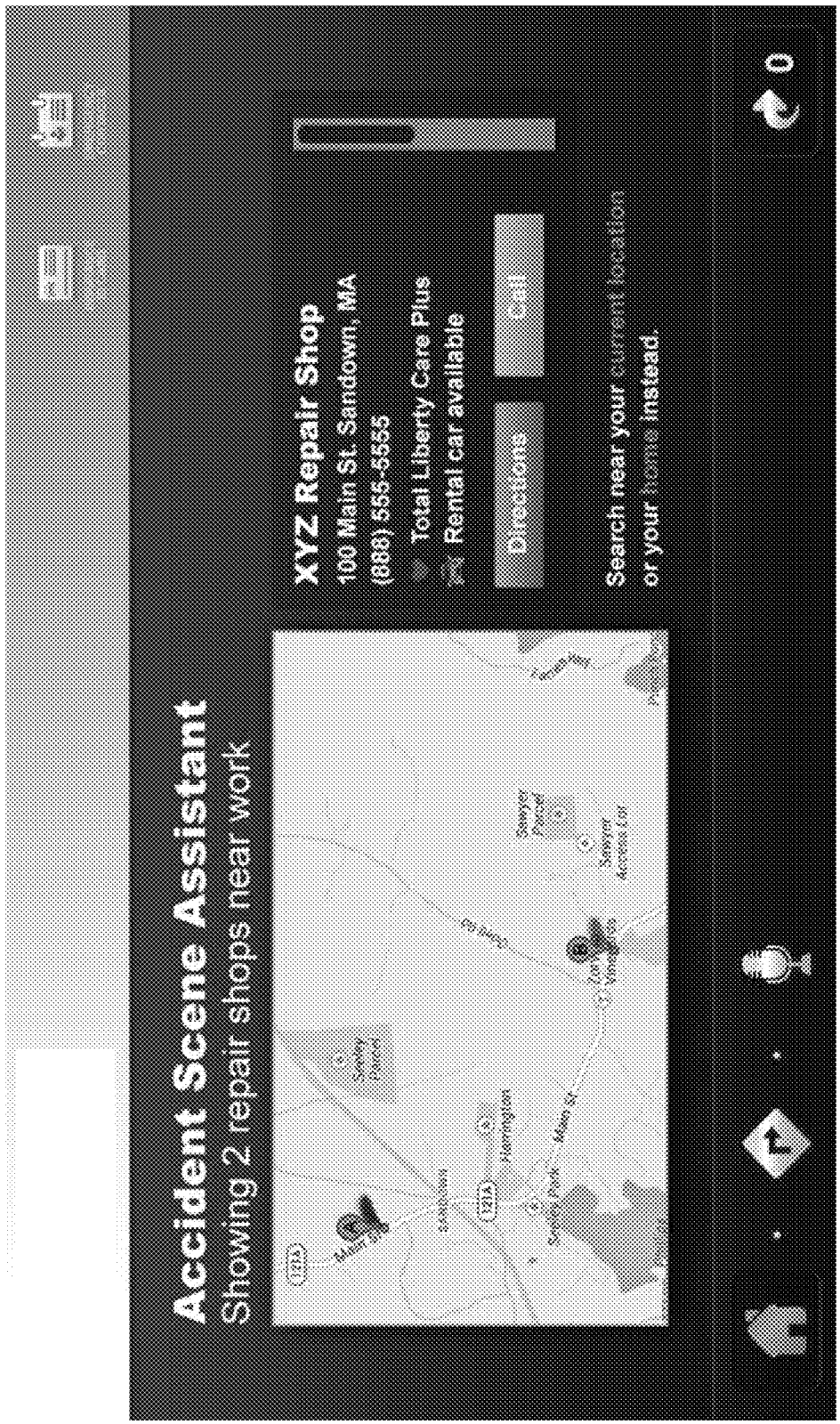

FIG. 2F illustrates the graphical user interface 200F containing the name of the graphic user interface 200F: "Showing 2 repair shops near work." Below the name are two columns. One column displays a map on which the locations of the two repair shops are displayed. In the second column is a scrollable list displaying the name, address, insurance flag, and whether a rental car is available at a repair shop. For example, the graphical user interface 200F recites in the second column "XYZ Repair Shop," "100 Main St. Sandown, Mass.," "(888) 555-5555," a red heart icon, "Total Liberty Care Plus," a car icon, and "Rental car available." The red heart symbol appears next to "Total Liberty Care Plus," indicating an insurance flag providing enhanced insurance services at that particular repair shop. A car icon next to "Rental car available" indicates that a rental car is available to the insured 106 at that particular repair shop. Two buttons are presented, one named "Directions" (which invocation navigates the insured 106 to a user interface that will sequence driving instructions to the repair shop) and the other named "Call" (which invocation causes the system 100 to call the repair shop for the insured 106). A textual user interface element "Search near your current location or your home instead" is presented. The words "current location" and "home" appear in a different color and are selectable to cause the system 100 to respectively search for repair shops near the current location of the insured 106 or near the home of the insured 106. In one embodiment, the graphical user interface 200F appears after selection of the "Work" button on the graphical user interface 200E.

Figure 2G:
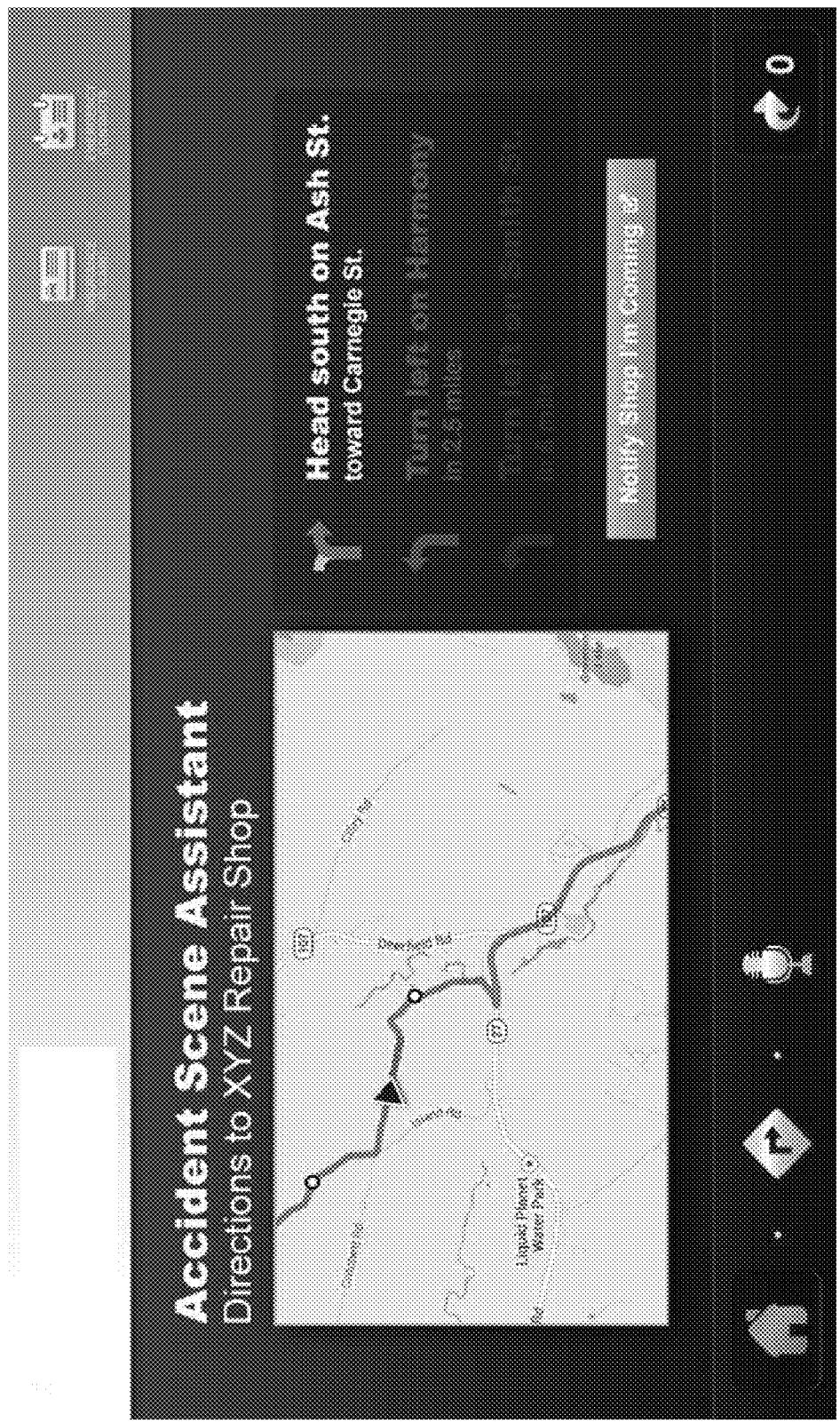

FIG. 2G illustrates the graphical user interface 200G displaying the title of the user interface 200G, namely, "Directions to XYZ Repair Shop." Below are two columns. The first column displays a map showing the current location of the insured 106 and where the insured 106 is heading (via a blue triangle with its apex pointing toward the heading direction). The second column displays a sequence of driving instructions including a green right turn arrow adjacent to the text "Head south on Ash St. toward Carnegie St."; a gray left turn icon adjacent to the text "Turn left on Harmony in 2.5 miles"; and a grayed-out left turn icon adjacent to the text "Turn left on Smith St. in 6 miles." A button named "Notify Shop I'm Coming" appears in the second column, the invocation of which causes the system 100 to notify the repair shop that the insured 106 is coming to the repair shop. In one embodiment, the graphical user interface 200G appears after selection of the "Directions" button on the graphical user interface 200F.

Figure 2H:
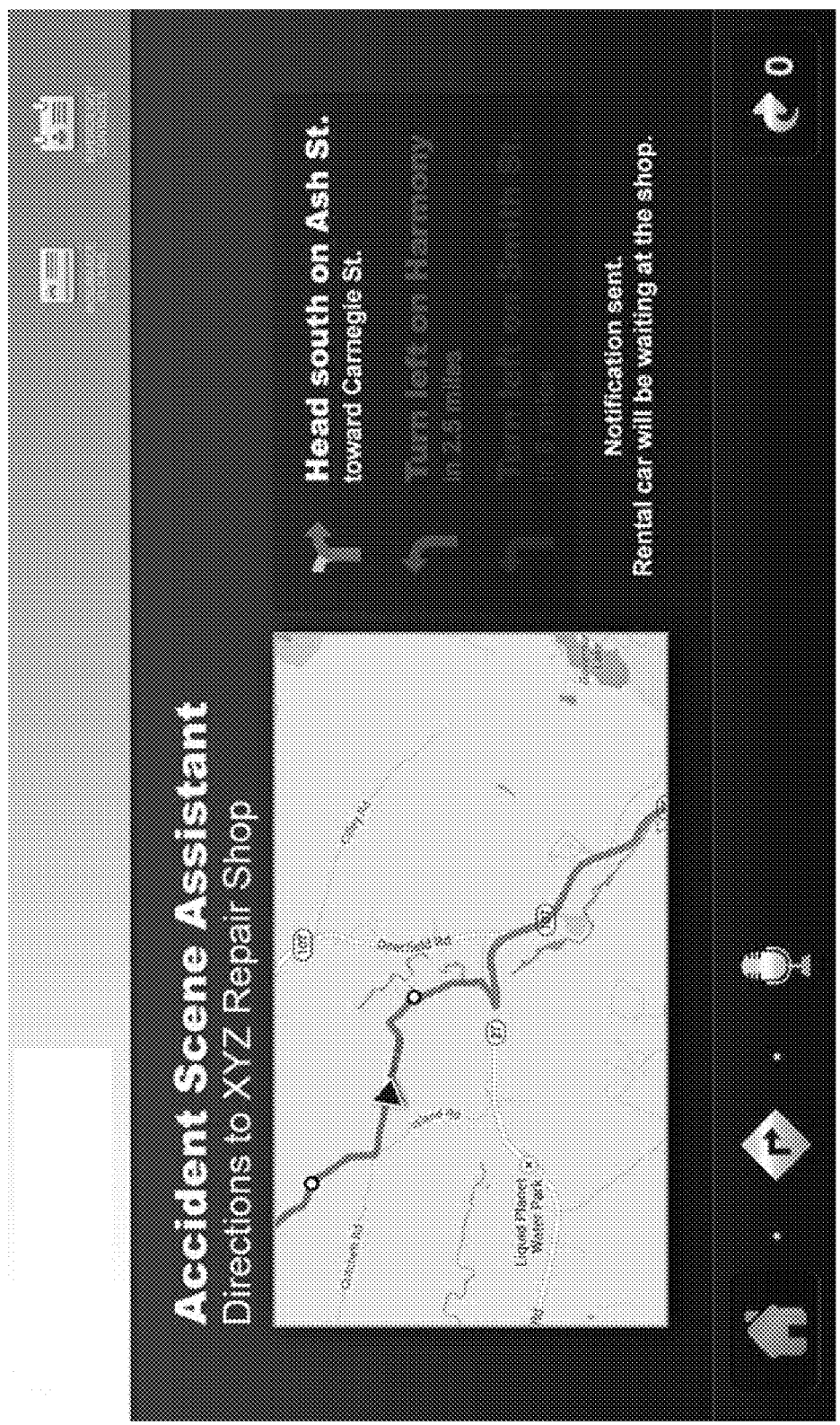

FIG. 2H illustrates the user interface 200H containing changes in the second column; namely, new textual information is provided to the insured 106 as follows: "Notification sent. Rental car will be waiting at the shop." In one embodiment, the graphical user interface 200H appears after selection of the "Notify Shop I'm Coming" button on the graphical user interface 200G.

Figure 2I:
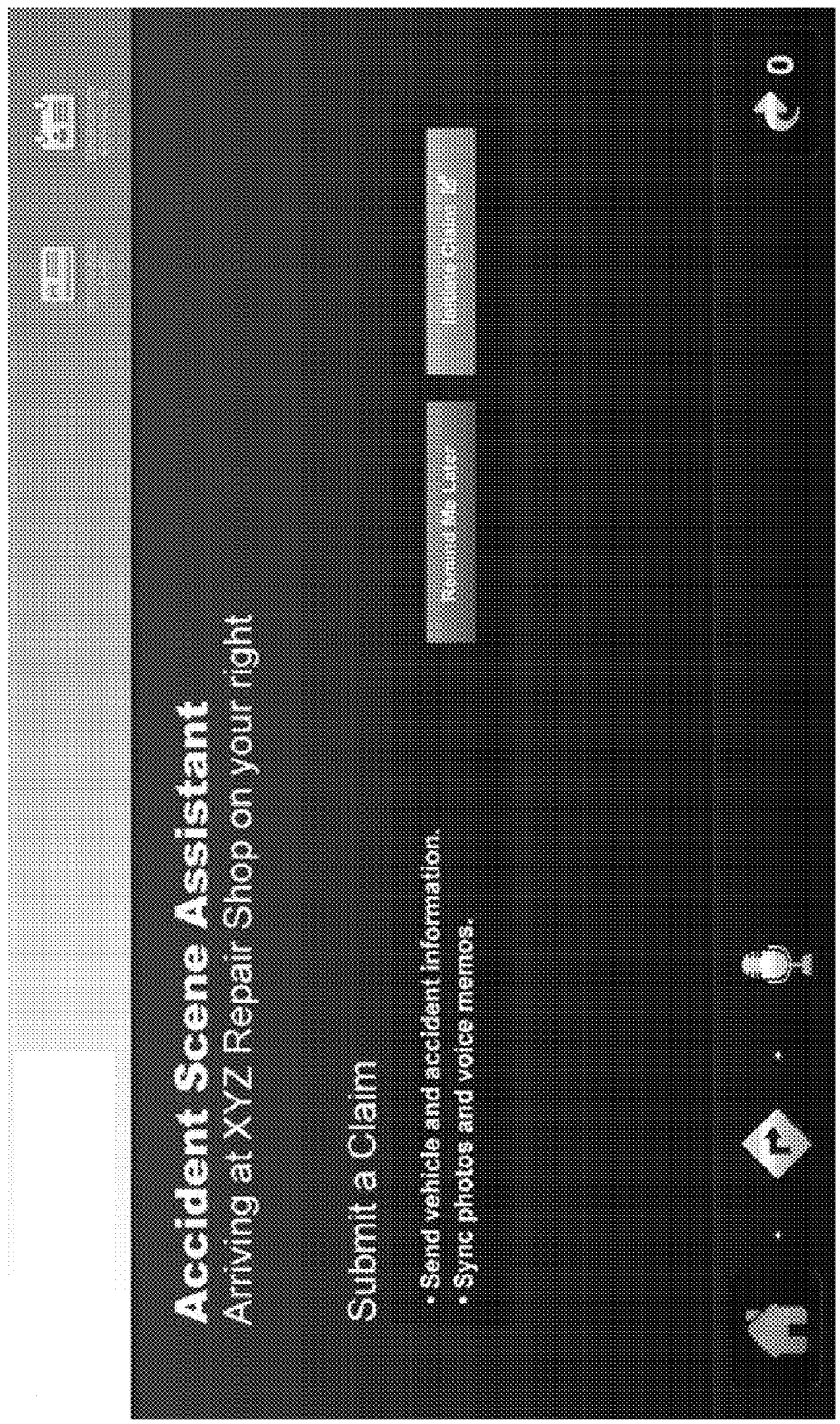

FIG. 2I illustrates the graphical user interface 200I, which displays the title of the graphical user interface 200I: "Arriving at XYZ Repair Shop on your right." A row named "Submit a Claim" appears on the graphical user interface 200I. The row contains textual instructions, namely, "Send vehicle and accident information." and "Sync photos and voice memos." Two buttons appear to the right of the pieces of textual information: a button named "Remind Me Later" and a button named "Initiate Claim."

Figure 2J:
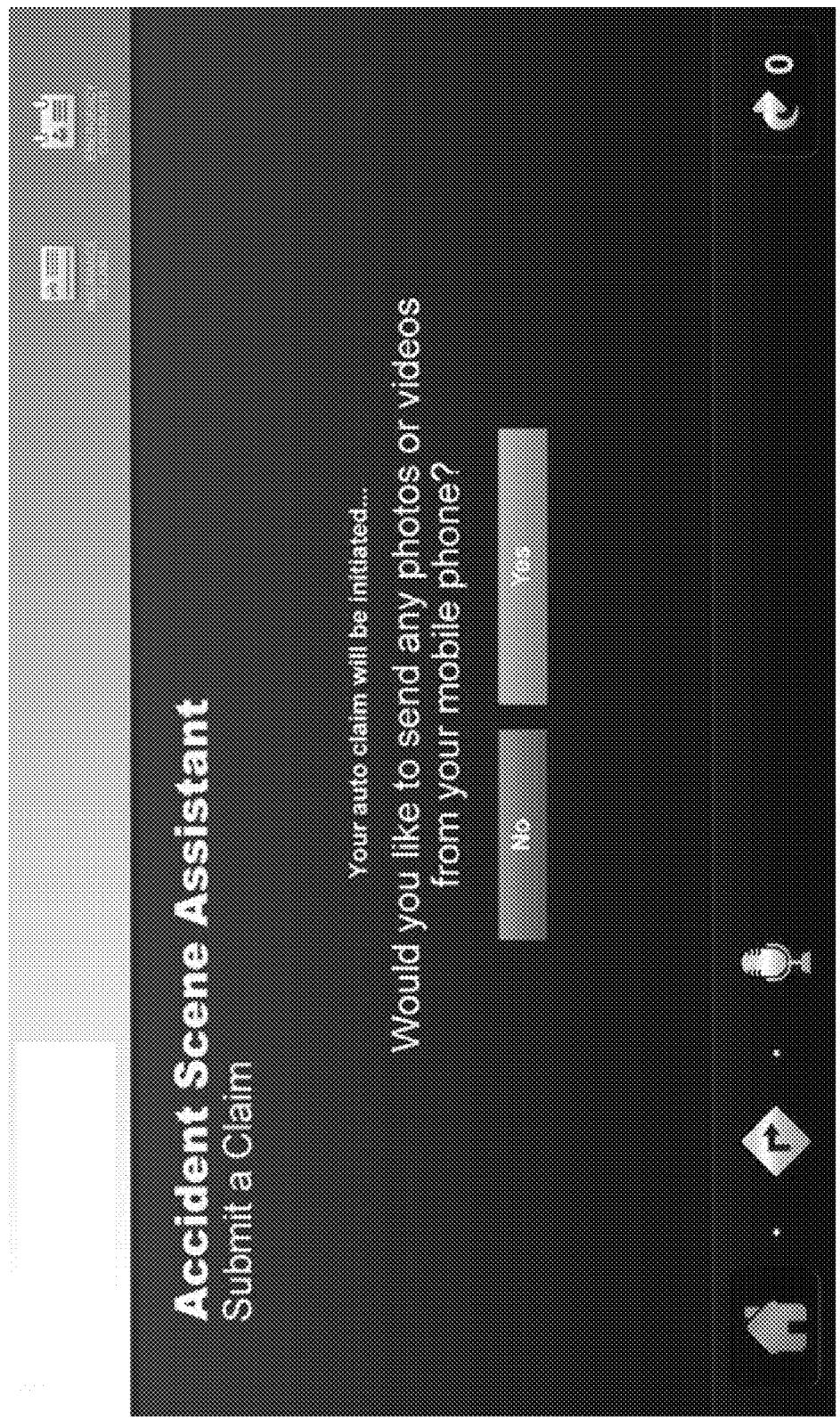

FIG. 2J illustrates the graphical user interface 200J containing the title of the graphical user interface 200J, namely, "Submit a Claim." In the body of the graphical user interface 200J are various textual elements, including "Your auto claim will be initiated . . . " and "Would you like to send any photos or videos from your mobile phone?" Two buttons appear, one named "No" and the other named "Yes." In one embodiment, the graphical user interface 200J appears after selection of the "Submit a Claim" button on the graphical user interface 200I.

Figure 2K:
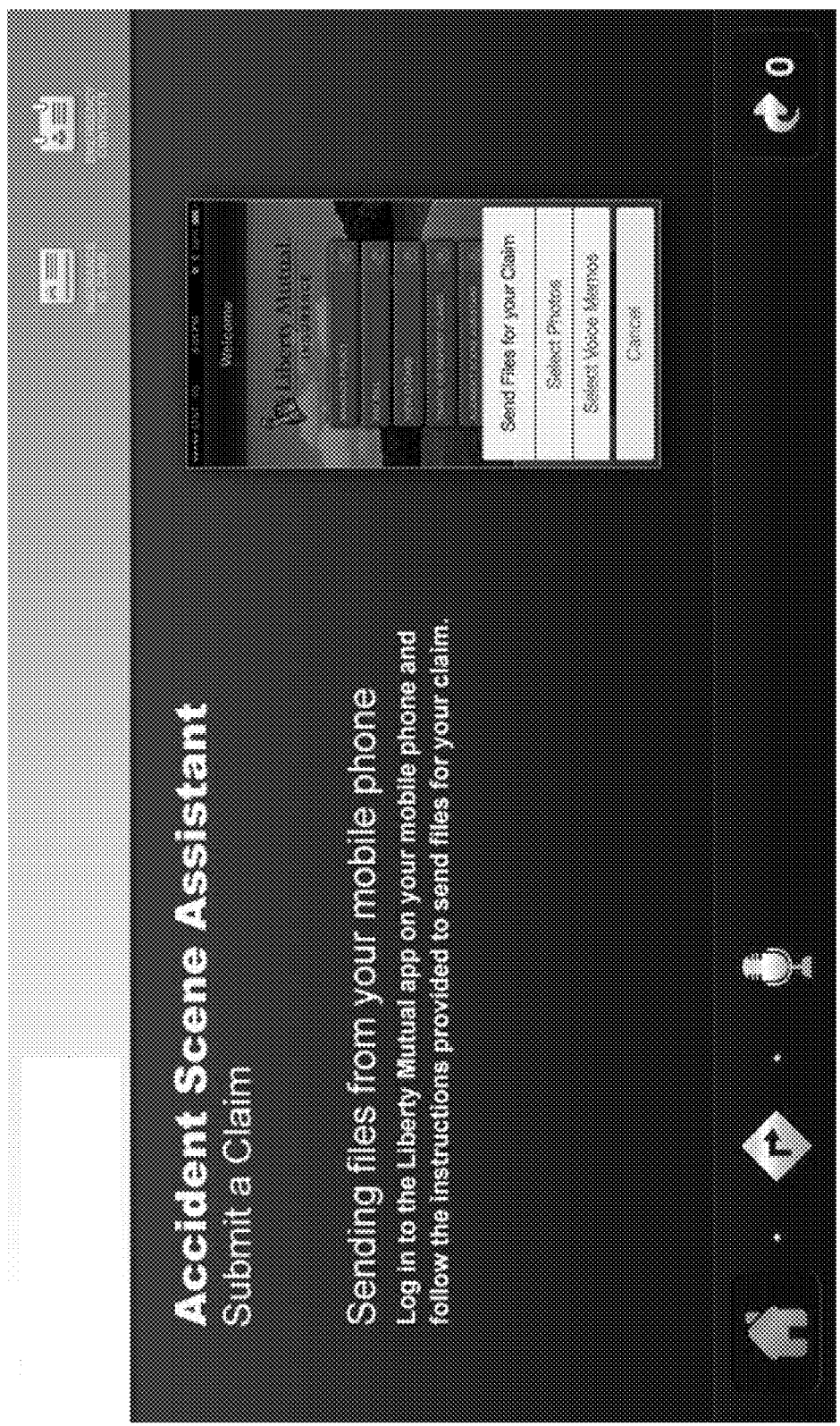

FIG. 2K illustrates a graphical user interface 200K containing the title of the graphical user interface that appears below, namely, "Submit a Claim." Two columns appear. One column recites the textual information "Sending files from your mobile phone" and "Log in to the Liberty Mutual app on your mobile phone and follow the instructions provided to send files for your claim." The second column portrays an app on a mobile phone displaying a graphical user interface named "Send Files for your Claim" and three buttons named "Select Photos"; "Select Voice Memos"; and "Cancel." In one embodiment, the graphical user interface 200K appears after selection of the "Yes" button on the graphical user interface 200J.

Figure 2L:
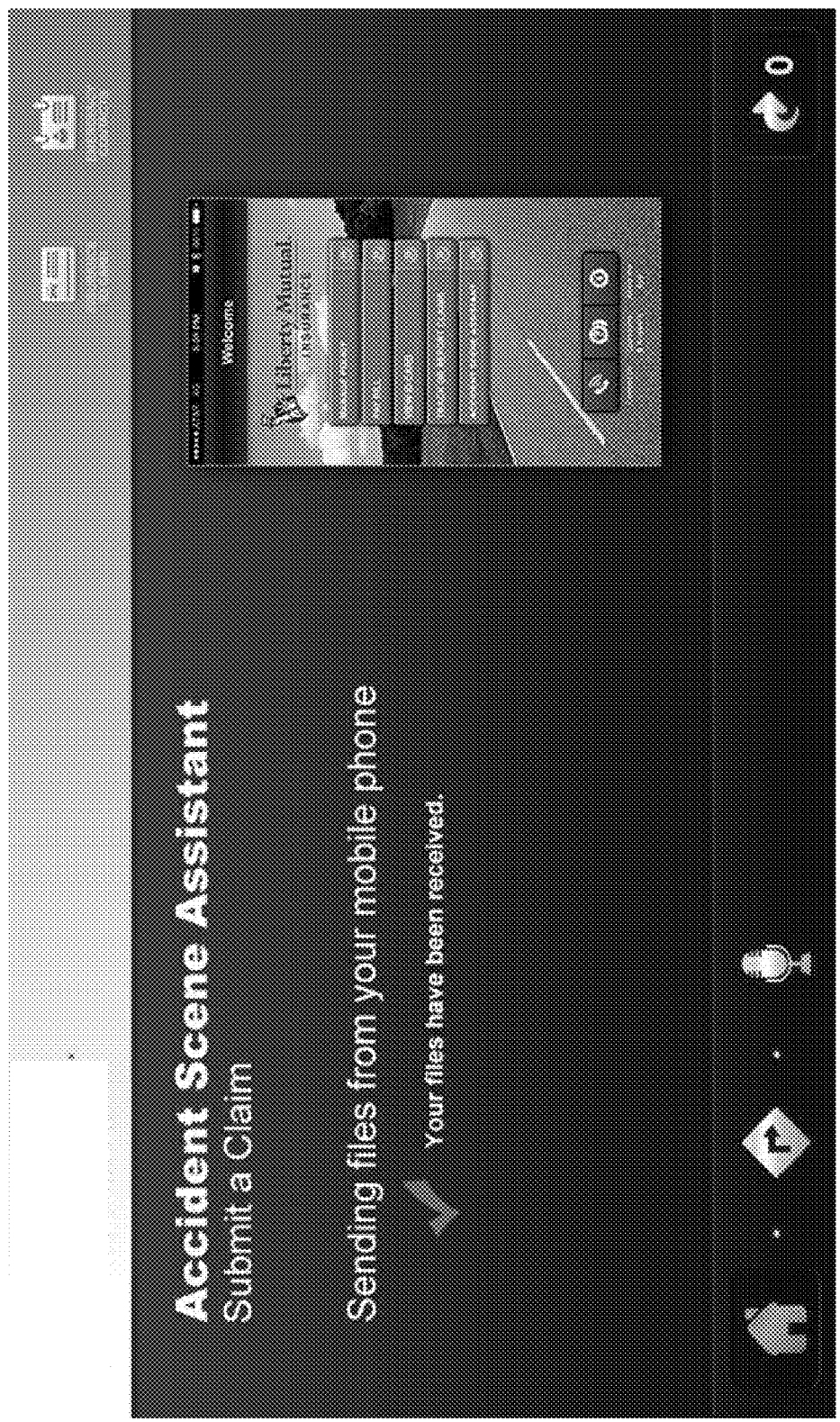

FIG. 2L illustrates the graphical user interface 200L reciting the title of the graphical user interface 200L, namely, "Submit a Claim." Two columns appear in the body of the graphical user interface 200L. The first column recites the textual information "Sending files from your mobile phone." A green checkmark icon appears adjacent to the icon along with the textual information "Your files have been received." The second column portrays various apps on a mobile phone. In one embodiment, the graphical user interface 200L appears after selection of the "Select Photos" or "Select Voice Memos" buttons on the graphical user interface 200K.

Figure 2M:
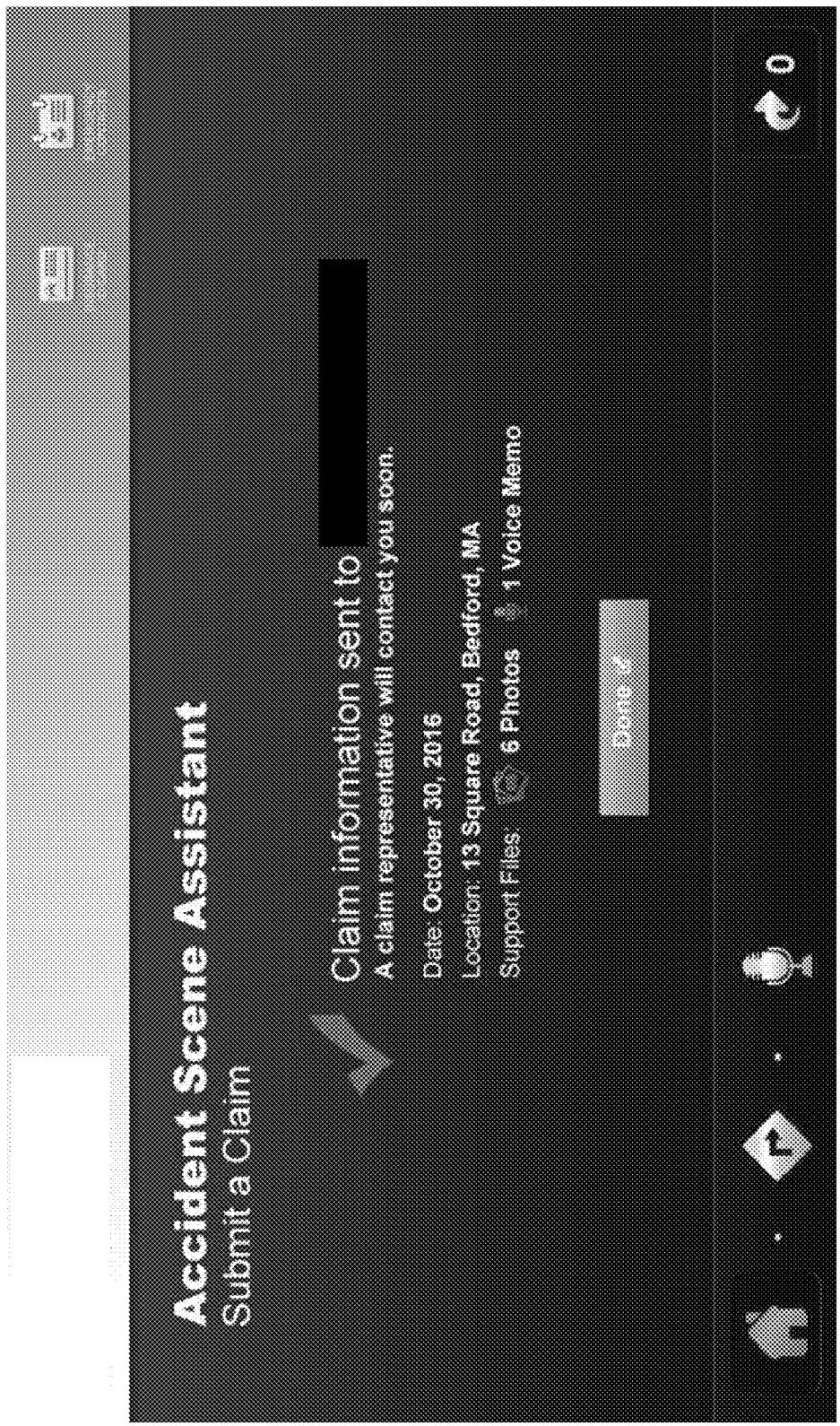

FIG. 2M illustrates the graphical user interface 200M reciting the title of the graphical user interface, namely, "Submit a Claim." The body of the graphical user interface 200M includes various textual information such as "Claim information sent to [a particular insurer]"; "A claim representative will contact you soon."; "Date: Oct. 30, 2016"; "Location: 13 Square Road, Bedford, Mass."; and "Support Files: 6 Photos 1 Voice Memo." A button named "Done" appears below the body of the graphical user interface 200M.

Figure 3:
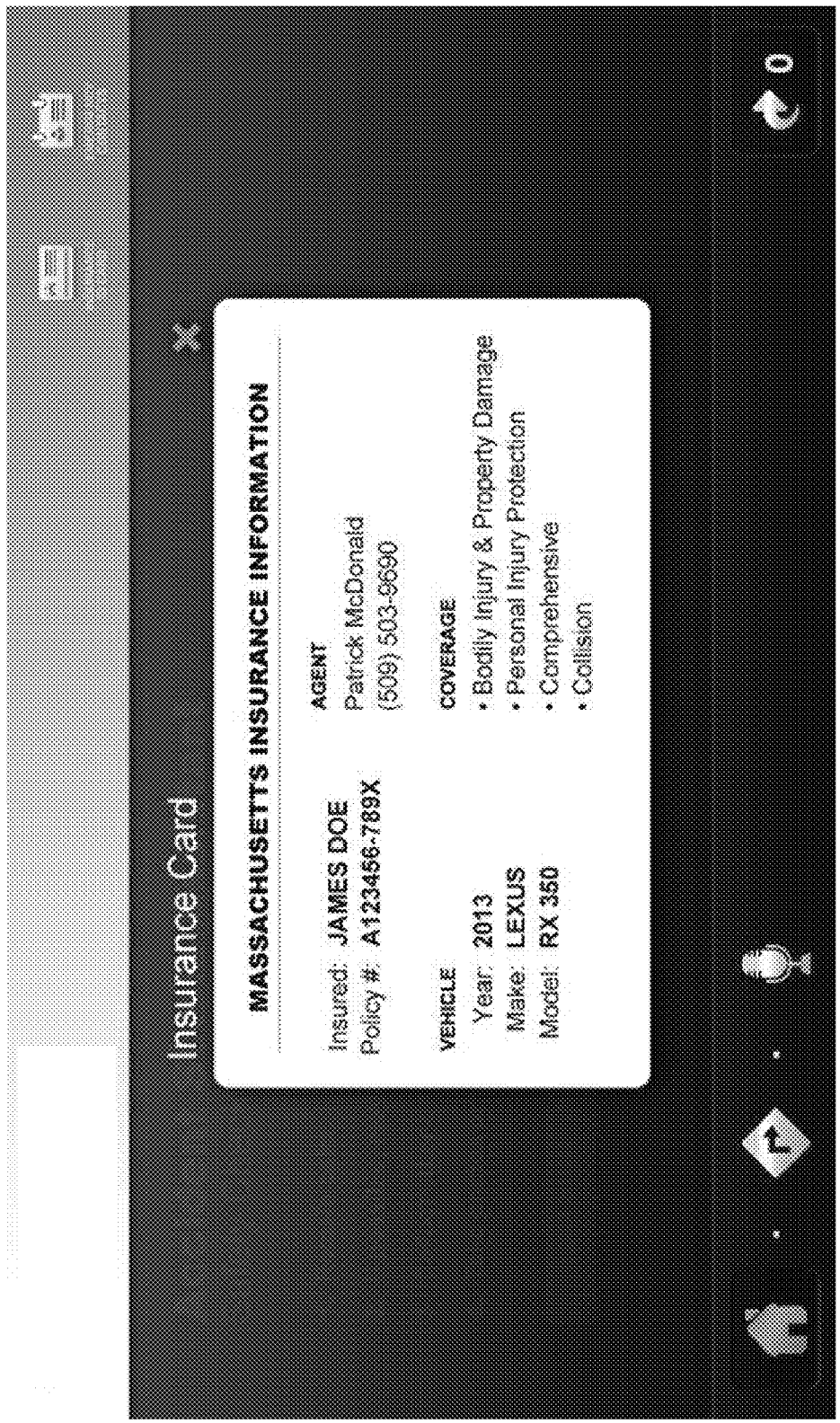
FIG. 3 is a pictorial diagram illustrating another archetypical graphical user interface displayed on an in-vehicle display, which is a piece of hardware.

When the insured 106 invokes the insurance card module 112 on the in-vehicle display 102A, the graphical user interface 300 appears. See FIG. 3. At the top of the graphical user interface 300 is the title of the graphical user interface 300, namely, "Insurance Card." To the right of the graphical user interface 300 is an X whose selection causes the graphical user interface 300 to be dismissed by the system 100. The body of the graphical user interface 300 includes the text "Massachusetts Insurance Information." A line user interface element separates further information appearing below. The graphical user interface 300 recites "Insured: JAMES DOE"; "Policy #: A123456-789X"; "Vehicle"; "Year: 2013"; "Make: LEXUS"; "Model: RX 350"; "Agent"; "Patrick McDonald"; "(509) 503-9690"; "Coverage"; "Bodily Injury & Property Damage"; "Personal Injury Protection"; "Comprehensive"; and "Collision."

When the insured 106 uses the in-vehicle display 102A to invoke either the traffic monitor module 114 or the weather monitor module 116, pieces of graphical user interface 400A-400G may be presented by FIGS. 4A-4G. These pieces of graphical user interface 400A-400G appear in three portions: top, body, and bottom. The top portion contains an icon named "INSURANCE ID CARD" appearing as a stylized business card, which invocation causes the system 100 to navigate the insured 106 to the insurance card module 112. Another icon named "EMERGENCY CONTACTS" appears as a Rolodex card, which invocation causes the system 100 to navigate the insured 106 to information connected with emergency contact information. The body almost always contains the title of the selected the traffic monitor module 114 or the weather monitor module 116, namely, "Traffic & Weather Monitor," and a traffic or weather warning, such as a yellow triangle icon at the center of which is an exclamation point adjacent to the text "Severe Weather Alert for Huntsville, Tex." The bottom portion includes an icon appearing as a house with a chimney, the selection of which causes the system 100 to bring the insured 106 back to the screen of the graphical user interface 102B. Another icon appears as a traffic sign with a rightward pointing arrow, which invocation causes the system 100 to present a map on the in-vehicle display 102A. A third icon appears as a microphone, which invocation causes the system 100 to turn on the speakers of the vehicle 104 through which an audible user interface is presented. At the far right end of the bottom portion, a user interface element appears as a box in which a curved arrow is adjacent to a number, which selection causes the system 100 to navigate the insured 106 back to a previously navigated screen on the in-vehicle display 102A. Because these user interface elements are repeated throughout the pieces of graphical user interface 400A-400G, will not be further discussed for the purpose of brevity.

Figure 4A:
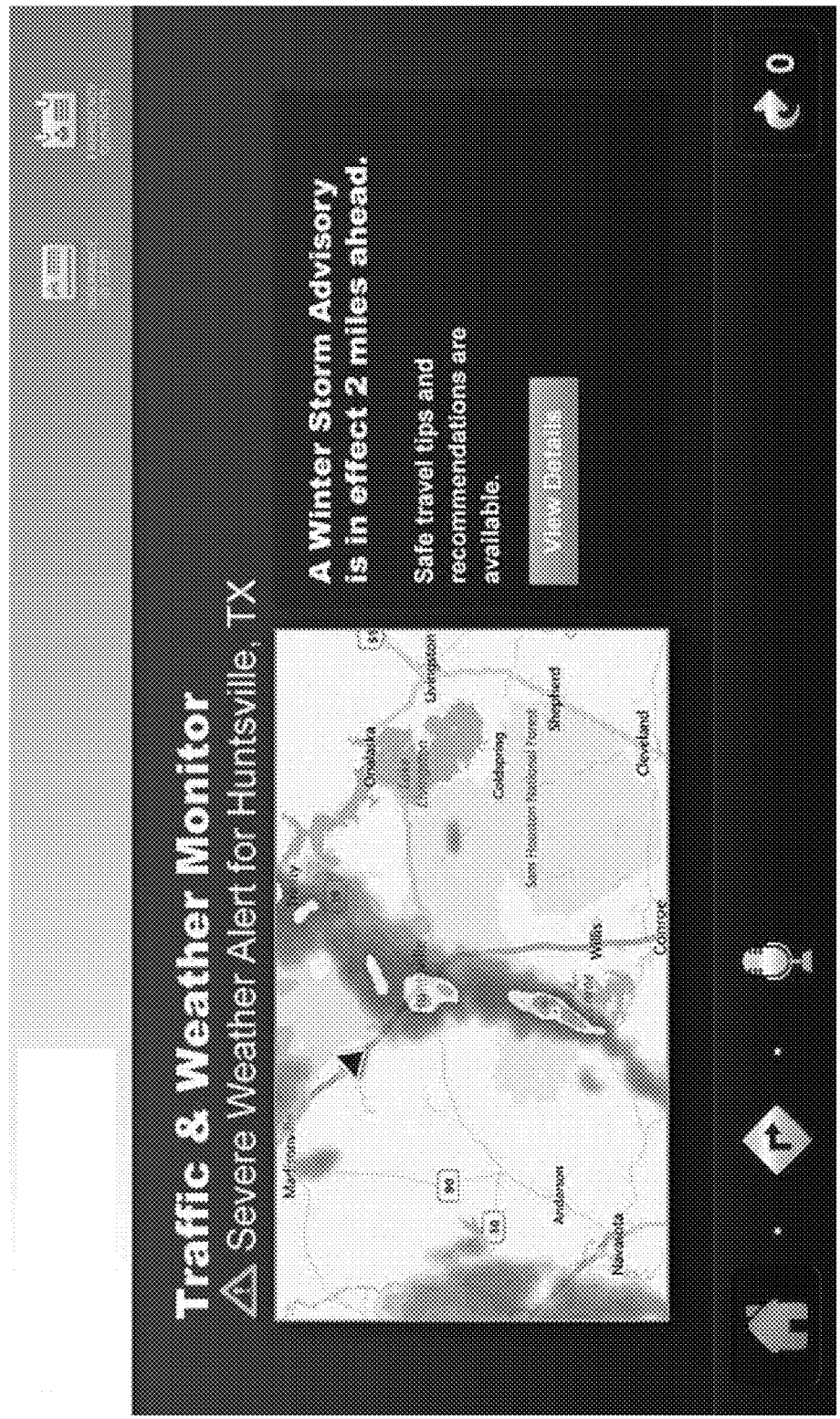
FIGS. 4A-4G are pictorial diagrams illustrating pieces of a further archetypical graphical user interface displayed on an in-vehicle display, which is a piece of hardware.

The graphical user interface 400A is displayed at FIG. 4A. Two columns appear in the body portion. One column displays a map showing the current location of the insured 106 as well as a weather pattern. The second column includes various textual information, such as "A Winter Storm Advisory is in effect 2 miles ahead." and "Safe travel tips and recommendations are available." A button named "View Details" appears below these pieces of textual information.

Figure 4B:
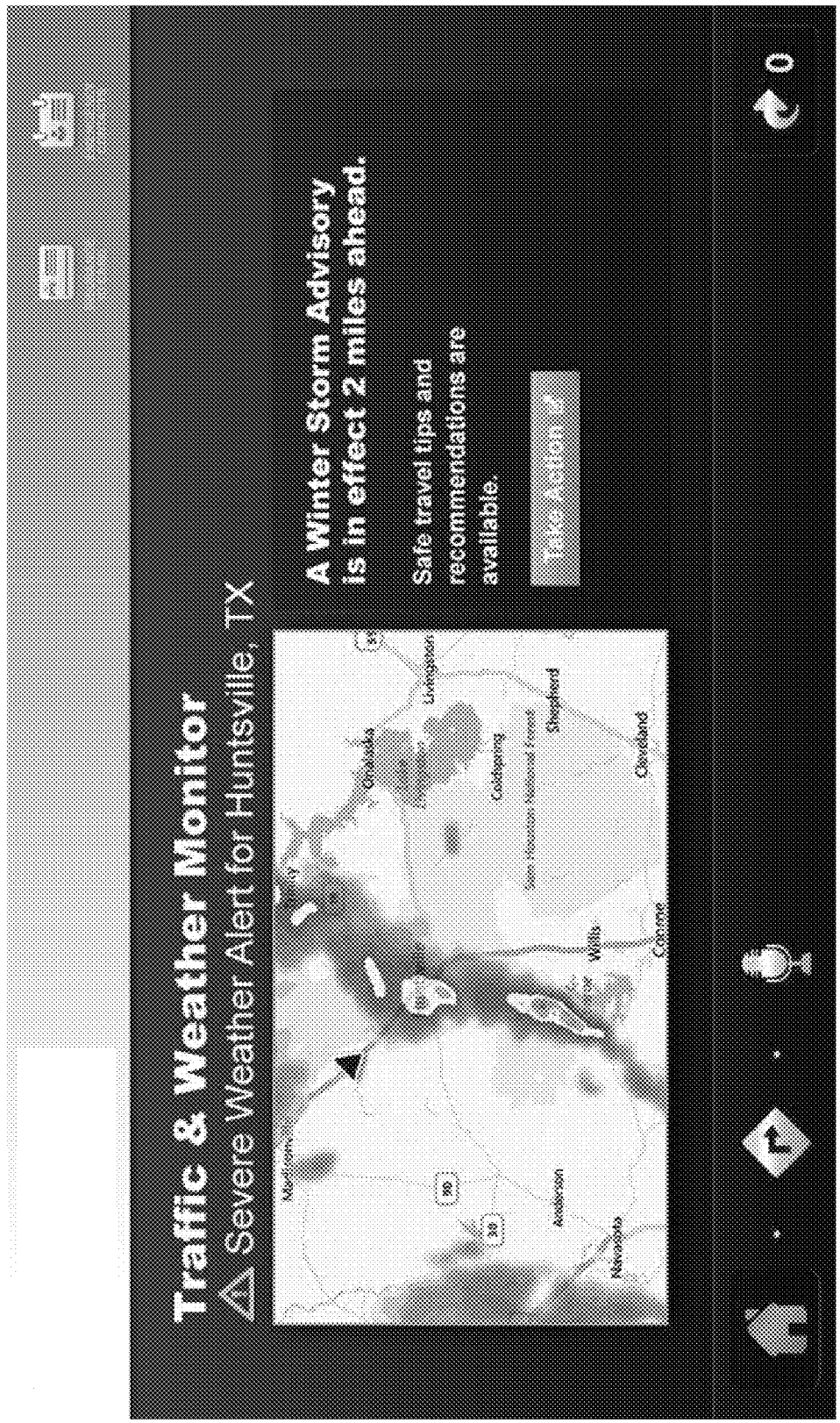

FIG. 4B illustrates the graphical user interface 400B containing elements similar to those discussed with respect to FIG. 4A. Two columns appear in the body portion. One column displays a map showing the current location of the insured 106 as well as a weather pattern. The second column includes various textual information, such as "A Winter Storm Advisory is in effect 2 miles ahead." and "Safe travel tips and recommendations are available." A button named "Take Action" appears below these pieces of textual information.

Figure 4C:
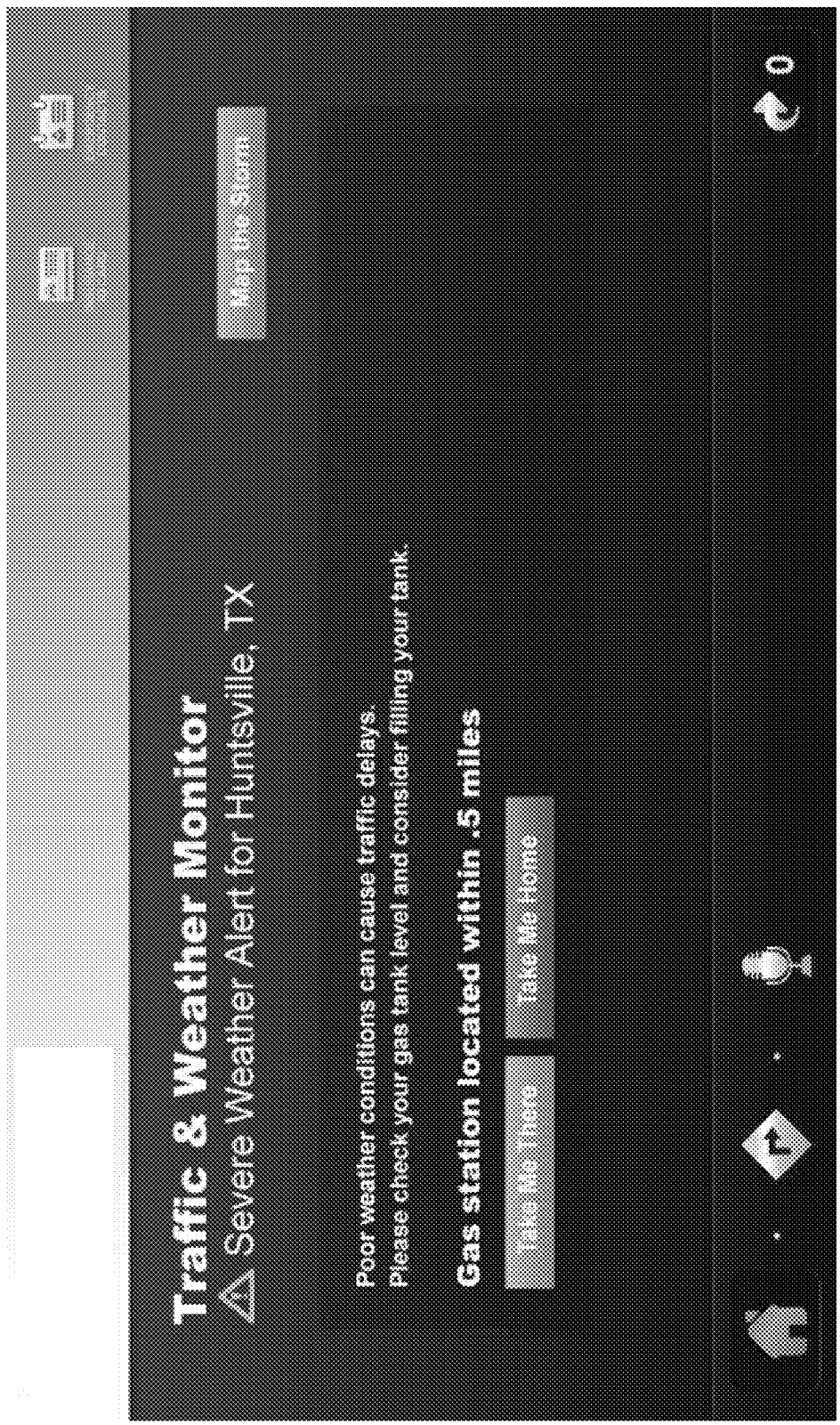

FIG. 4C illustrates the graphical user interface 400C, which presents a button named "Map the Storm" to the right of the screen, which invocation causes the system 100 to provide the map of the current location of the insured 106 and the storm. In the body portion, textual information is provided reciting, "Poor weather conditions can cause traffic delays"; "Please check your gas tank level and consider filling your tank." and "Gas station located within 0.5 miles." Two buttons appear, one named "Take Me There," which invocation causes the system 100 to navigate the insured 106 to the gas station, and the other button named "Take Me Home," which invocation causes the system 100 to navigate the insured 106 back to his home.

Figure 4D:
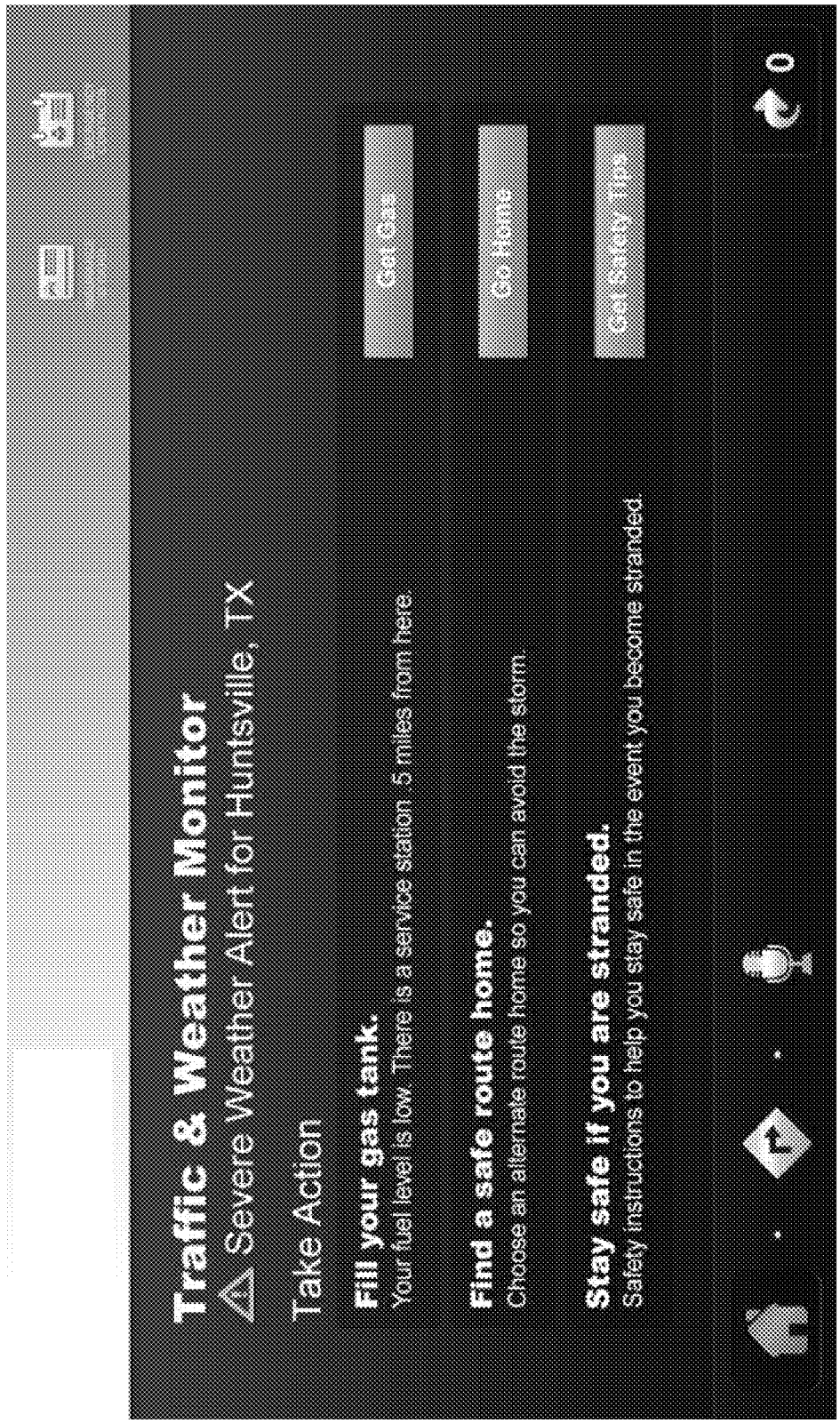

FIG. 4D illustrates the graphical user interface 400D presenting the title of the graphical user interface 400D, "Take Action." Below are three rows. The first row recites the textual information "Fill your gas tank."; "Your fuel level is low."; and "There is a service station 0.5 miles from here." A button named "Get Gas" appears next to the pieces of textual information, which invocation causes the system 100 to navigate the insured 106 to the closest service station. The second row recites the textual information "Find a safe route home."; and "Choose an alternate route home so you can avoid the storm." Adjacent to the pieces of textual information is a button named "Go Home," which invocation causes the system 100 to navigate the insured 106 back to his home. The third row recites the textual information "Stay safe if you are stranded." and "Safety instructions to help you stay safe in the event you become stranded." A button named "Get Safety Tips" appears to the right of the pieces of textual information, which invocation causes a list of safety tips to appear. In one embodiment, the graphical user interface 400D appears after selection of the "Take Action" button on the graphical user interface 400B.

Figure 4E:
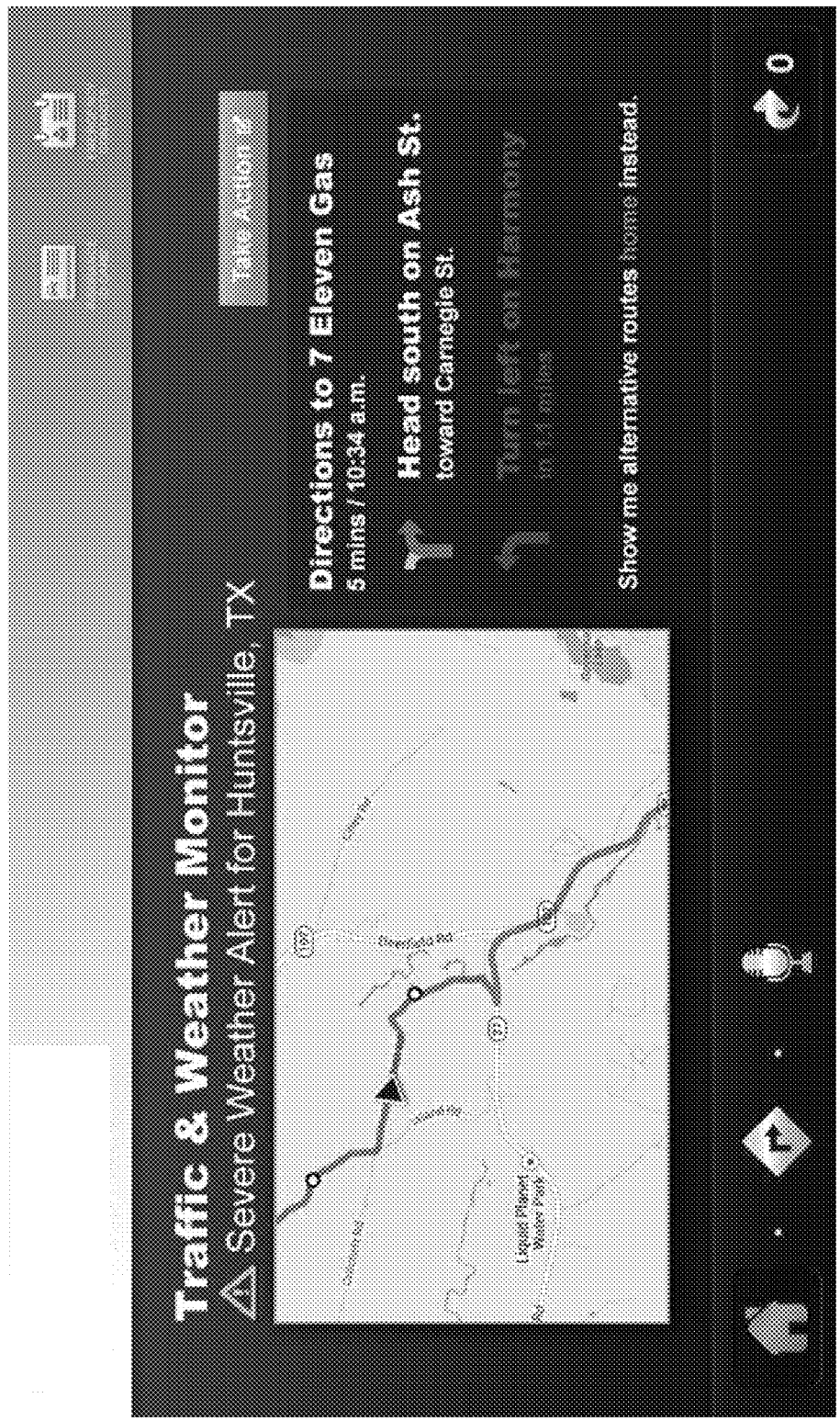

FIG. 4E illustrates the graphical user interface 400E containing a button named "Take Action", which appears rightward of the screen, the selection of which causes the system 100 to navigate the insured 106 to the graphical user interface 400D of FIG. 4D. Below, two columns appear. The first column portrays the current location of the insured 106 on a map and the direction toward which he is heading. The second column provides sequenced driving instructions to the closest service station. The instructions include "Directions to 7 Eleven Gas, 5 mins/10:34 a.m."; a green rightward icon is adjacent to the text "Head south on Ash St. toward Carnegie St."; and a gray leftward icon appears next to the text "Turn left on Harmony in 1.1 miles." Textual information appears below: "Show me alternative routes home instead." The word "home" is indicated in a different color and it can be selected to cause the system 100 to navigate the insured 106 to his home instead. In one embodiment, the graphical user interface 400E appears after selection of the "Take Me There" button on the graphical user interface 400C or the "Get Gas" button on the graphical user interface 400D.

Figure 4F:
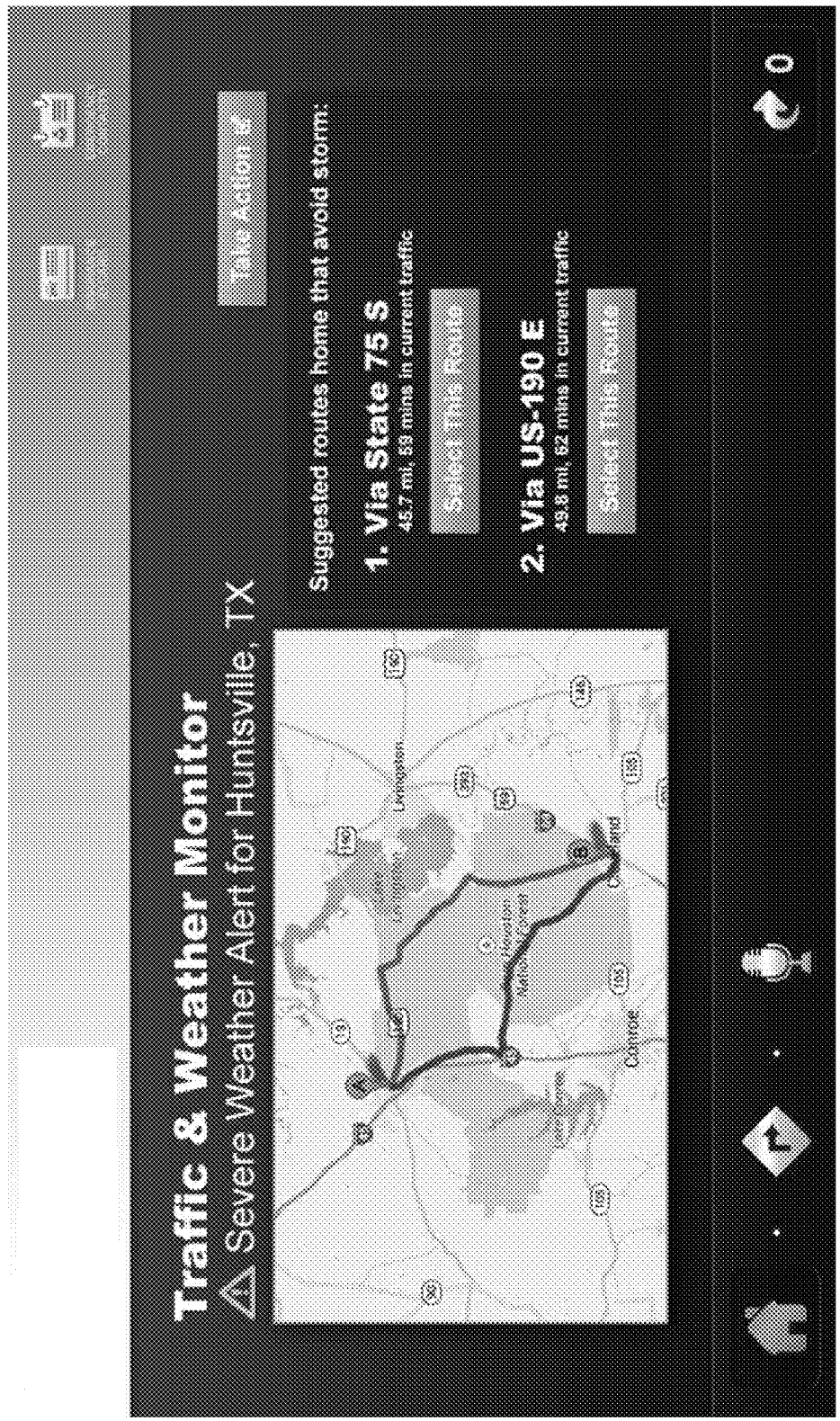

FIG. 4F illustrates the graphical user interface 400F containing a button named "Take Action", which appears rightward of the screen, the selection of which causes the system 100 to navigate the insured 106 to the graphical user interface 400D of FIG. 4D. Appearing below are two columns. The first column displays a map with various alternative routes that the insured 106 may take to avoid the storm. The right column recites the textual information "Suggested routes home that avoid storm:" Two options appear. One option recites, "1. Via State 75 S" and "45.7 mi, 59 mins in current traffic." A button appears below named "Select This Route." The second option recites,"2. Via US-190 E" and "49.8 mi, 62 mins in current traffic." Another button named "Selection This Route" appears below the second option.

Figure 4G:
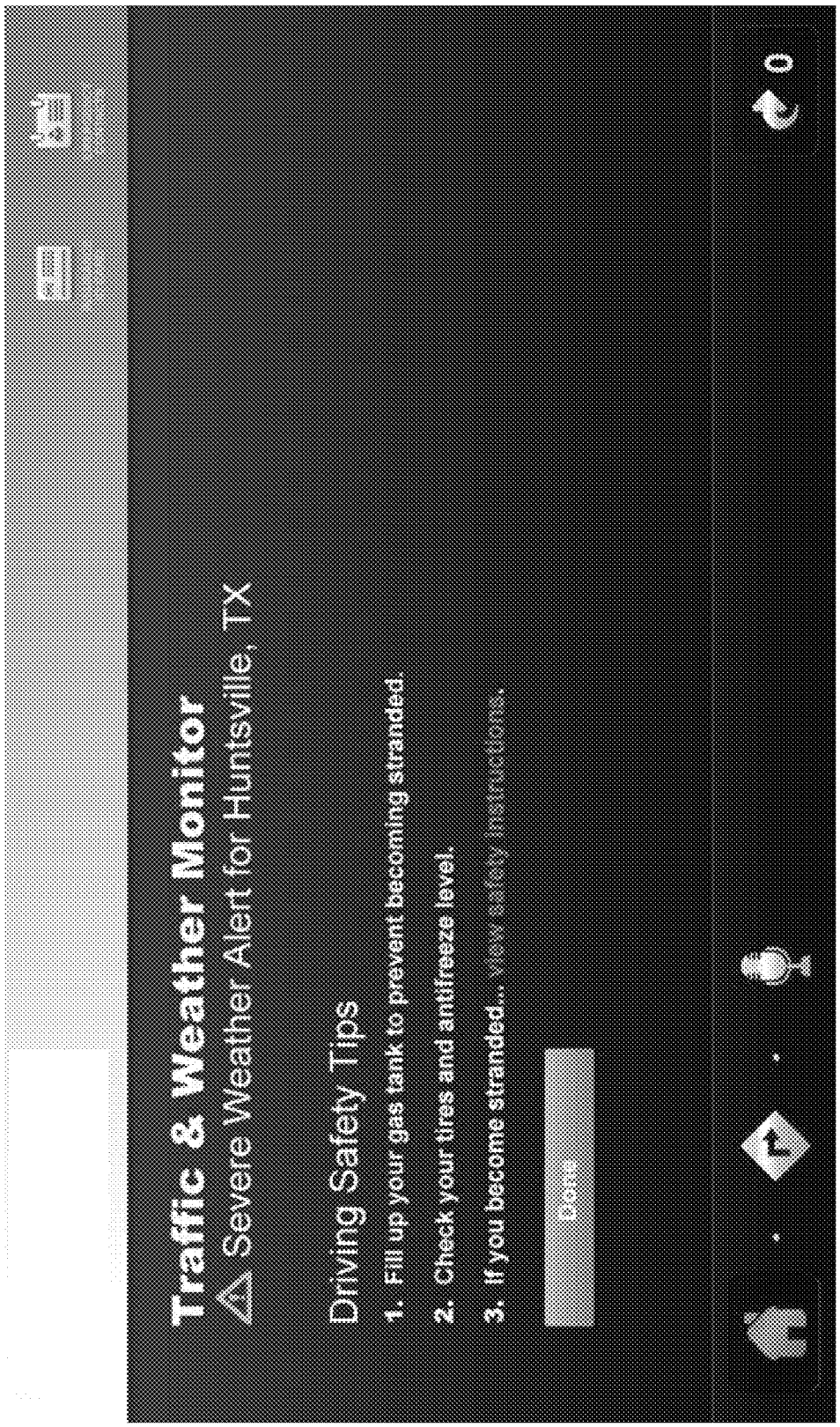

FIG. 4G illustrates the graphical user interface 400G. In the body of the graphical user information 400G, textual information recites, "Driving Safety Tips"; "1. Fill up your gas tank to prevent becoming stranded."; "2. Check your tires and antifreeze level."; and "3. If you become stranded . . . view safety instructions." A button named "Done" appears at the bottom of the graphical user interface 400G. In one embodiment, the graphical user interface 400G appears after selection of the "View Details" button on the graphical user interface 400A or the "Get Safety Tips" button on the graphical user interface 400D.

FIGS. 5A-5E illustrate pieces of graphical user interface 500A-500E, which may be presented when the drive to savings module 118 is selected. These pieces of graphical user interface 200A-200M appear in two portions: top and body. The top portion contains an icon named "TRAFFIC & WEATHER" appearing graphically as a cloud under which is a bolt of lightning. Selection of the "TRAFFIC & WEATHER" icon causes the system 100 to navigate the insured 106 to the traffic monitor module 118 and the weather monitor module 116. Another icon named "INSURANCE ID CARD" appears as a stylized business card, which invocation causes the system 100 to navigate the insured 106 to the insurance card module 112. Another icon named "EMERGENCY CONTACTS" appears as a Rolodex card, which invocation causes the system 100 to navigate the insured 106 to information connected with emergency contacts. The body almost always contains the title of the selected drive to savings module 118, namely, "Drive to Savings." Because these user interface elements are repeated throughout the pieces of graphical user interface 500A-500E, will not be further discussed for the purpose of brevity.

Figure 5A:
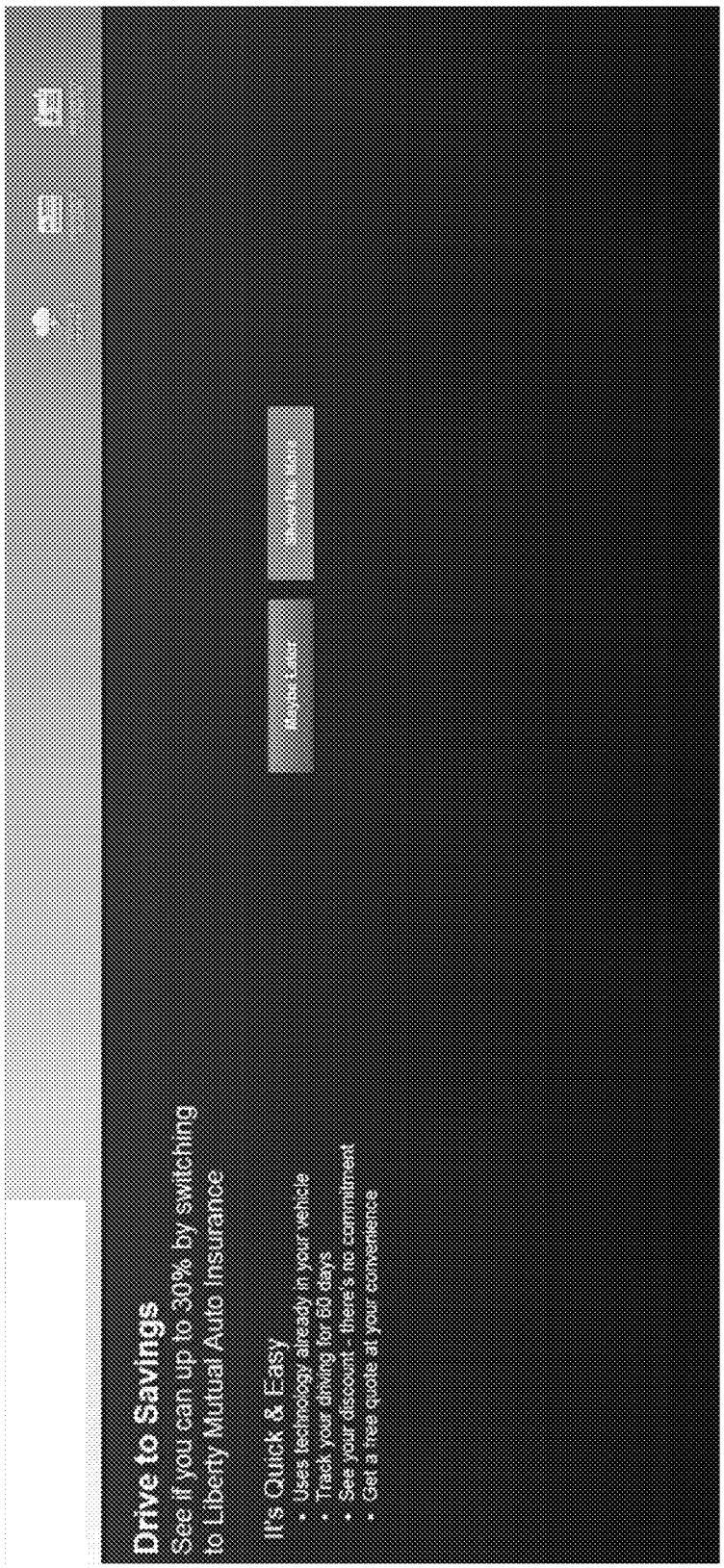
FIGS. 5A-5E are pictorial diagrams illustrating pieces of an additional archetypical graphical user interface displayed on an in-vehicle display, which is a piece of hardware.

FIG. 5A illustrates the graphical user interface 500A, which recites the following pieces of textual information: "See if you can save up to 30% by switching to Liberty Mutual Auto Insurance"; "It's Quick & Easy"; "Uses technology already in your vehicle"; "Track your driving for 60 days"; "See your discount—there's no commitment"; and "Get a free quote at your convenience." Two buttons appear to the right of the screen. One button is named "Maybe Later." The other button is named "Show Me More."

Figure 5B:
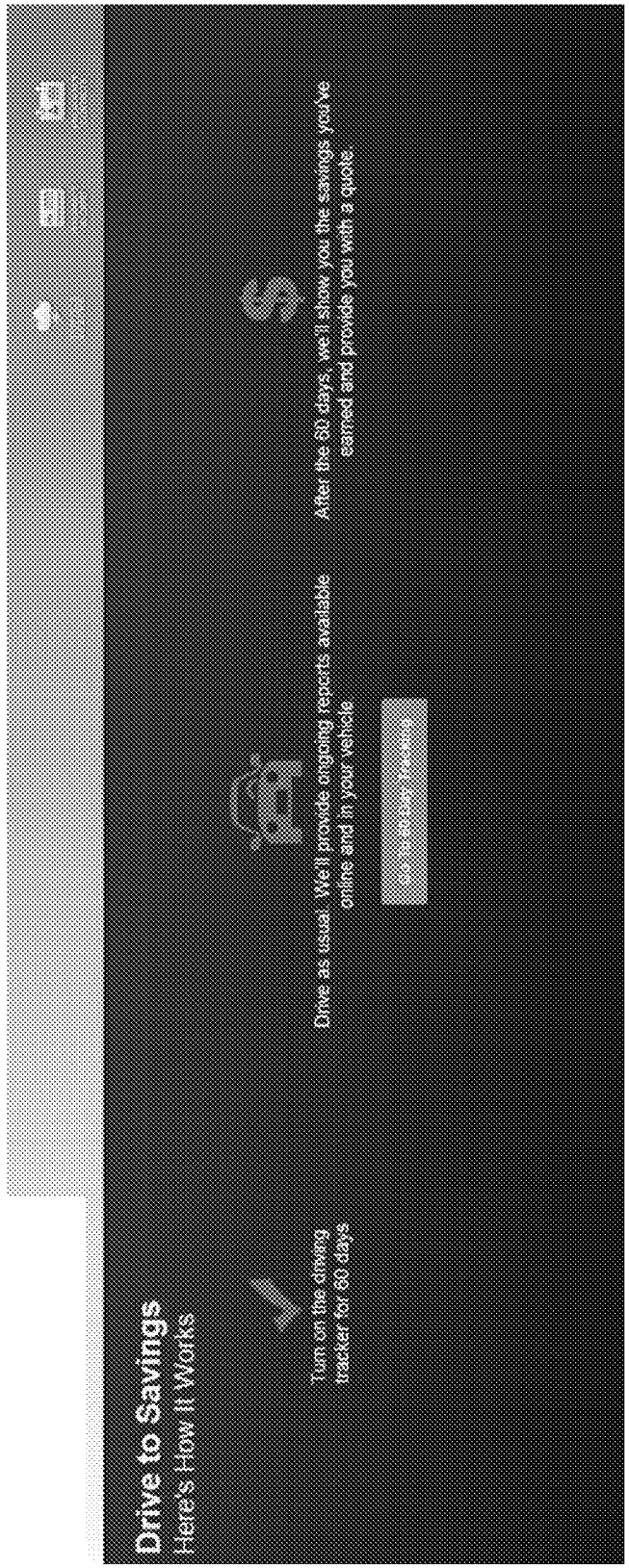

FIG. 5B illustrates the graphical user interface 500B. Pieces of textual information appear in the graphical user interface 500B, including "Here's How It Works." A green icon appears as a checkmark. Below the green checkmark icon is the textual information "Turn on the driving tracker for 60 days." A green car icon appears to the right. Below the green car icon is the textual information "Drive as usual." and "We'll provide ongoing reports available online and in your vehicle." Appearing below is a button named "Go To 60 Day Tracking." Rightward a green dollar sign icon appears. Below is the textual information "After the 60 days, we'll show you the savings you've earned and provide you with a quote."

Figure 5C:
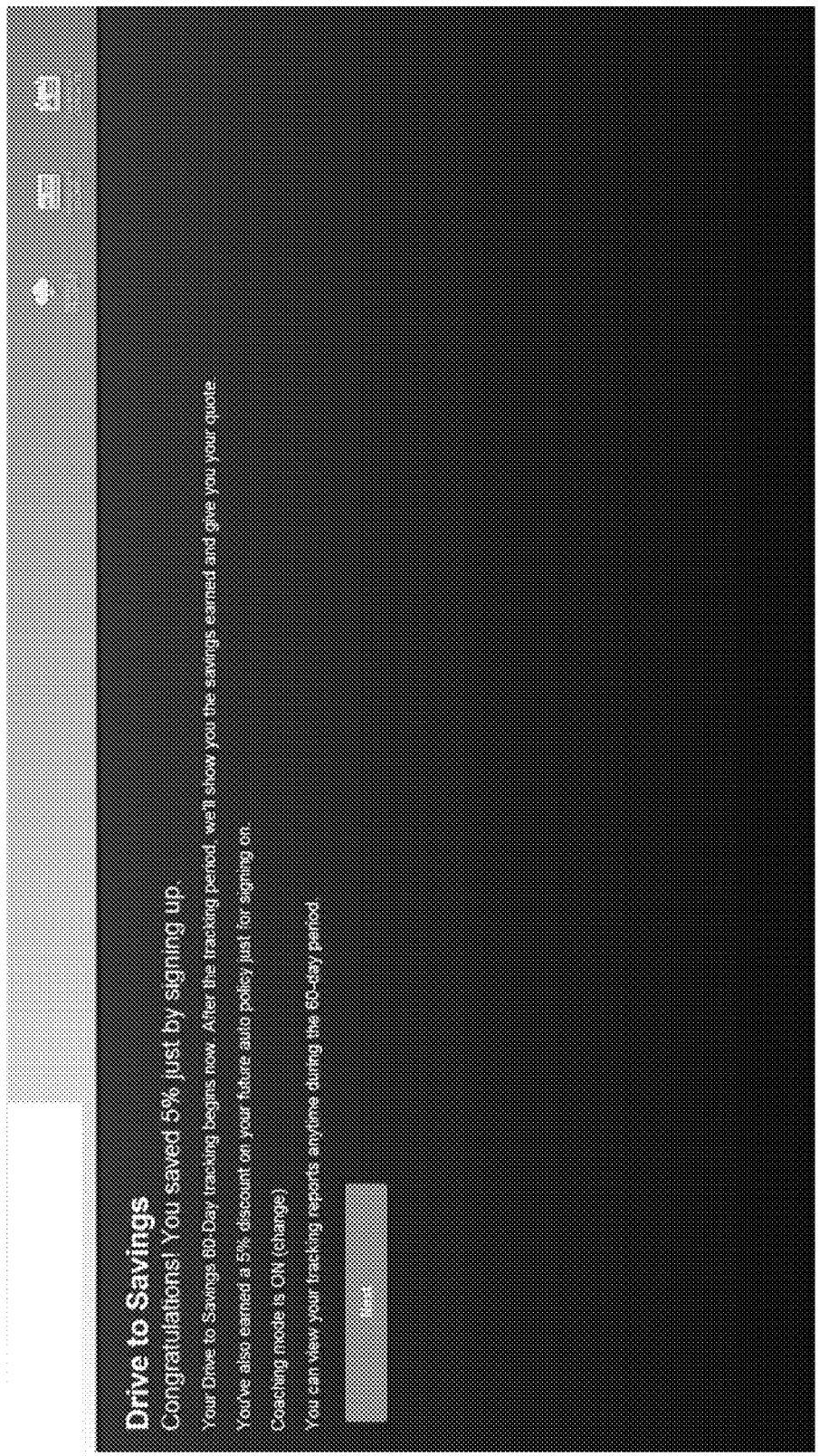

FIG. 5C illustrates the graphical user interface 500C, containing pieces of textual information which are presented to the insured 106, including "Congratulations! You saved 5% just by signing up."; "Your Drive to Savings 60-Day tracking begins now."; "After the tracking period, we'll show you the savings earned and give you your quote."; "You've also earned a 5% discount on your future auto policy just for signing on."; "Coaching mode is ON (change) "; and "You can view your tracking reports anytime during the 60-day period." A button named "Next" appears.

Figure 5D:
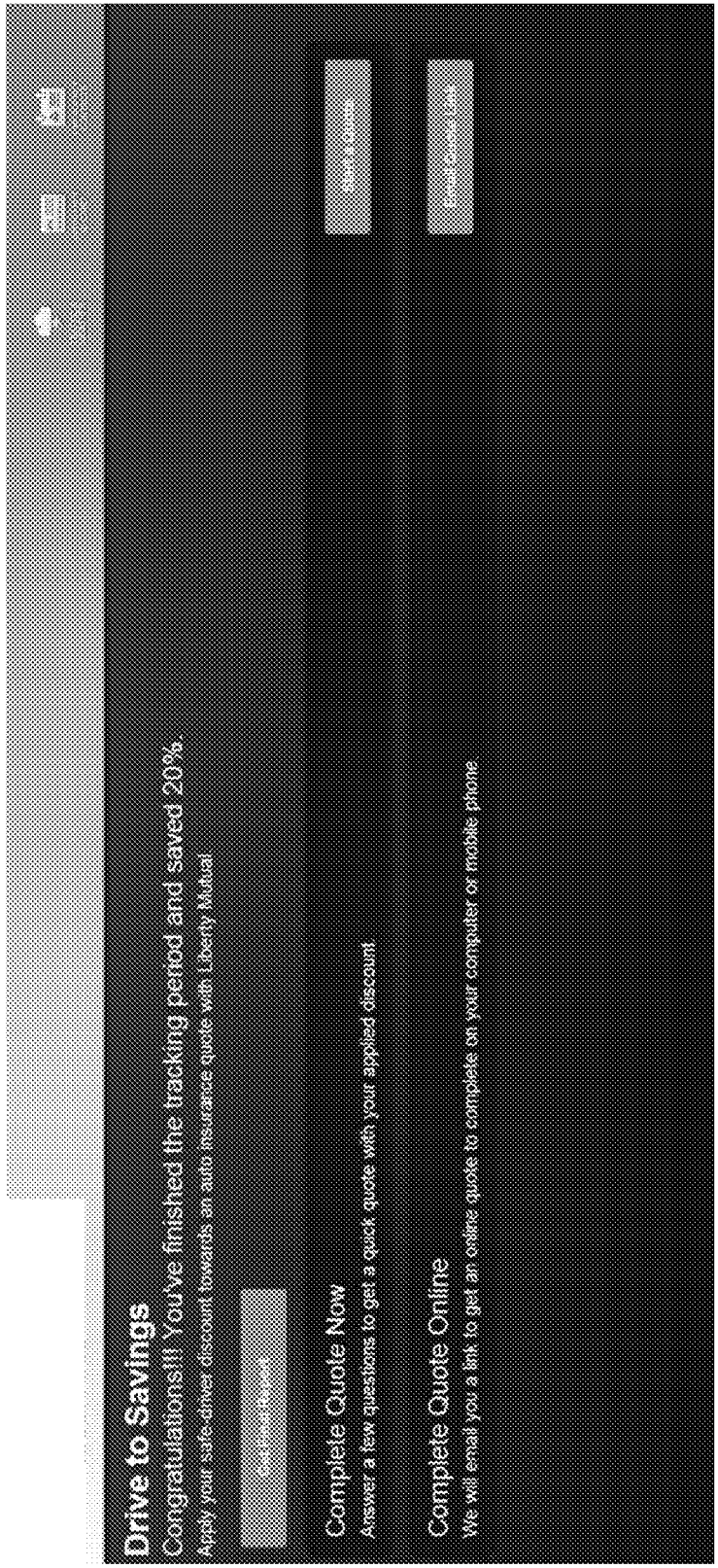

FIG. 5D illustrates the graphical user interface 500D, presenting the following pieces of textual information: "Congratulations!!! You've finished the tracking period and saved 20%." and "Apply your safe-driver discount towards an auto insurance quote with Liberty Mutual." A button appears named "Get Final Report." Two rows appear below. The first row contains pieces of the textual information "Complete Quote Now." and "Answer a few questions to get a quick quote with your applied discount." A button named "Start a Quote" appears to the right of the row in the first line. The second row contains the textual information: "Complete Quote Online" and "We will email you a link to get an online quote to complete on your computer or mobile phone." A button appears to the right of the second row named "Email Quote Link."

Figure 5E:
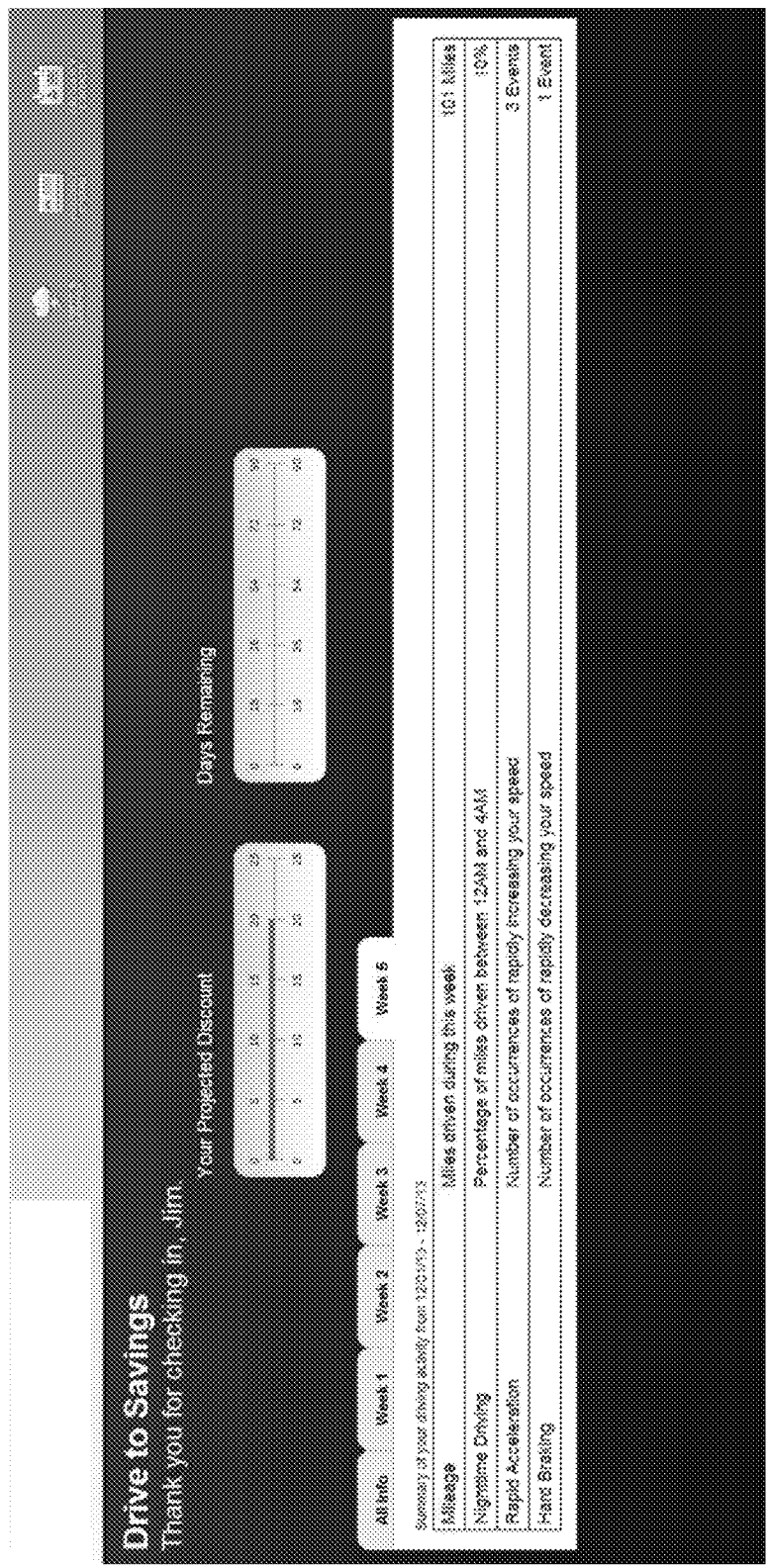

FIG. 5E illustrates the graphical user interface 500E. The graphical user interface 500E contains the textual information "Thank you for checking in, Jim." A metric user interface element named "Your Projected Discount" appears as a line with various tick marks labeled 0, 5, 10, 15, 20, and 25. A blue bar extends from the 0-labeled tick mark to the 20-labeled tick mark. Another metric user interface element appears named "Days Remaining." A line with various labeled tick marks 0, 18, 36, 54, 72, and 90 are presented. Below, a tab user interface element appears portraying six tabs. The six tabs are named "All Info"; "Week 1"; "Week 2"; "Week 3"; "Week 4"; and Week 5." Week 5 appears to be selected. A table in three columns appears, named "Summary of your driving activity from Dec. 1, 2013-Dec. 7, 2013." The first column includes the textual information "Mileage"; "Nighttime Driving"; "Rapid Acceleration"; and "Hard Braking." The second column includes the following pieces of textual information: "Miles driven during this week"; "Percentage of miles driven between 12 AM and 4 AM"; "Number of occurrences of rapidly increasing your speed"; and "Number of occurrences of rapidly decreasing your speed." The third column includes these pieces of information: "101 Miles"; "10%"; "3 Events"; and "1 Event." In one embodiment, the graphical user interface 500E appears after selection of the "Get Final Report" button on the graphical user interface 500D.

Figure 6C:
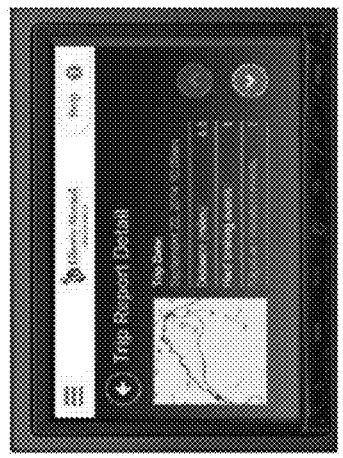
FIGS. 6A-6C are pictorial diagrams illustrating pieces of yet another archetypical graphical user interface displayed on an in-vehicle display, which is a piece of hardware.
Figure 6B:
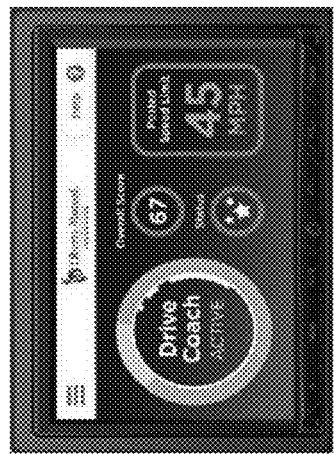
Figure 6A:
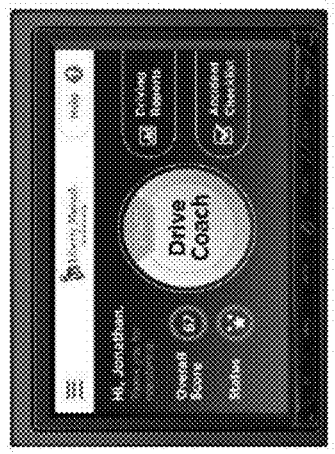

FIG. 6A illustrates a graphical user interface 600A. The graphical user interface 600A includes the textual information "Hi, Jonathan." and "Thank you for registering."

Appearing leftward of the screen is a user interface element named "Overall Score," which appears as a circle with a number, such as "67," appearing inside it and representing the driving score calculated by the system 100. Another user interface element named "Status" appears as a circle with three stars appearing at its center. At the center of the screen is a Drive Coach user interface element appearing as an outer circle. Another circle appears inside the outer circle, the center of which is the text "Drive Coach." Intersecting the two circles, the text "Start" appears in a highlighted polygon at the top of the circles. Rightward, the graphical user interface 600A portrays two thumb tabs. The first thumb tab, named "Driving Reports", has an icon appearing as a bar chart adjacent to it. The second thumb tab, named "Accident Checklist", appears next to a checklist icon.

FIG. 6B illustrates a graphical user interface 600B. Rightward, the screen portrays a metric user interface element appearing as a circle within a circle. The interstices of the circle are partially filled, indicating progress. Appearing at the center of the second circle is the text "Drive Coach Active." Appearing at the center of the screen is a user interface element named "Overall Score," appearing as a circle inside of which is a number representing the driving score. A second user interface element appears as a circle the inside of which are three stars. Rightward of the screen, the graphical user interface 600B portrays a rounded rectangle with text inside it, namely, "Posted Speed Limit" and "45 MPH."

FIG. 6C illustrates a graphical user interface 600C portraying an arrow pointing leftward encircled by a circle. To the right is the textual element "Trip Report Detail." Appearing below is a map. Next to the map is the textual information "Trip Date"; "Sep. 22, 2014 10:05 am"; "Distance (miles):4.5"; "Hard braking events: 1"; and "Rapid acceleration events: 2." To the right are two encircled arrows, one pointing upward and the other pointing downward.

Figure 7A:
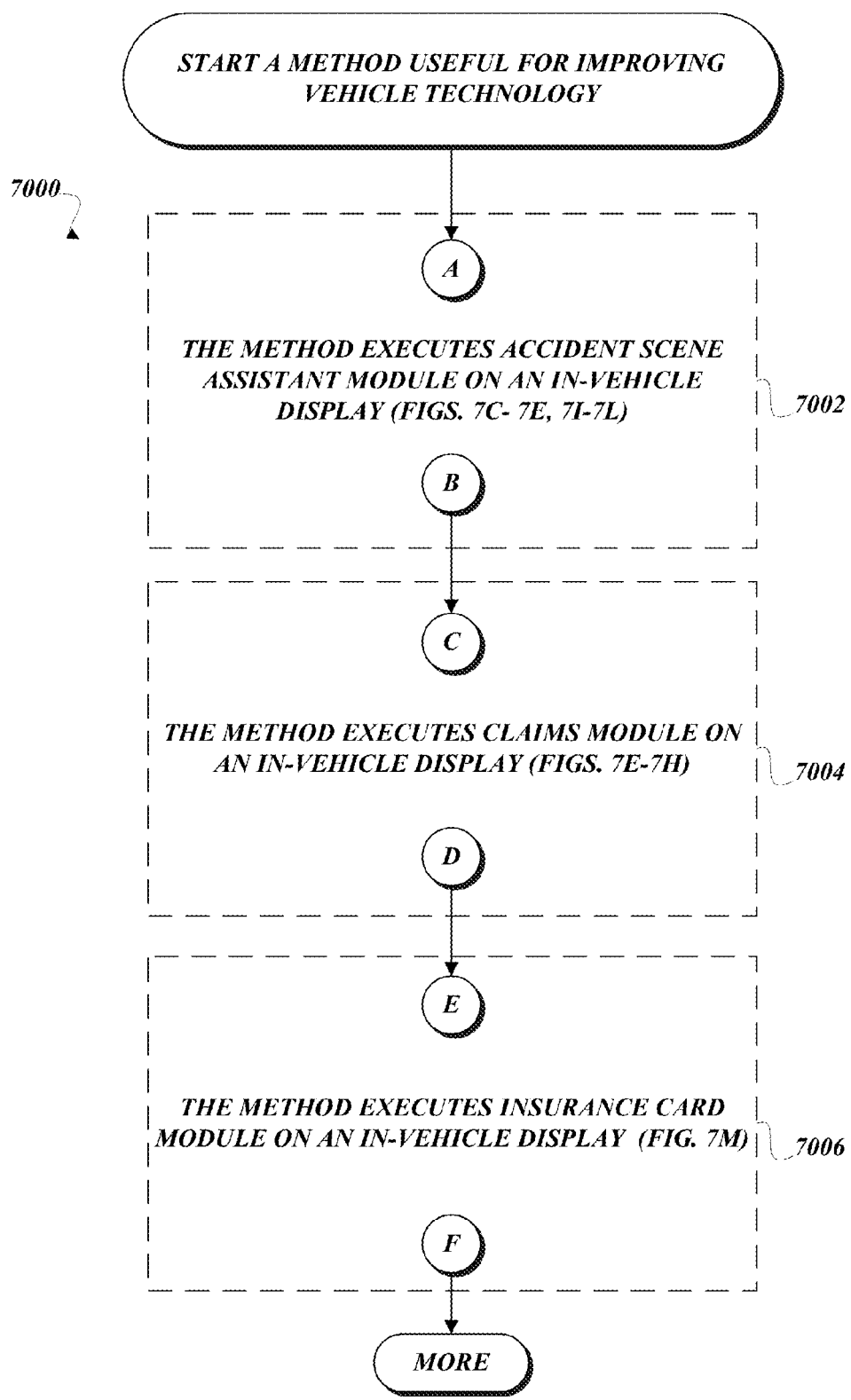
FIGS. 7A-7V are process diagrams implementing an archetypical method useful to improve vehicle technologies.
Figure 7B:
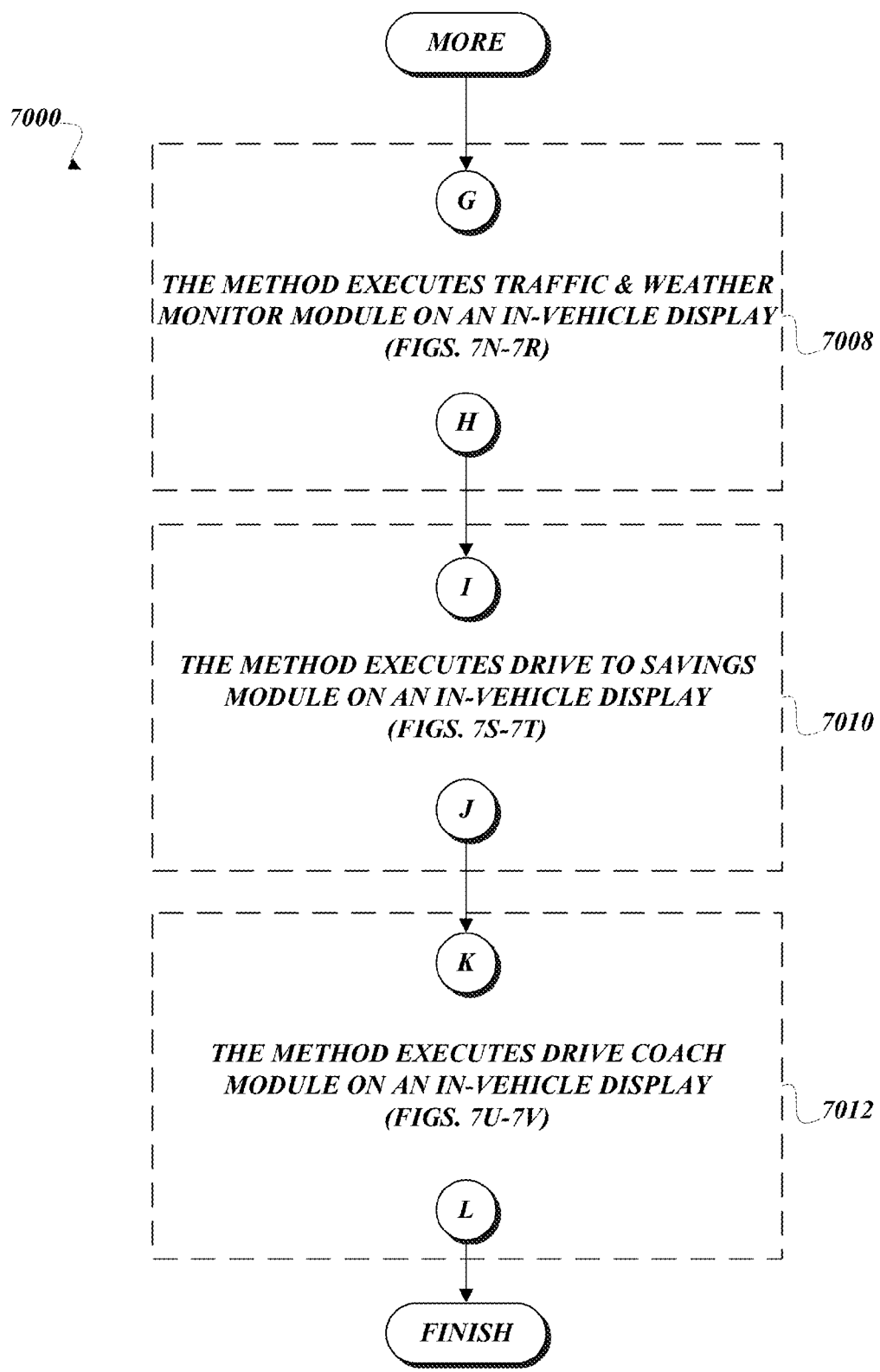
Figure 7C:
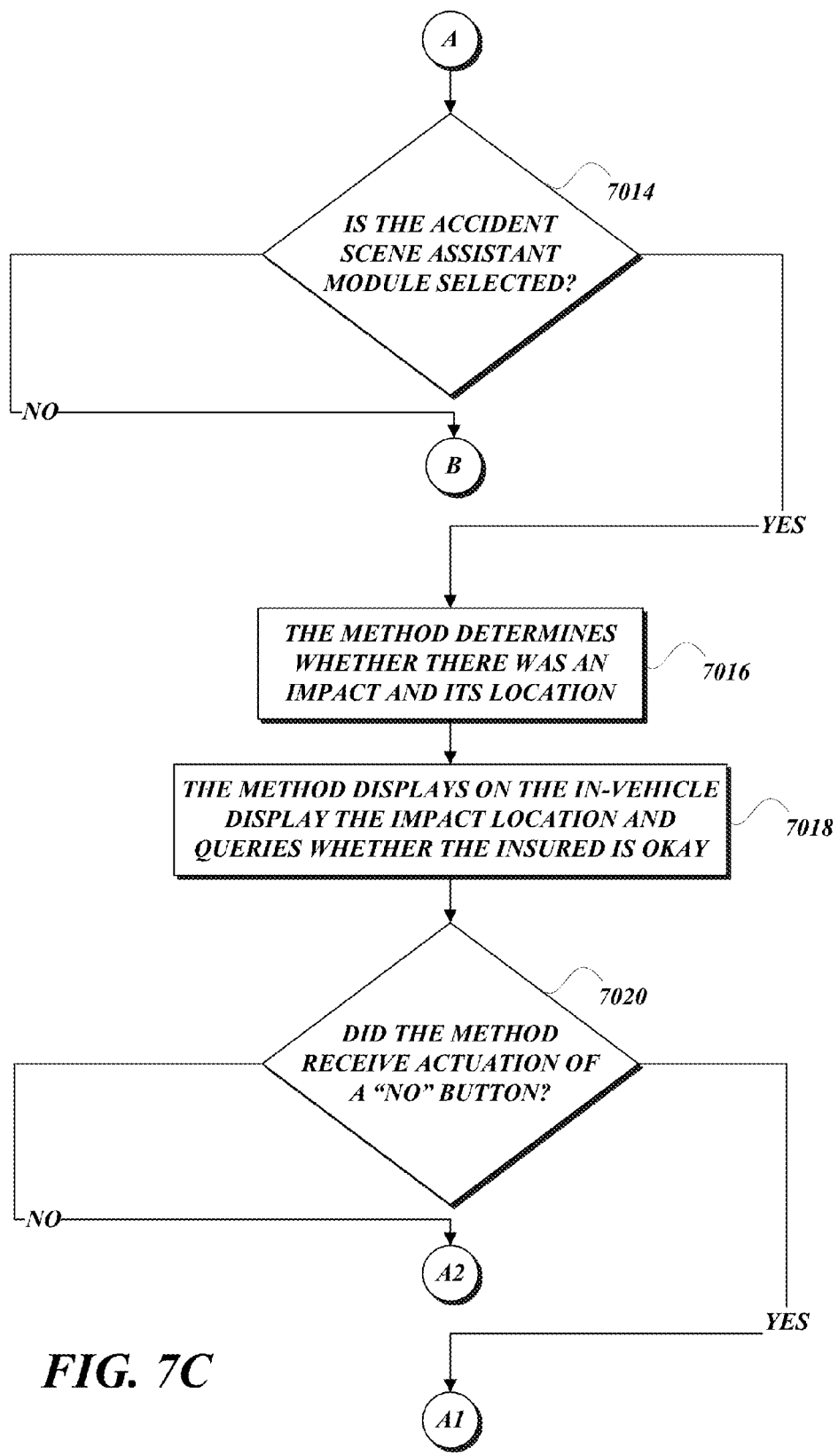
Figure 7D:
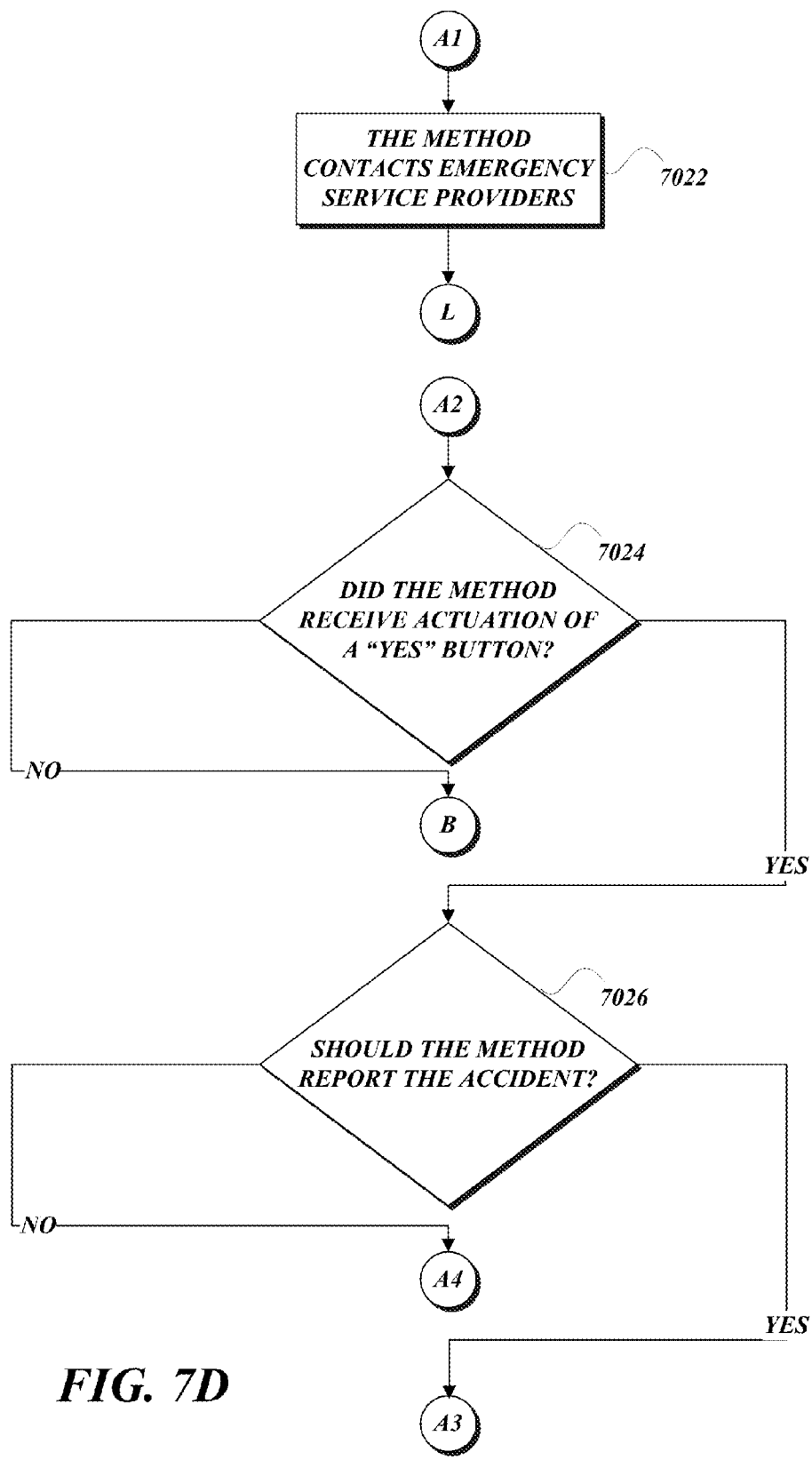
Figure 7E:
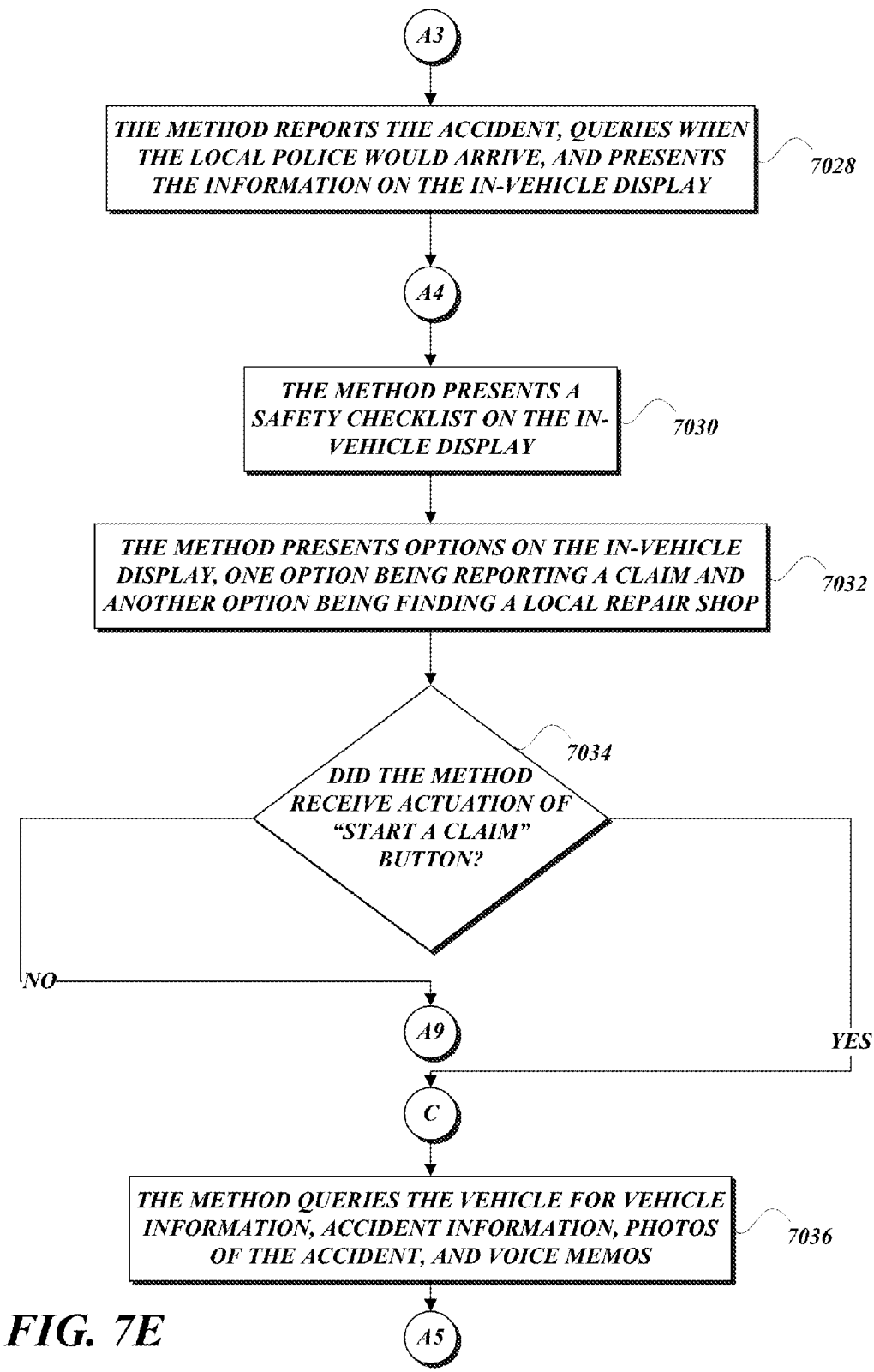
Figure 7F:
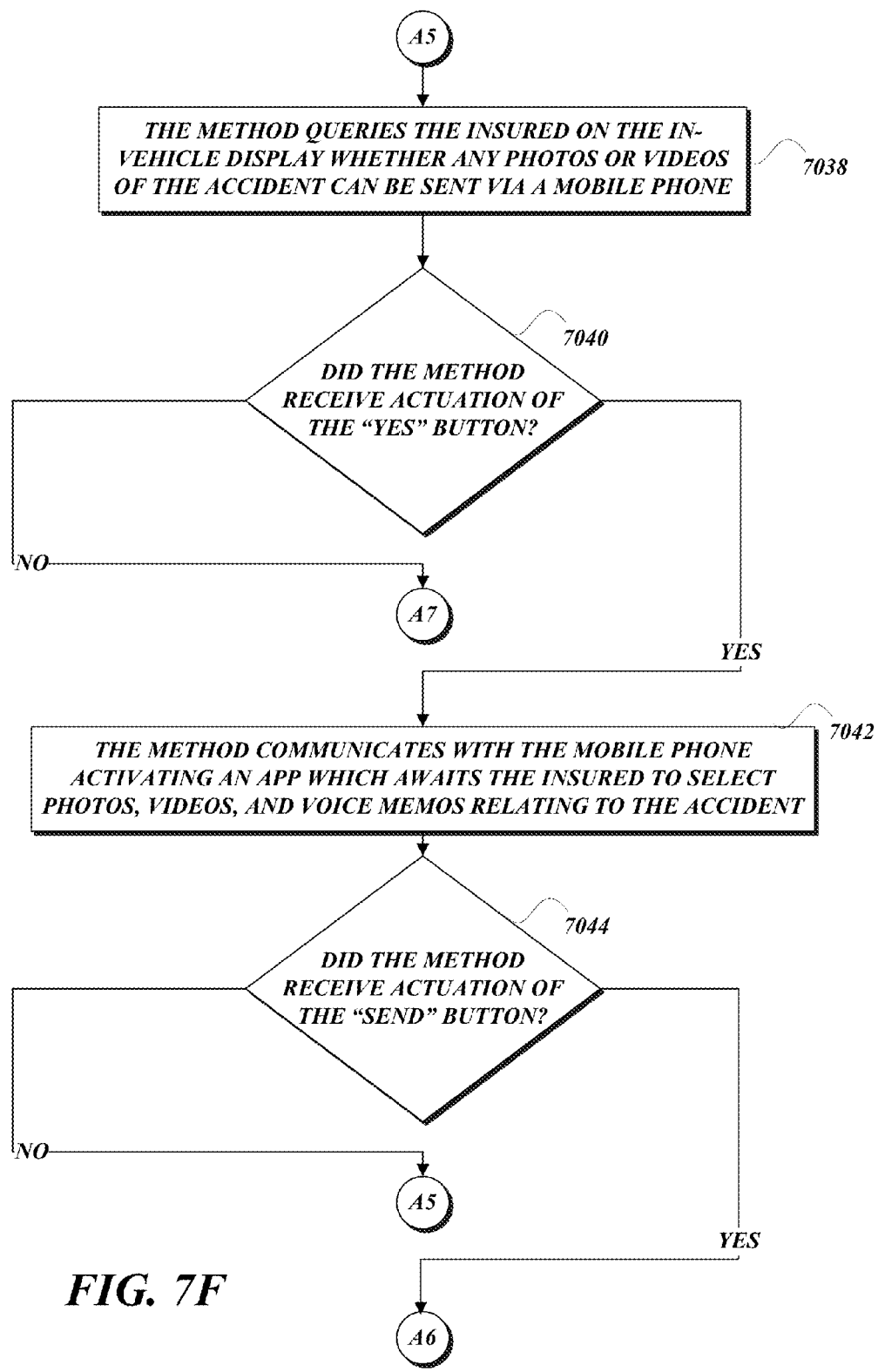
Figure 7G:
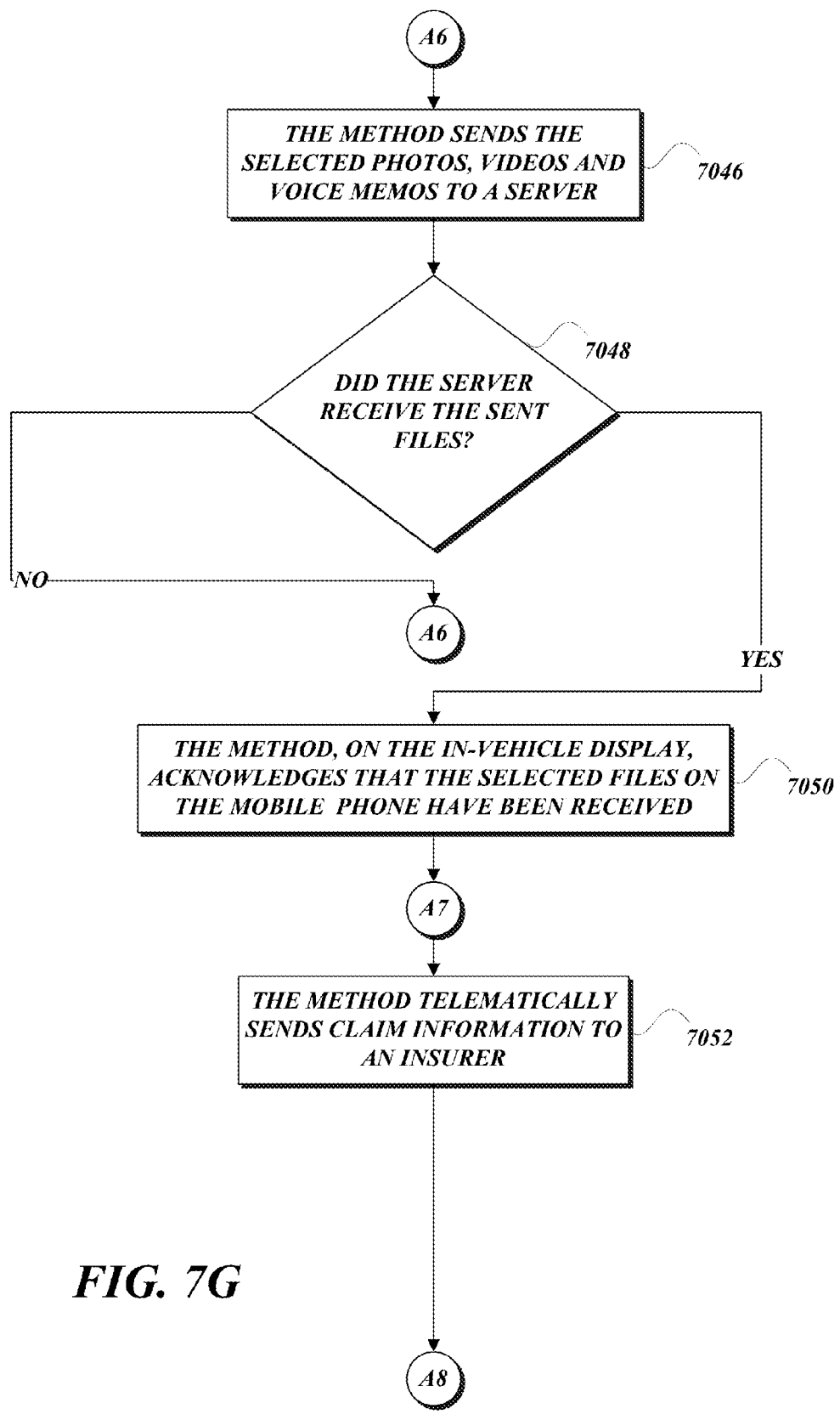
Figure 7H:
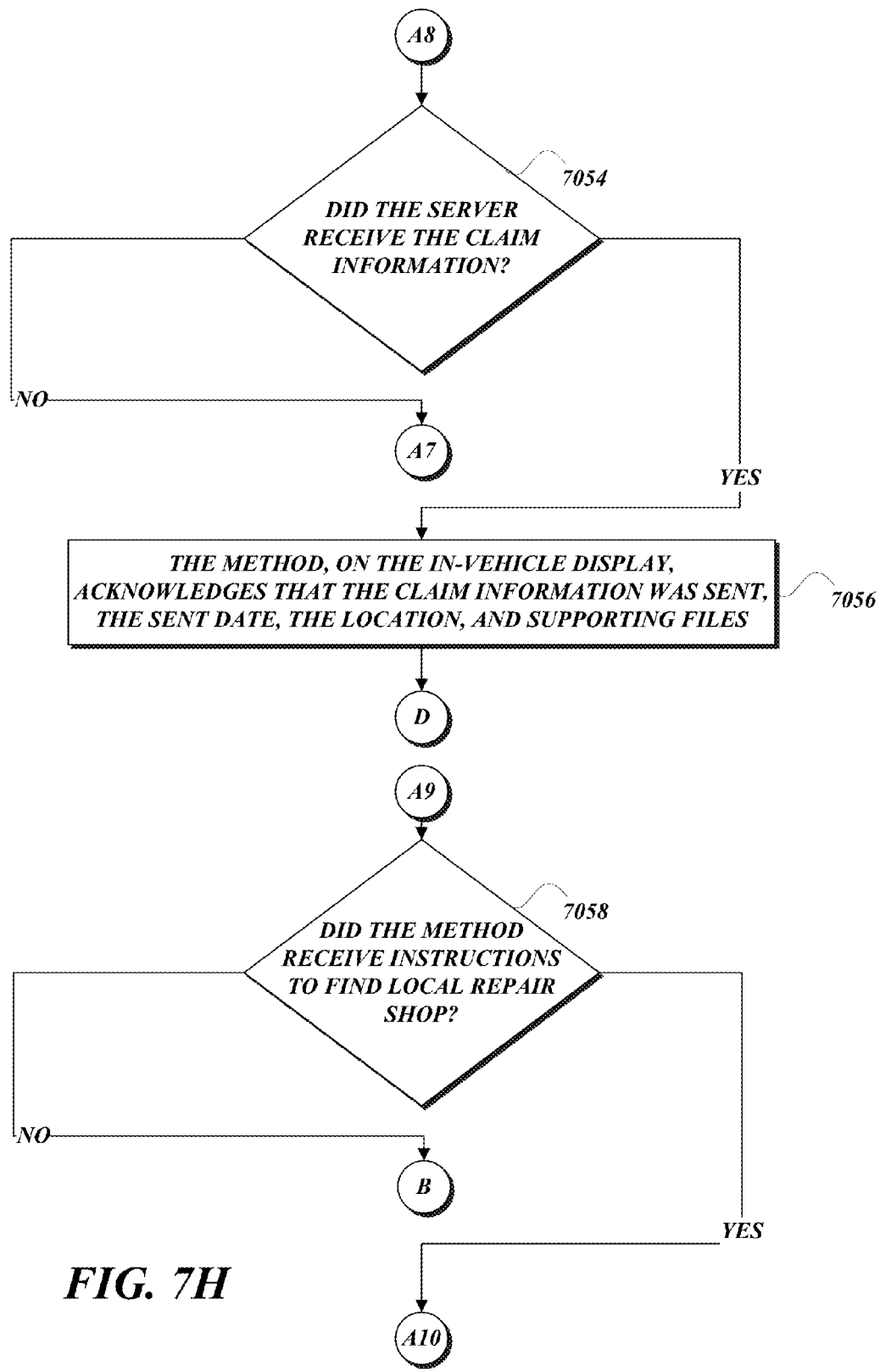
Figure 7I:
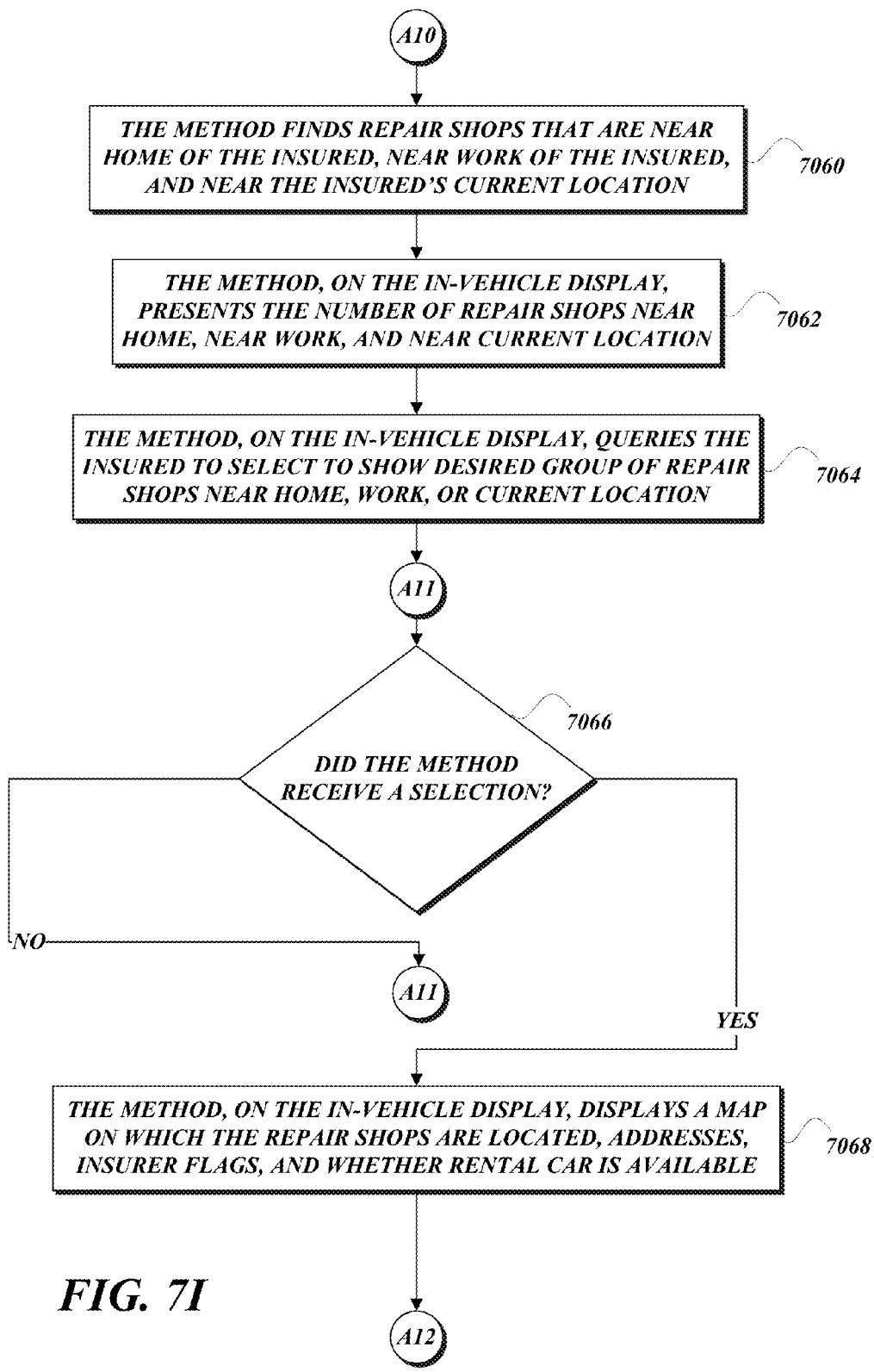
Figure 7J:
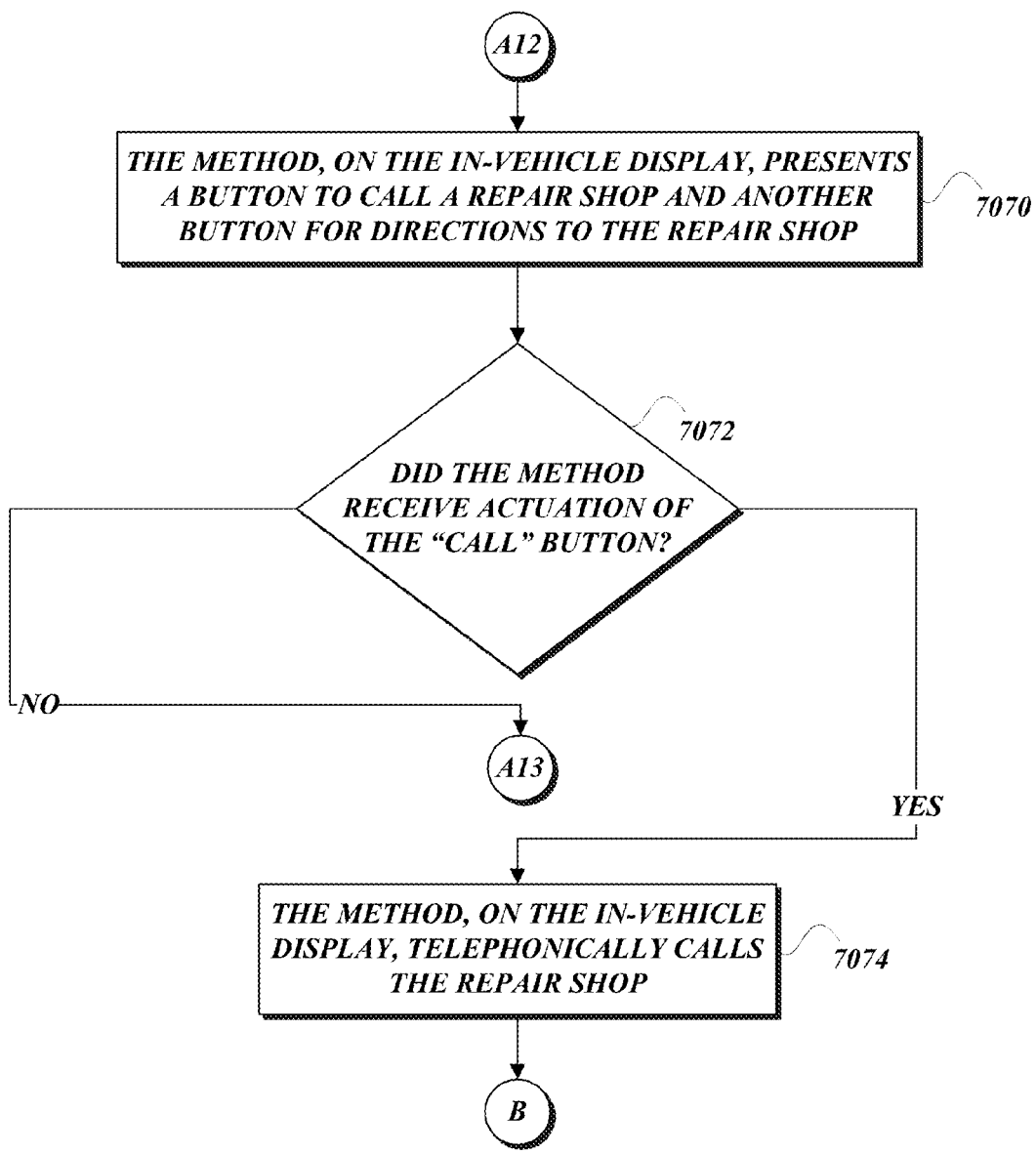
Figure 7K:
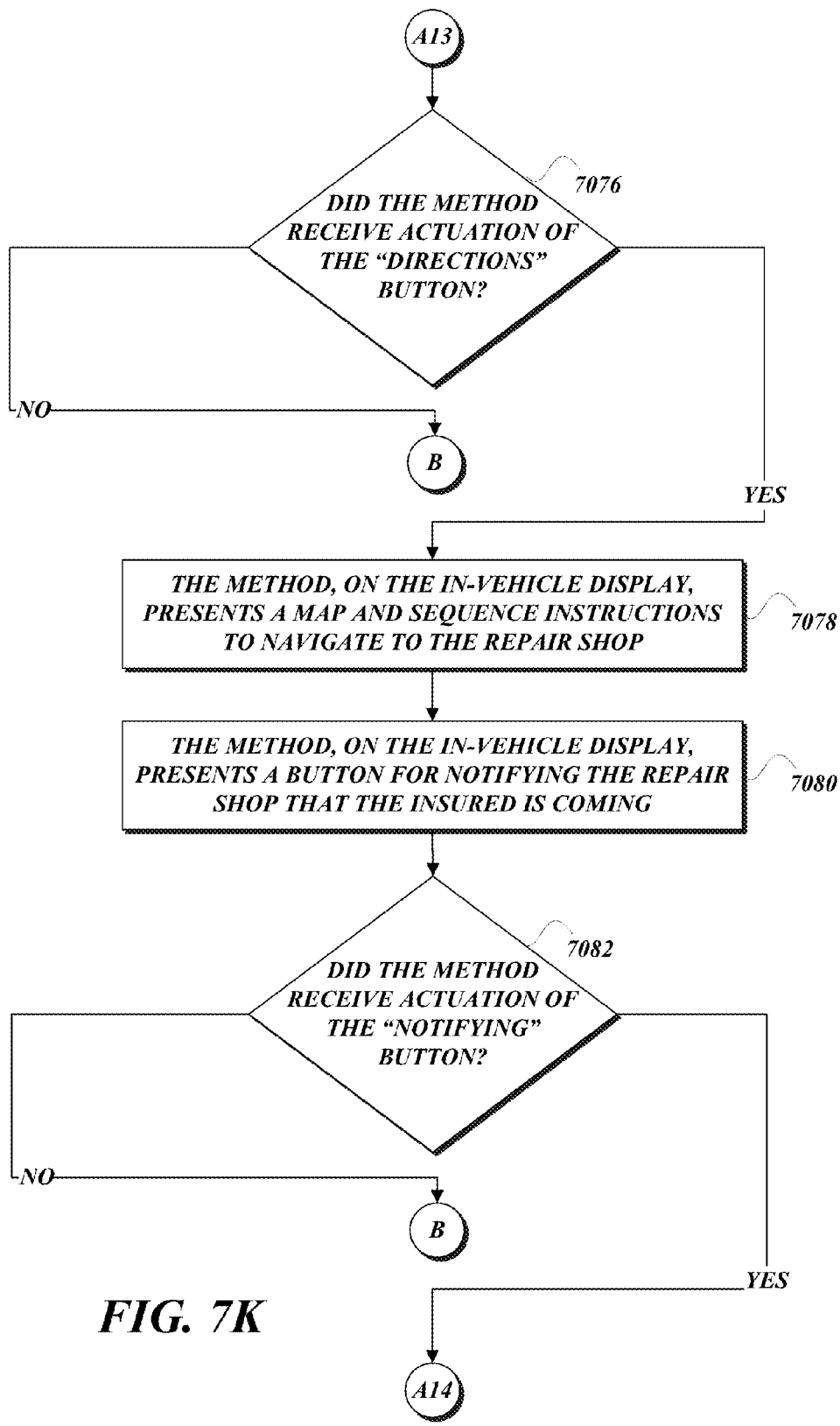
Figure 7L:
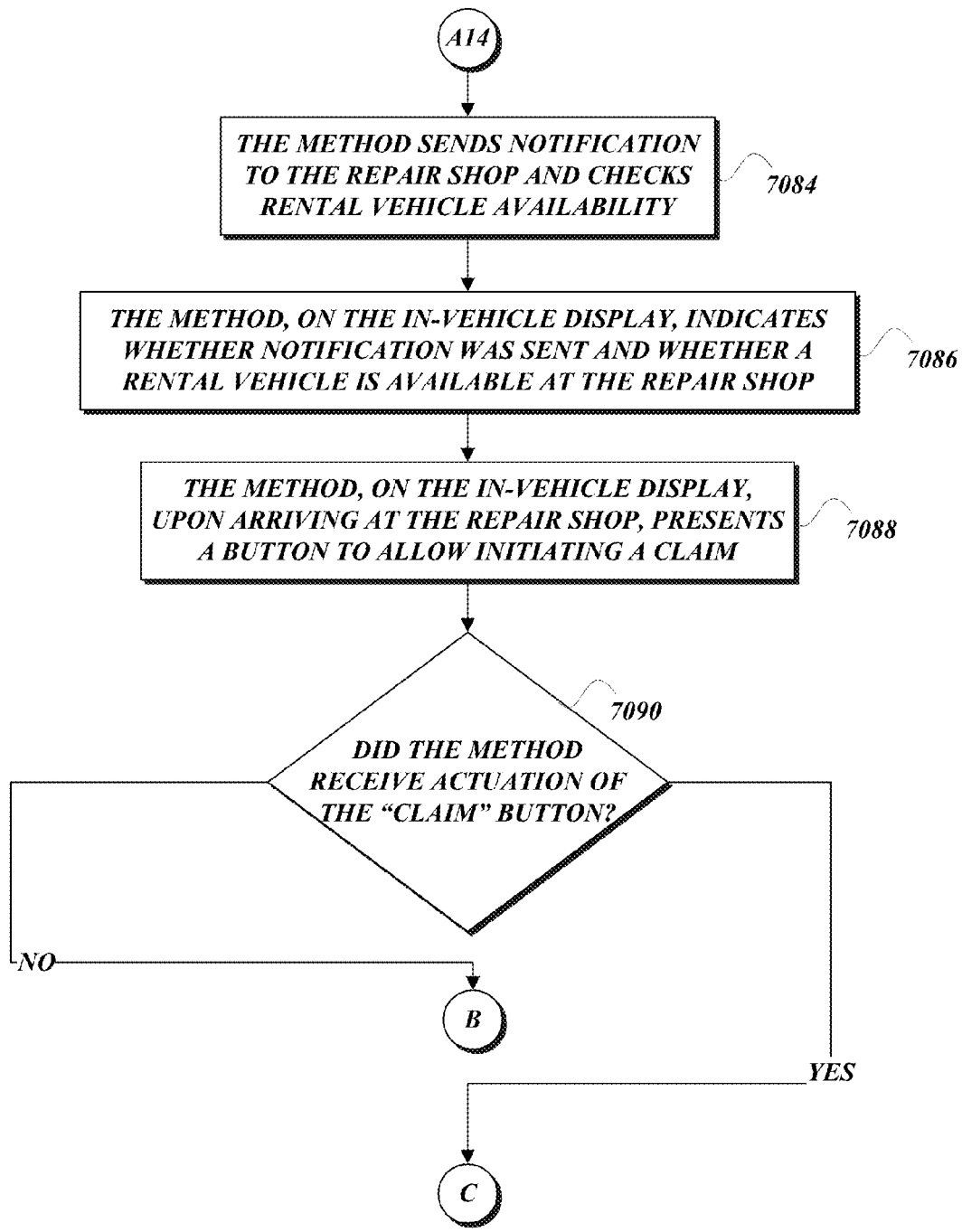
Figure 7M:
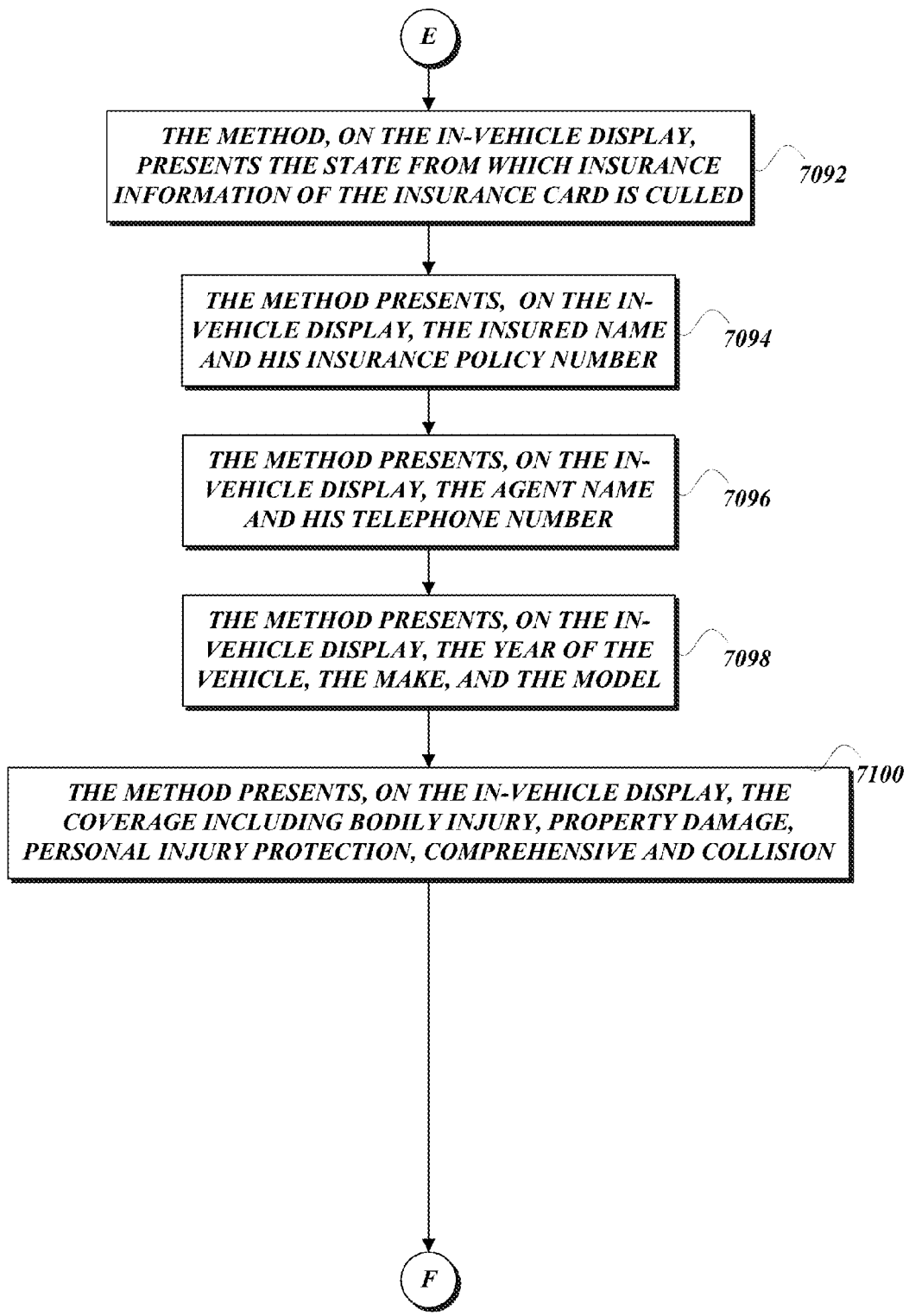
Figure 7N:
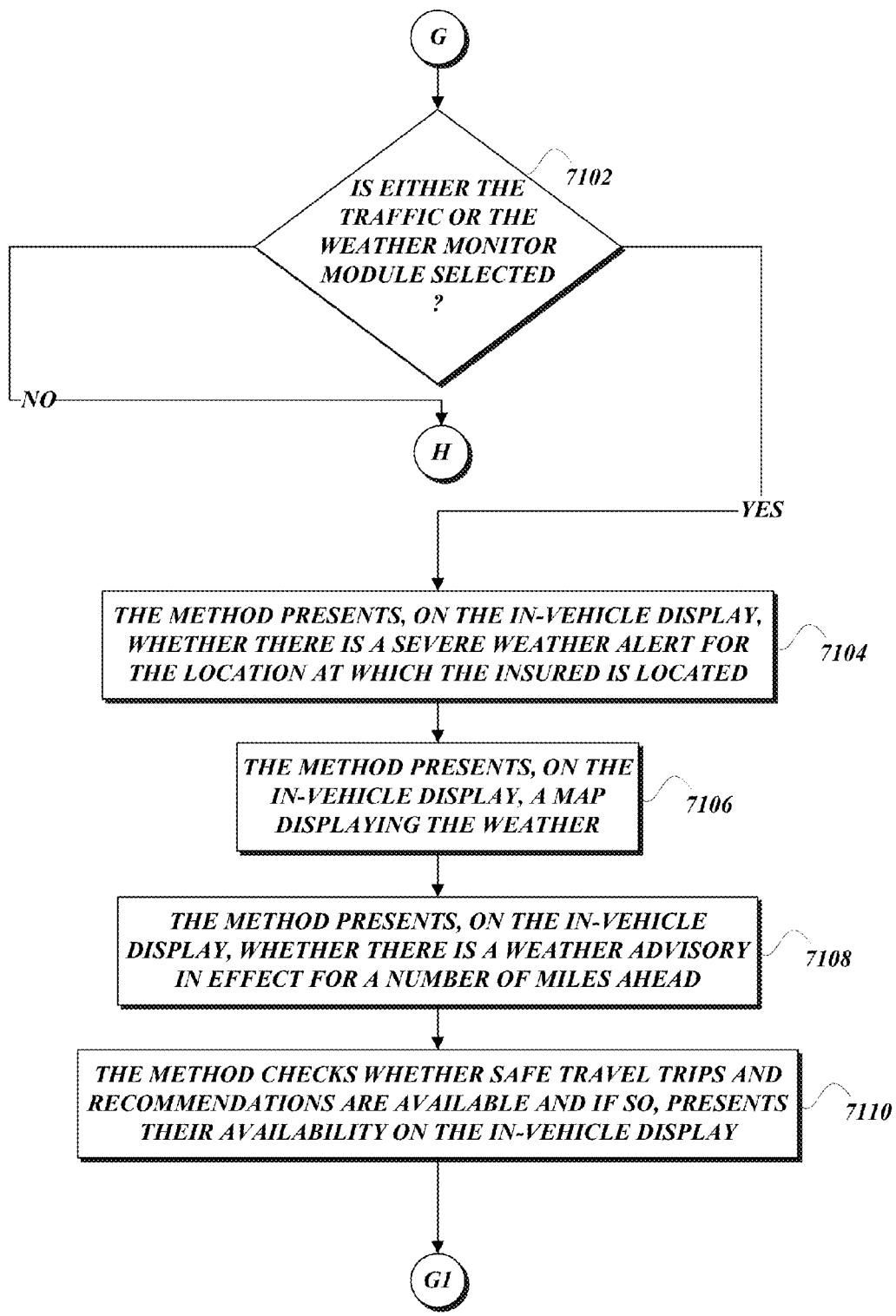
Figure 70:
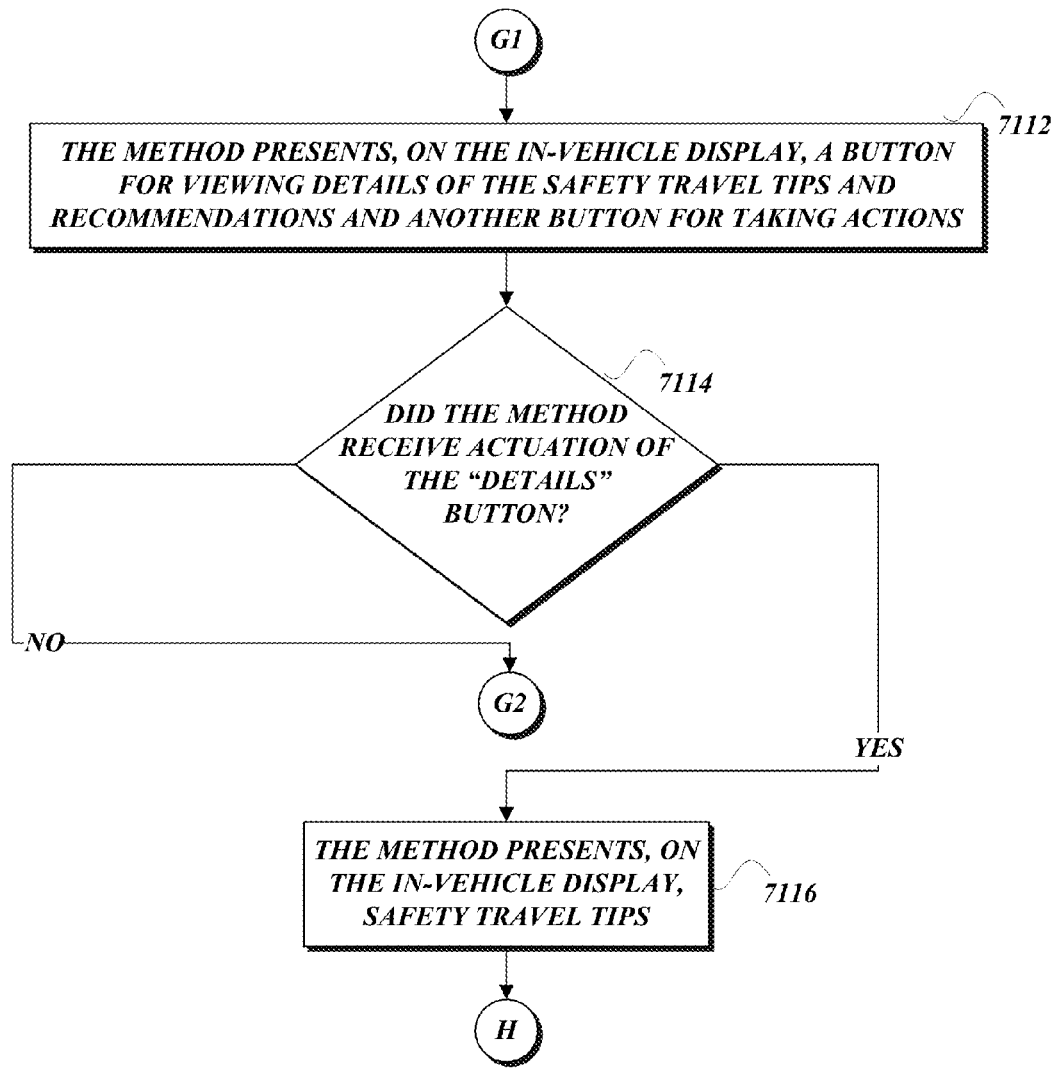
Figure 7P:
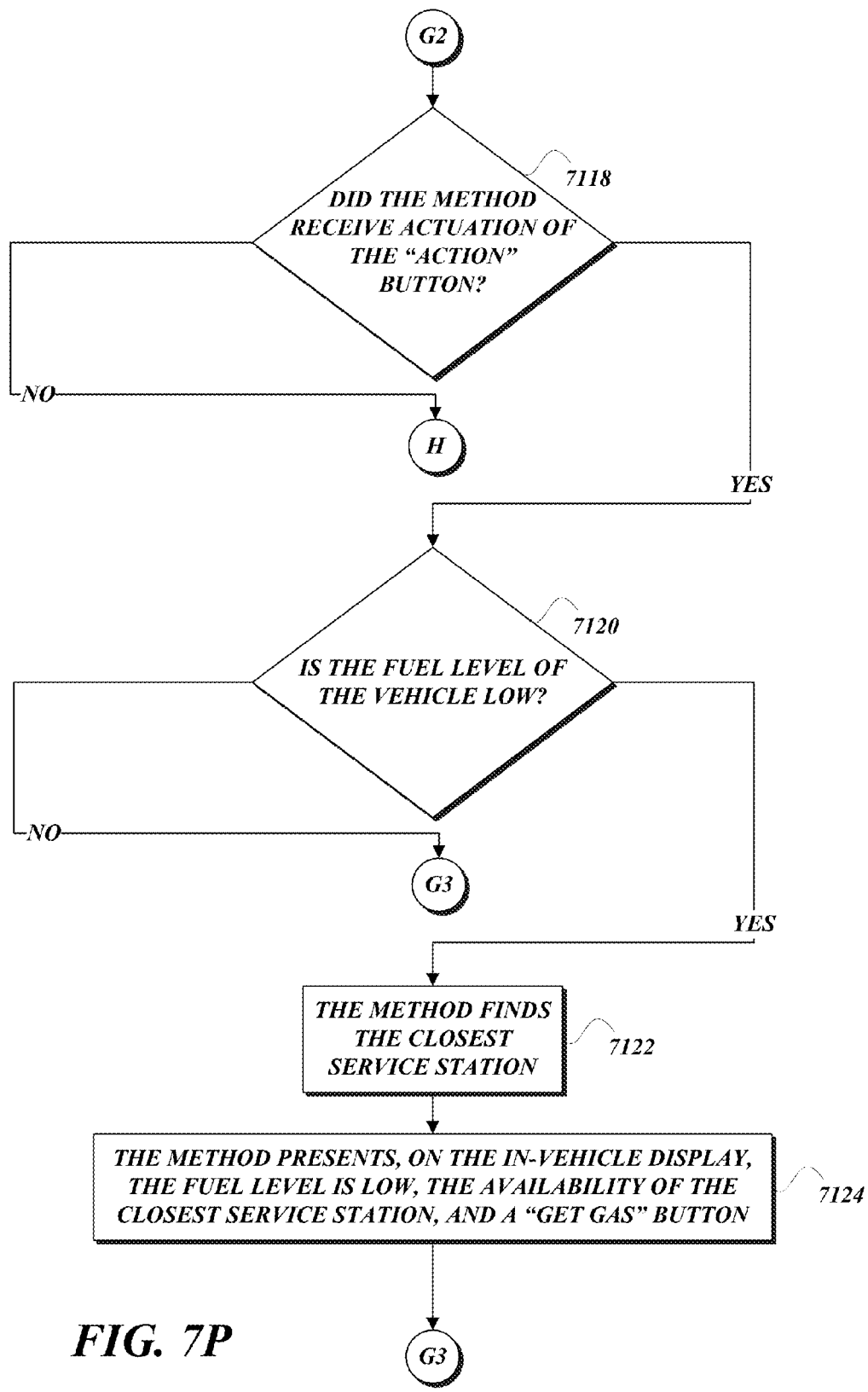
Figure 7Q:
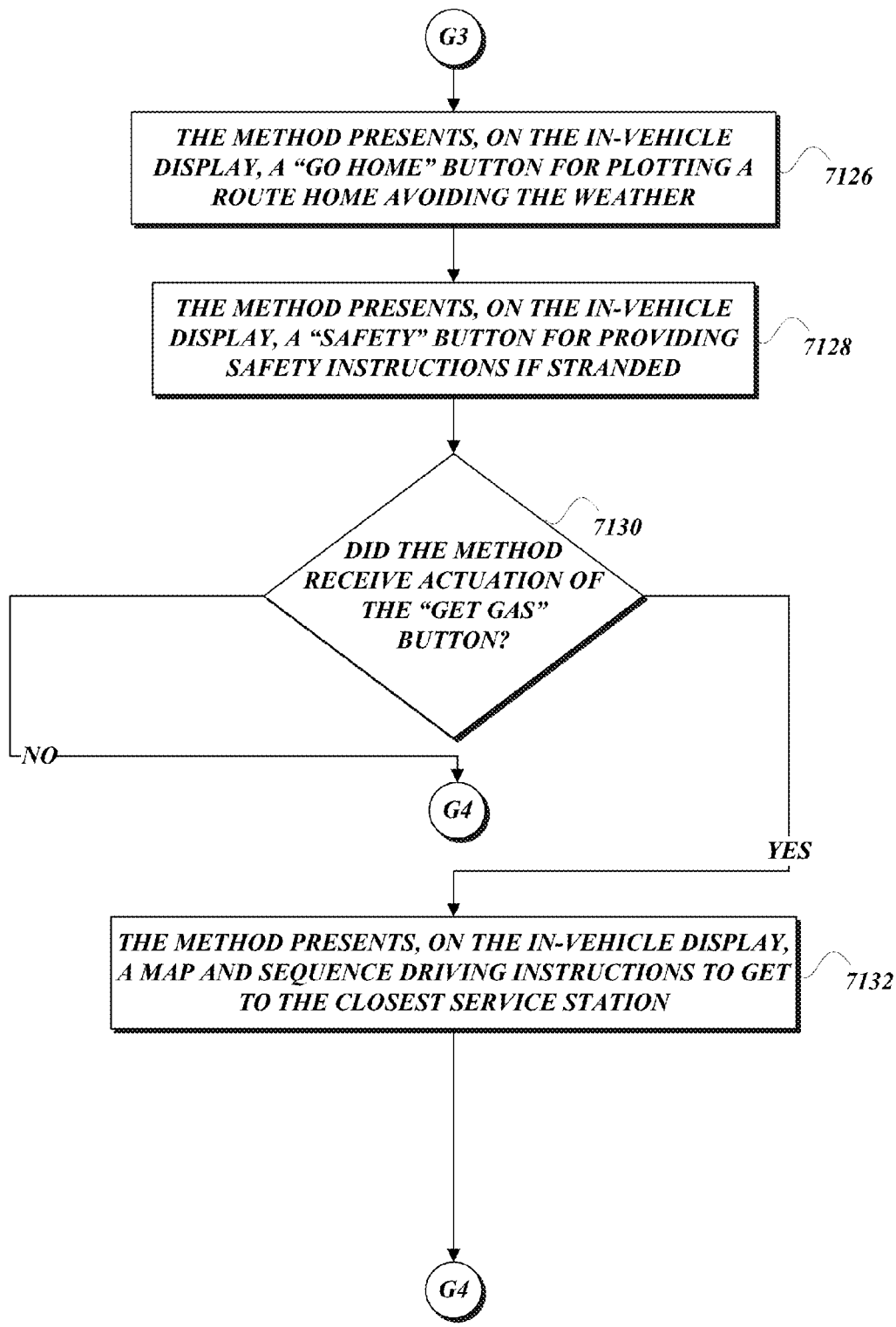
Figure 7R:
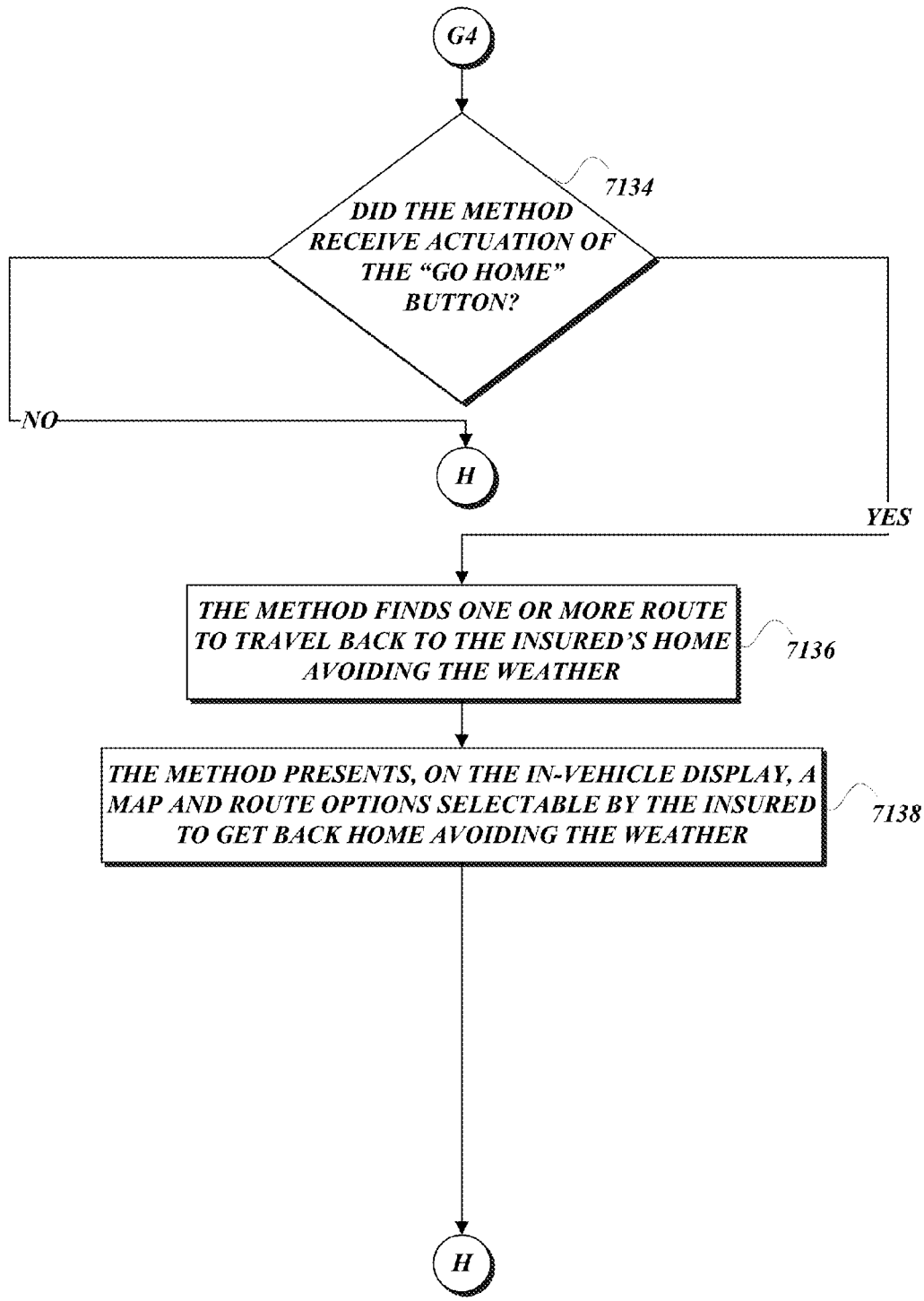
Figure 7S:
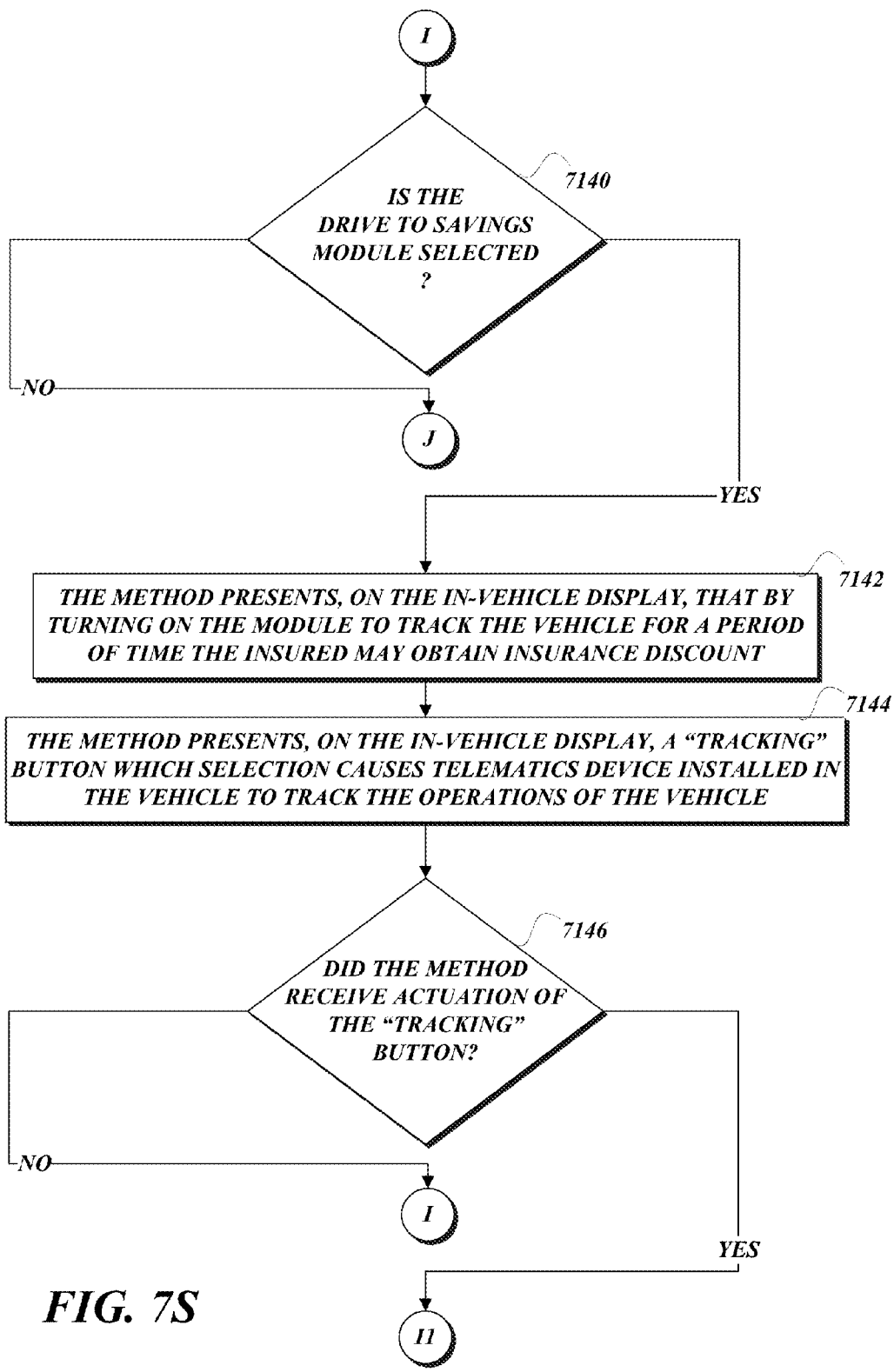
Figure 7T:
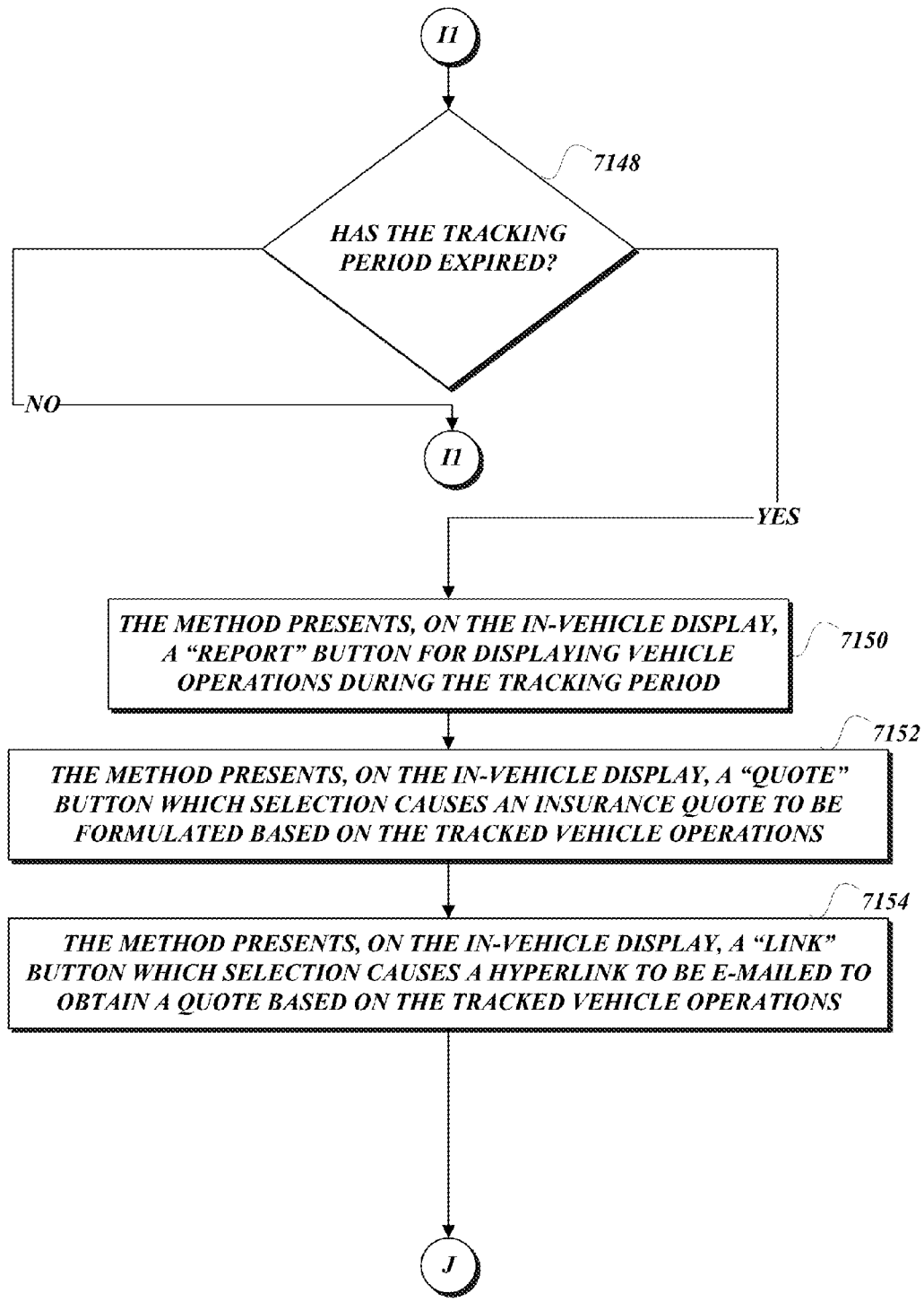
Figure 7U:
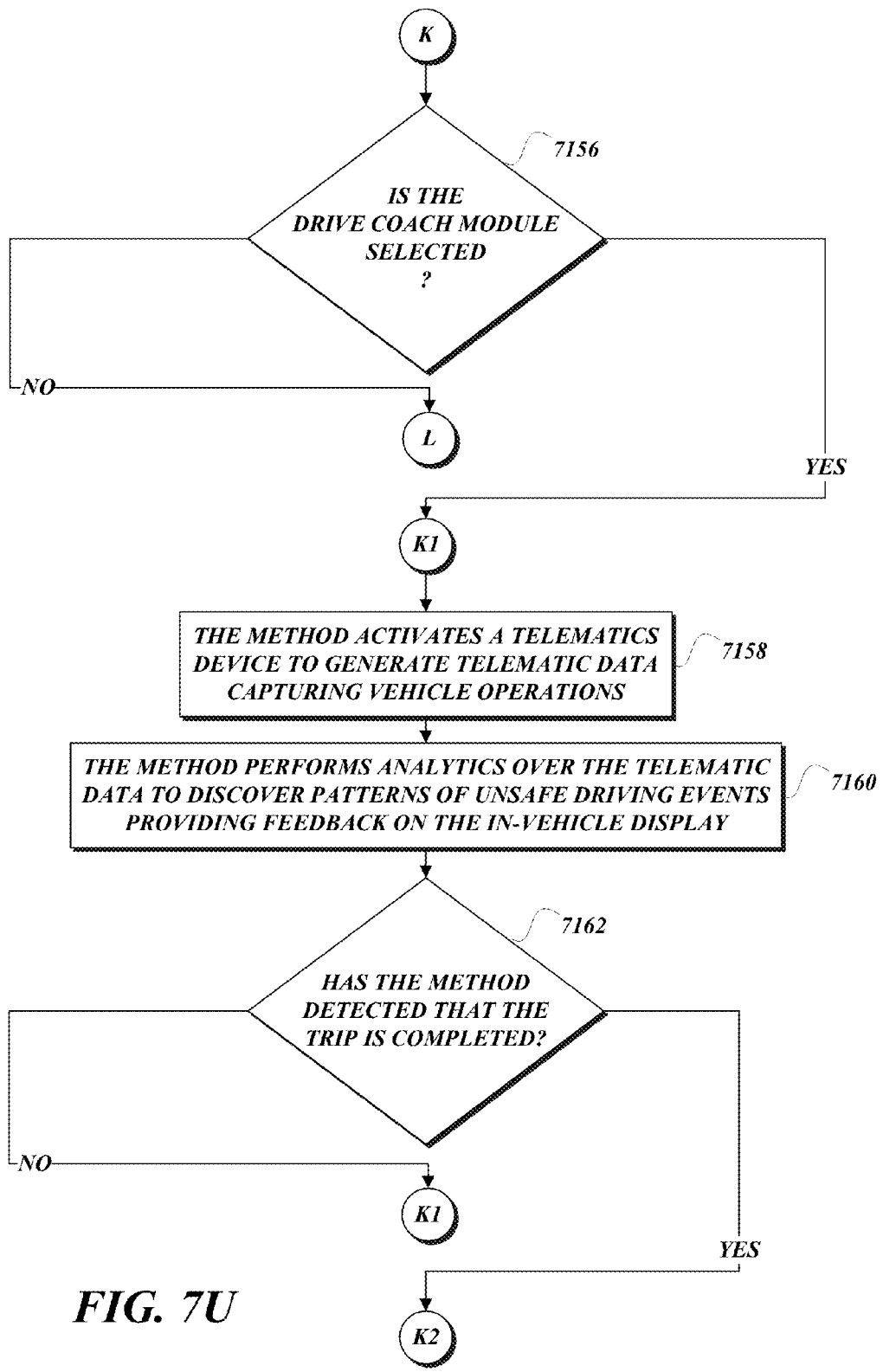
Figure 7V:
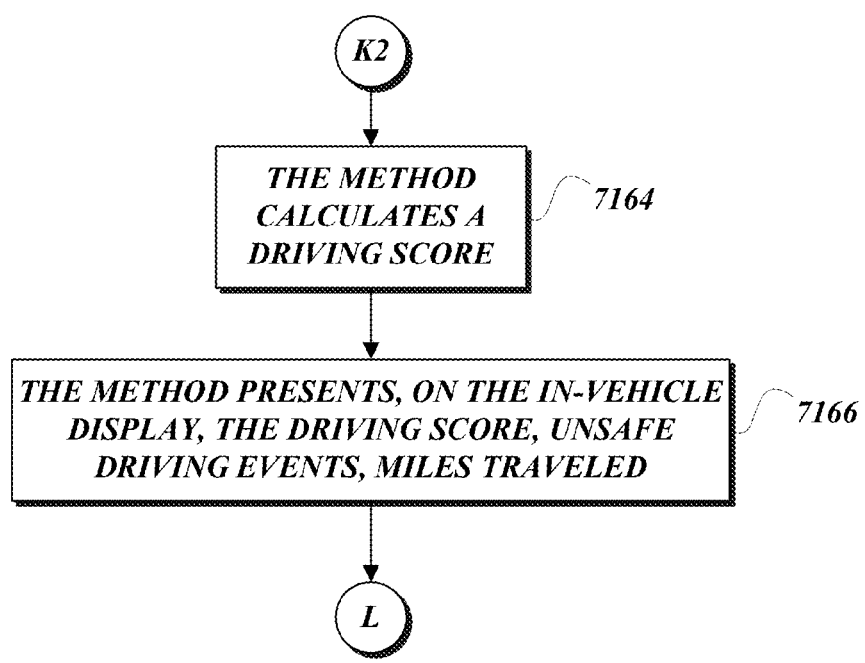

FIGS. 7A-7V are process diagrams implementing an exemplary method 7000 useful for improving vehicle technology. From the start block, the method 7000 proceeds to a set of method steps 7002 defined between a continuation terminal ("terminal A") and another continuation terminal ("terminal B"). The set of method steps 7002 executes accident scene assistant module 110 on the in-vehicle display 102A. From terminal A (FIG. 7C), the method 7000 proceeds to decision block 7014, where a test is performed to determine whether the accident scene assistant module 102A is selected. If the answer to the test at decision block 7014 is "No", the method continues to terminal B. Otherwise, if the answer to the test at decision block 7014 is "Yes", the method proceeds to block 7016, where the method determines whether there was an impact and its location. At block 7018, the method displays on the in-vehicle display the impact location and queries whether the insured is "okay." The method proceeds to decision block 7020 where a test is performed to determine whether the method received actuation of a "No" button. If the answer to the test at decision block 7020, is "No", the method proceeds to another continuation terminal ("terminal A2"). Otherwise, if the answer to the test at decision block 7020 is "Yes", the method proceeds to another continuation terminal ("terminal A1").

At terminal A1 (FIG. 7D), the method proceeds to block 7022, where the method contacts emergency service providers. The method then continues to another continuation terminal ("terminal L"). From terminal A2 (FIG. 7D), the method proceeds to decision block 7024, where a test is performed to determine whether the method received actuation of a "Yes" button. If the answer to the test at decision block 7024 is "No", the method proceeds to terminal B. Otherwise, if the answer to the test at decision 7024 is "Yes", the method proceeds to decision block 7026 where a test is performed to determine whether the method should report the accident. If the answer to the test at decision block 7026 is "No", the method proceeds to another continuation terminal ("terminal A4"). Otherwise, if the answer to the test at decision block 7026 is "Yes", the method proceeds to another continuation terminal ("terminal A3").

From terminal A3 (FIG. 7E), the method proceeds to block 7028, where the method reports the accident, queries when the local police will arrive, and presents the information on the in-vehicle display 102A. The method then continues to terminal A4 and further proceeds to block 7030, where the method presents a safety checklist on the in-vehicle display 102A. At block 7032, the method presents options on the in-vehicle display, one option being reporting a claim and another option finding a local repair shop. At decision block 7034, a test is performed to determine whether the method received actuation of the "start a claim" button. If the answer to the test at decision block 7034 is "No", the method proceeds to another continuation terminal ("terminal A9"). Otherwise, if the answer to the test at decision block 7034 is "Yes", the method continues to another continuation terminal ("terminal C"). From terminal C (FIG. 7E), the method further proceeds to block 7036, where the method queries the vehicle for vehicle information, accident information, photos of the accident, and voice memos. The method then continues to another continuation terminal ("terminal A5").

From terminal A5 (FIG. 7F), the method proceeds to block 7038, where the method queries the insured on the in-vehicle display 102A whether any photos or videos of the accident can be sent via a mobile phone. At decision block 7040, a test is performed to determine whether the method received actuation of the "Yes" button. If the answer to the test at decision block 7040 is "No", the method continues to another continuation terminal ("terminal A7"). Otherwise, if the answer to the test at decision block 7040 is "Yes", the method continues to block 7042, where the method communicates with the mobile phone to activate an app which awaits the insured to select photos, videos, and voice memos relating to the accident. At decision block 7044, a test is performed to determine whether the method received actuation of the "send" button. If the answer to the test at decision block 7044 is "No", the method proceeds to terminal A5 and skips back to block 7038, where the above-identified processing steps are repeated. Otherwise, if the answer to the test at decision block 7044 is "Yes", the method continues to another continuation terminal ("terminal A6").

From terminal A6 (FIG. 7G), the method proceeds to block 7046, where the method sends the selected photos, videos, and voice memos to a server. At decision block 7048, a test is performed to determine whether the server received the sent files. If the answer to the test at decision block 7048 is "No", the method proceeds to terminal A6 and skips back to block 7046, where the above-identified processing steps are repeated. Otherwise, if the answer to the test at decision block 7048 is "Yes", the method proceeds to block 7050, where the method, on the in-vehicle display 102A, acknowledges that the selected files on the mobile phone have been received. The method then continues to terminal A7 and further proceeds to block 7052 where the method telematically sends claim information to an insurer. The method then continues to another continuation terminal ("terminal A8").

From terminal A8 (FIG. 7H), the method proceeds to decision block 7054, where a test is performed to determine whether the server received the claim information. If the answer to the test at decision block 7054 is "No", the method proceeds to terminal A7 and skips back to block 7052, where the above-identified processing steps are repeated. Otherwise, if the answer to the test at decision block 7054 is "Yes", the method proceeds to block 7056, where the method, on the in-vehicle display, acknowledges that the claim information was sent, the sent date, the location, and supporting files. The method then continues to another continuation terminal ("terminal D"). From terminal A9 (FIG. 7H), the method proceeds to decision block 7058, where a test is performed to determine whether the method received instructions to find a local repair shop. If the answer to the test at decision block 7058 is "No", the method proceeds to terminal B. Otherwise, if the answer to the test at decision block 7058 is "Yes", the method proceeds to another continuation terminal ("terminal A10").

From terminal A10 (FIG. 7I), the method proceeds to block 7060, where the method finds repair shops that are near the home of the insured, near the work of the insured, and near the insured's current location. At block 7062, the method, on the in-vehicle display, presents the number of repair shops near home, near work, and near the current location. At block 7064, the method, on the in-vehicle display, queries the insured to select a desired group of repair shops near home, work, or the current location. The method then continues to another continuation terminal ("terminal A11"). The method further proceeds to decision block 7066, where a test is performed to determine whether the method received a selection. If the answer to the test at decision block 7066 is "No", the method skips back to decision block 7066 and the above-identified processing step is repeated. Otherwise, if the answer to the test at decision block 7066 is "Yes", the method proceeds to block 7068 where the method, on the in-vehicle display, displays a map on which the repair shops are located, along with addresses, insurer flags, and whether a rental car is available. The method then continues to another continuation terminal ("terminal A12").

From terminal A12 (FIG. 7J), the method proceeds to block 7070, where the method, on the in-vehicle display, presents a button to call a repair shop and another button for directions to the repair shop. At decision block 7072, a test is performed to determine whether the method received actuation of the "call" button. If the answer to the test at decision block 7072 is "No", the method proceeds to another continuation terminal ("terminal A13"). Otherwise, if the answer to the test at decision block 7072 is "Yes", the method proceeds to block 7074, where the method, on the in-vehicle display, telephonically calls the repair shop. The method then continues to terminal B.

From terminal A13 (FIG. 7K), the method proceeds to decision block 7076, where a test is performed to determine whether the method received actuation of the "directions" button. If the answer to the test at decision block 7076 is "No", the method proceeds to terminal B. Otherwise, if the answer to the test at decision block 7076 is "Yes", the method proceeds to block 7078, where the method, on the in-vehicle display, presents a map and sequenced instructions to navigate to the repair shop. At block 7080, the method, on the in-vehicle display, presents a button for notifying the repair shop that the insured is coming. At decision block 7082, a test is performed to determine whether the method received actuation of the "notifying" button. If the answer to the test at decision block 7082 is "No", the method proceeds to terminal B. Otherwise, if the answer to the test at decision block 7082 is "Yes", the method proceeds to another continuation terminal ("terminal A14").

From terminal A14 (FIG. 7L), the method proceeds to block 7084, where the method sends a notification to the repair shop and checks rental vehicle availability. At block 7086, the method, on the in-vehicle display, indicates whether a notification was sent and whether a rental vehicle is available at the repair shop. At block 7088, the method, on the in-vehicle display, upon arriving at the repair shop, presents a button to allow initiating a claim. At decision block 7090, a test is performed to determine whether the method received actuation of the "claim" button. If the answer to the test at decision block 7090 is "No", the method proceeds to terminal B. Otherwise, if the answer to the test at decision block 7090 is "Yes", the method proceeds to terminal C.

From terminal B (FIG. 7A), the method 7000 proceeds to a set of method steps 7004 defined between terminal C and terminal D. The set of method steps 7004 executes the claims module on an in-vehicle display, which was previously discussed in connection with FIGS. 7E-7H. From terminal D (FIG. 7A), the method proceeds to a set of method steps 7006 defined between a continuation terminal ("terminal E") and another continuation terminal ("terminal F"). The set of method steps 7006 executes the insurance card module 112 on an in-vehicle display. From terminal E (FIG. 7M), the method 7000 proceeds to block 7092, where the method, on the in-vehicle display, presents the state from which the insurance information on the insurance card is culled. At block 7094, the method presents, on the in-vehicle display, the insured's name and his insurance policy number. At block 7096, the method presents on the in-vehicle display, the agent name and his telephone number. At block 7098, the method presents, on the in-vehicle display, the year of the vehicle, the make, and the model. At block 7100, the method presents, on the in-vehicle display, the coverage, including bodily injury, property damage, personal injury protection, comprehensive, and collision. The method then continues to terminal F.

From terminal F (FIG. 7B), the method proceeds to a set of method steps 7008 defined between a continuation terminal ("terminal G") and another continuation terminal ("terminal H"). The set of method steps 7008 executes traffic and weather monitor modules 114-116 on an in-vehicle display. From terminal G (FIG. 7N), the method proceeds to decision block 7012, where a test is performed to determine whether the traffic or the weather monitor module was selected. If the answer to the test at decision block 7012 is "No", the method proceeds to terminal H. Otherwise, if the answer to the test at decision block 7012 is "Yes", the method proceeds to block 7104, where the method presents, on the in-vehicle display, whether there is a severe weather alert for the location at which the insured is located. At block 7106, the method presents, on the in-vehicle display, a map displaying the weather. At block 7108, the method presents, on the in-vehicle display, whether there is a weather advisory in effect for a number of miles ahead. At block 7110, the method checks whether safe trips and recommendations are available, and if so, presents their availability on the in-vehicle display. The method then continues to another continuation terminal ("terminal G1").

From terminal G1 (FIG. 7O), the method proceeds to block 7112, where the method presents, on the in-vehicle display, a button for viewing details of the safety travel tips and recommendations and another button for taking actions.

At decision block 7114, a test is performed to determine whether the method received actuation of the "details" button. If the answer to the test at decision block 7114 is "No", the method proceeds to another continuation terminal ("terminal G2"). Otherwise, if the answer to the test at decision block 7114 is "Yes", the method proceeds to block 7116, where the method presents, on the in-vehicle display, safety travel tips. The method then continues to terminal H.

From terminal G2 (FIG. 7P), the method proceeds to decision block 7118, where a test is performed to determine whether the method received actuation of the "action" button. If the answer to the test at decision block 7118 is "No", the method proceeds to terminal H. Otherwise, if the answer to the test at decision block 7118 is "Yes", the method proceeds to decision block 7120, where a test is performed to determine whether the fuel level of the vehicle is low. If the answer to the test at decision block 7120 is "No", the method proceeds to another continuation terminal ("terminal G3"). Otherwise, if the answer to the test at decision block 7120 is "Yes", the method proceeds to block 7122, where the method finds the closest service station. At block 7124, the method presents, on the in-vehicle display, that the fuel level is low, the availability of the closest service station, and a "get gas" button. The method then continues to terminal G3.

From terminal G3 (FIG. 7Q), the method proceeds to block 7126, where the method presents, on the in-vehicle display, a "go home" button for plotting a route home avoiding the weather. At block 7128, the method presents, on the in-vehicle display, a "safety" button for providing safety instructions if stranded. At decision block 7130, a test is performed to determine whether the method received actuation of the "get gas" button. If the answer to the test at decision block 7130 is "No", the method proceeds to another continuation terminal ("terminal G4"). Otherwise, if the answer to the test at decision block 7130 is "Yes", the method proceeds to block 7132, where the method presents, on the in-vehicle display, a map and sequenced driving instructions to get to the closest service station. The method then continues to terminal G4.

From terminal G4 (FIG. 7R), the method proceeds to decision block 7134, where a test is performed to determine whether the method received actuation of the "go home" button. If the answer to the test at decision block 7134 is "No", the method continues to terminal H. Otherwise, if the answer to the test at decision block 7134 is "Yes", the method proceeds to block 7136, where the method finds one or more routes to travel back to the insured's home avoiding the weather. At block 7138, the method presents, on the in-vehicle display, a map and route options selectable by the insured to get back home avoiding the weather. The method then continues to terminal H.

From terminal H (FIG. 7B), the method 7000 proceeds to a set of method steps 7010 defined between a continuation terminal ("terminal I") and another continuation terminal ("terminal J"). The set of method steps 7010 executes the drive to savings module 118 on an in-vehicle display. From terminal I (FIG. 7S), the method proceeds to decision block 7140, where a test is performed to determine whether the drive to savings module 118 is selected. If the answer to the test at decision block 7140 is "No", the method proceeds to terminal J. Otherwise, if the answer to the test at decision block 7140 is "Yes", the method proceeds to block 7142, where the method presents, on the in-vehicle display, that by turning on the module to track the vehicle for a period of time, the insured may obtain an insurance discount. At block 7144, the method presents, on the in-vehicle display, a "tracking" button which, selection causes the telematics device installed in the vehicle to track the operation of the vehicle. The method then continues to decision block 7146, where a test is performed to determine whether the method received actuation of the "tracking" button. If the answer to the test at decision block 7146 is "No", the method continues to terminal I and then skips back to the previously discussed processing steps. Otherwise, if the answer to the test at decision block 7146 is "Yes", the method continues to another continuation terminal ("terminal I1").

From terminal I1 (FIG. 7T), the method proceeds to decision block 7148, where a test is performed to determine whether the tracking period has expired. If the answer to the test at decision block 7148 is "No", the method proceeds to terminal I1 and skips back to the previously discussed processing step. Otherwise, if the answer to the test at decision block 7148 is "Yes", the method proceeds to block 7150, where the method presents, on the in-vehicle display, a "report" button for displaying vehicle operation during the tracking period. At block 7152, the method presents, on the in-vehicle display, a "quote" button, which selection causes an insurance quote to be formulated based on the tracked vehicle operation. At block 7154, the method presents, on the in-vehicle display, a "link" button, which selection causes a hyperlink to be e-mailed to obtain a quote based on the tracked vehicle operation. The method then continues to terminal J.

From terminal J (FIG. 7B), the method 7000 proceeds to a set of method steps 7012 defined between a continuation terminal ("terminal K") and another continuation terminal ("terminal L"). The set of method steps 7012 executes the drive coach module 120 on an in-vehicle display. From terminal K (FIG. 7U), the method proceeds to decision block 7156, where a test is performed to determine whether the drive coach module is selected. If the answer to the test at decision block 7156 is "No", the method proceeds to terminal L and terminates execution. Otherwise, if the answer to the test at decision block 7156 is "Yes", the method proceeds to another continuation terminal ("terminal K1"). From terminal K1, the method proceeds to block 7158, where the method activates a telematics device to generate telematic data capturing vehicle operation. At block 7160, the method performs analytics over the telematic data to discover patterns of unsafe driving events providing feedback on the in-vehicle display. At decision block 7162, a test is performed to determine whether the method detects that the trip is completed. If the answer to the test at decision block 7162 is "No", the method proceeds to terminal K1 and skips back to block 7158 where the above-identified processing steps are repeated. Otherwise, if the answer to the test at decision block 7162 is "Yes", the method proceeds to another continuation terminal ("terminal K2"). From terminal K2 (FIG. 7V), the method proceeds to block 7164, where the method calculates a driving score. At block 7166, the method presents, on the in-vehicle display, the driving score, unsafe driving events, and miles traveled. The method continues to terminal L and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method useful for improving vehicle technology, comprising:

presenting a first graphical user interface on an in-vehicle display installed in a vehicle and communicatively coupled to an on-board computer and computer memory, the first graphical user interface presenting selectable modules, including an accident scene assistant module, a claim module, and a drive to savings module;

determining an impact to the vehicle and its location by the on-board computer when the accident scene assistant module is selected on the in-vehicle display;

presenting on the in-vehicle display a second graphical user interface illustrating the impact to the vehicle and its location;

querying on the in-vehicle display via the second graphical user interface whether to report a claim;

retrieving, by activating the claim module, from the computer memory by the on-board computer information of the vehicle and information of an accident leading to the impact if the accident scene assistant receives an indication on the in-vehicle display to report a claim;

communicating by the on-board computer with a mobile phone of the insured to activate an app on the mobile phone so as to facilitate selection of photos, videos, or voice memos of the accident;

sending the information of the vehicle, information of the accident, photos, videos, or voice memos of the accident to a server; and acknowledging by a third graphical user interface on the in-vehicle display if the information of the vehicle, information of the accident, photos, videos, or voice memos of the accident were received by the server, the third graphical user interface indicating a location from which information was sent.

2. The method of claim 1, further comprising finding and storing a repair shop in the computer memory by the on-board computer at a proximity specified by an insured through operating a first graphical user interface on the in-vehicle display, guiding the vehicle to the repair shop in the computer memory, and presenting on the in-vehicle display whether a rental vehicle is available at the repair shop.

3. The method of claim 1, further comprising executing an insurance card module on the on-board computer, the hardware of which has a capacity to present a fourth graphical user interface on the in-vehicle display, the fourth graphical user interface presenting a state from which insurance information of the insured is culled.

4. The method of claim 1, further comprising executing a traffic monitor module on the on-board computer, the hardware structure of which is suitable for determining whether there is a traffic alert for the location toward which the vehicle is heading and plotting on the in-vehicle display to guide the vehicle home via a route that has had the least amount of historic accidents.

5. The method of claim 1, further comprising executing a weather monitor module on the on-board computer, the hardware of which is suitable for determining whether there is a weather alert for the location toward which the vehicle is heading, displaying a map on the in-vehicle display of the current location of the vehicle and a weather pattern toward which the vehicle is headed, querying the insured on the in-vehicle display whether to guide the vehicle home, and plotting on the on-board computer one or more routes home avoiding the weather.

6. The method of claim 1, further comprising executing the drive to savings module on the on-board computer, the hardware of which is capable of tracking operation of the vehicle by a telematics device, determining by the on-board computer whether a tracking period has expired, and querying the insured on the in-vehicle display whether to formulate a discount quote for an insurance policy based on the tracking operation of the vehicle.

7. The method of claim 1, further comprising executing a drive coach module on the on-board computer, the hardware of which has a capacity to activate a telematics device to track the vehicle for a trip, performing by the on-board computer analytics over telematics data to discover patterns of unsafe driving events, presenting the unsafe driving events on the in-vehicle display, calculating a driving score by the on-board computer, and presenting the driving score on the in-vehicle display when the trip has ended.

8. A non-transitory computer-readable medium having computer-readable instructions for implementing a method useful for improving vehicle technology, comprising:

presenting a first graphical user interface on an in-vehicle display installed in a vehicle and communicatively coupled to an on-board computer and computer memory, the first graphical user interface presenting selectable modules, including an accident scene assistant module, a claim module, and a drive to savings module;

determining an impact to the vehicle and its location by the on-board computer when the accident scene assistant module is selected on the in-vehicle display;

presenting on the in-vehicle display a second graphical user interface illustrating the impact to the vehicle and its location;

querying on the in-vehicle display via the second graphical user interface whether to report a claim;

retrieving, by activating the claim module, from the computer memory by the on-board computer information of the vehicle and information of an accident leading to the impact if the accident scene assistant receives indication on the in-vehicle display to report a claim;

communicating by the on-board computer with a mobile phone of the insured to activate an app on the mobile phone so as to facilitate selection of photos, videos, or voice memos of the accident;

sending the information of the vehicle, information of the accident, photos, videos, or voice memos of the accident to a server; and acknowledging by a third graphical user interface on the in-vehicle display if the information of the vehicle, information of the accident, photos, videos, or voice memos of the accident were received by the server, the third graphical user interface indicating a location from which information was sent.

9. The method of claim 8, further comprising finding and storing a repair shop in the computer memory by the on-board computer at a proximity specified by an insured through operating a first graphical user interface on the in-vehicle display, guiding the vehicle to the repair shop in the computer memory, and presenting on the in-vehicle display whether a rental vehicle is available at the repair shop.

10. The method of claim 8, further comprising executing an insurance card module on the on-board computer, the hardware of which has a capacity to present a fourth graphical user interface on the in-vehicle display, the fourth graphical user interface presenting a state from which insurance information of the insured is culled.

11. The method of claim 8, further comprising executing a traffic monitor module on the on-board computer, the hardware structure of which is suitable for determining whether there is a traffic alert for the location toward which the vehicle is heading.

12. The method of claim 8, further comprising executing a weather monitor module on the on-board computer, the hardware of which is suitable for determining whether there is a weather alert for the location toward which the vehicle is heading, displaying a map on the in-vehicle display current of the location of the vehicle and a weather pattern toward which the vehicle is headed, querying the insured on the in-vehicle display whether to guide the vehicle home, and plotting on the on-board computer one or more routes home avoiding the weather.

13. The method of claim 8, further comprising executing the drive to savings module on the on-board computer, the hardware of which is capable of tracking operation of the vehicle by a telematics device, determining by the on-board computer whether a tracking period has expired, and querying the insured on the in-vehicle display whether to formulate a discount quote for an insurance policy based on the tracking operation of the vehicle.

14. The method of claim 8, further comprising executing a drive coach module on the on-board computer, the hardware of which has a capacity to activate a telematics device to track the vehicle for a trip, performing by the on-board computer analytics over telematics data to discover patterns of unsafe driving events, presenting the unsafe driving events on the in-vehicle display, calculating a driving score by the on-board computer, and presenting the driving score on the in-vehicle display when the trip has ended.

\* \* \* \* \*